United States Patent
Watanabe et al.

(10) Patent No.: US 8,765,906 B2
(45) Date of Patent: Jul. 1, 2014

(54) METHOD FOR PRODUCING POLYACRYLIC ACID (SALT) TYPE WATER ABSORBENT RESIN POWDER

(75) Inventors: Yusuke Watanabe, Himeji (JP); Kazushi Torii, Himeji (JP); Kozo Nogi, Himeji (JP); Kunihiko Ishizaki, Himeji (JP); Reiko Nakatsuru, Himeji (JP); Shigeru Sakamoto, Himeji (JP)

(73) Assignee: Nippon Shokubai, Co., Ltd., Osaka (JP)

( * ) Notice: Subject to any disclaimer, the term of this patent is extended or adjusted under 35 U.S.C. 154(b) by 0 days.

(21) Appl. No.: 13/643,682

(22) PCT Filed: Apr. 27, 2011

(86) PCT No.: PCT/JP2011/060325
§ 371 (c)(1),
(2), (4) Date: Jan. 7, 2013

(87) PCT Pub. No.: WO2011/136301
PCT Pub. Date: Nov. 3, 2011

(65) Prior Publication Data
US 2013/0102750 A1    Apr. 25, 2013

(30) Foreign Application Priority Data

| Apr. 27, 2010 | (JP) | ................ 2010-102741 |
| Jan. 27, 2011 | (JP) | ................ 2011-015186 |
| Jan. 27, 2011 | (JP) | ................ 2011-015187 |

(51) Int. Cl.
C08G 63/02 (2006.01)
C08G 63/00 (2006.01)

(52) U.S. Cl.
USPC .................. 528/481; 525/329.7; 525/385

(58) Field of Classification Search
USPC ................... 528/329.7, 385, 481
See application file for complete search history.

(56) References Cited

U.S. PATENT DOCUMENTS

| 4,703,067 A | 10/1987 | Mikita et al. |
| 4,920,202 A | 4/1990 | Irie et al. |
| 4,950,692 A | 8/1990 | Lewis et al. |
| 5,002,986 A | 3/1991 | Fujiura et al. |
| 5,005,771 A | 4/1991 | Pieh et al. |
| 5,064,582 A | 11/1991 | Sutton et al. |
| 5,118,719 A | 6/1992 | Lind |
| 5,124,188 A | 6/1992 | Roe et al. |
| 5,147,343 A | 9/1992 | Kellenberger |
| 5,149,335 A | 9/1992 | Kellenberger et al. |
| 5,154,713 A | 10/1992 | Lind |
| 5,229,487 A | 7/1993 | Tsubakimoto et al. |
| 5,264,495 A | 11/1993 | Irie et al. |
| 5,314,420 A | 5/1994 | Smith et al. |
| 5,350,799 A | 9/1994 | Woodrum et al. |
| 5,399,591 A | 3/1995 | Smith et al. |
| 5,451,613 A | 9/1995 | Smith et al. |
| 5,455,284 A | 10/1995 | Dahmen et al. |
| 5,462,972 A | 10/1995 | Smith et al. |
| 5,478,879 A | 12/1995 | Kajikawa et al. |
| 5,562,646 A | 10/1996 | Goldman et al. |
| 5,601,542 A | 2/1997 | Melius et al. |
| 5,624,967 A | 4/1997 | Hitomi et al. |
| 5,712,316 A | 1/1998 | Dahmen et al. |
| 5,856,370 A | 1/1999 | Chmelir |
| 5,945,495 A | 8/1999 | Daniel et al. |
| 5,985,944 A | 11/1999 | Ishizaki et al. |
| 6,071,976 A | 6/2000 | Dairoku et al. |
| 6,107,358 A | 8/2000 | Harada et al. |
| 6,136,873 A | 10/2000 | Hahnle et al. |
| 6,187,902 B1 | 2/2001 | Yanase et al. |
| 6,207,796 B1 | 3/2001 | Dairoku et al. |
| 6,228,930 B1 | 5/2001 | Dairoku et al. |
| 6,291,636 B1 | 9/2001 | Miyake et al. |
| 6,359,049 B1 | 3/2002 | Carrico et al. |
| 6,414,214 B1 | 7/2002 | Engelhardt et al. |
| 6,562,879 B1 | 5/2003 | Hatsuda et al. |
| 6,565,768 B1 | 5/2003 | Dentler et al. |
| 6,576,713 B2 | 6/2003 | Ishizaki et al. |
| 6,641,064 B1 | 11/2003 | Dentler et al. |
| 6,710,141 B1 | 3/2004 | Heide et al. |
| 6,750,262 B1 | 6/2004 | Hahnle et al. |
| 6,817,557 B2 | 11/2004 | Kakita et al. |
| 6,906,159 B2 | 6/2005 | Dairoku et al. |

(Continued)

FOREIGN PATENT DOCUMENTS

| CA | 2195373 A1 | 1/1997 |
| CH | 691572 | 8/2001 |
| EP | 0450922 | 7/1999 |
| EP | 0595803 | 2/2002 |
| EP | 0785224 | 4/2003 |
| EP | 1957188 | 2/2010 |
| JP | 54-053165 A | 4/1979 |
| JP | 64-060683 A | 3/1989 |
| JP | 1-318021 A | 12/1989 |
| JP | 7-270070 A | 10/1995 |
| JP | 8-073518 A | 3/1996 |
| JP | 10-059534 A | 3/1998 |
| JP | 2000-143720 A | 5/2000 |
| JP | 2001-018222 A | 1/2001 |
| JP | 2001-226416 A | 8/2001 |

(Continued)

Primary Examiner — Terressa Boykin
(74) Attorney, Agent, or Firm — Cesari and McKenna, LLP

(57) ABSTRACT

A water absorbent resin having less fine powder or powdery dust and a controlled particle size is provided, and the water absorption rate of the water absorbent resin is increased by a simple method at low cost, while maintaining or improving other physical properties such as liquid permeability. Disclosed is a method for producing a polyacrylic acid (salt)-type water absorbent resin powder, which includes, in sequence, a step of polymerizing an aqueous solution of acrylic acid (salt)-type monomer; a step of gel-crushing a gel of a water-containing gel-like crosslinked polymer during polymerization or after polymerization; a step of drying the water-containing gel-like crosslinked polymer; and a step of pulverizing and classifying the dried polymer, wherein water absorbent resin fine particles having a particle size of less than 150 μm or a hydrated-particles thereof is added to a step prior to the drying step, and in the drying step, hot air drying is carried out with a hot air having an average flow velocity of 1.0 to 3.0 [m/s], a dew point of 30° C. to 100° C., and a hot air temperature of 140° C. to 235° C.

20 Claims, 4 Drawing Sheets

(56) References Cited

U.S. PATENT DOCUMENTS

| | | |
|---|---|---|
| 6,939,914 B2 | 9/2005 | Qin et al. |
| 6,987,151 B2 | 1/2006 | Gartner et al. |
| 7,091,253 B2 | 8/2006 | Dairoku et al. |
| 7,169,843 B2 | 1/2007 | Smith et al. |
| 7,173,086 B2 | 2/2007 | Smith et al. |
| 7,265,190 B2 | 9/2007 | Dairoku et al. |
| 7,582,705 B2 | 9/2009 | Dairoku et al. |
| 7,960,490 B2 | 6/2011 | Funk et al. |
| 8,080,620 B2 | 12/2011 | Funk et al. |
| 2001/0025093 A1 | 9/2001 | Ishizaki et al. |
| 2004/0110006 A1 | 6/2004 | Ishizaki et al. |
| 2005/0176834 A1 | 8/2005 | Hintz et al. |
| 2005/0256469 A1 | 11/2005 | Qin et al. |
| 2006/0036043 A1 | 2/2006 | Nestler et al. |
| 2006/0183828 A1 | 8/2006 | Dairoku et al. |
| 2007/0015860 A1 | 1/2007 | Frank |
| 2007/0123624 A1 | 5/2007 | Otten et al. |
| 2007/0197749 A1 | 8/2007 | Matsuda et al. |
| 2007/0225422 A1 | 9/2007 | Sakamoto et al. |
| 2008/0021150 A1 | 1/2008 | Becker et al. |
| 2008/0080300 A1 | 4/2008 | Stueven et al. |
| 2008/0119586 A1 | 5/2008 | Byerly et al. |
| 2008/0214749 A1 | 9/2008 | Weismantel et al. |
| 2008/0287631 A1 | 11/2008 | Nitschke |
| 2008/0306209 A1 | 12/2008 | Stueven et al. |
| 2009/0041470 A1 | 2/2009 | Kawanishi et al. |
| 2009/0318633 A1 | 12/2009 | Funk et al. |
| 2010/0001233 A1 | 1/2010 | Funk et al. |
| 2010/0016522 A1 | 1/2010 | Stueven et al. |
| 2010/0268181 A1 | 10/2010 | Ziemer et al. |
| 2011/0118430 A1 | 5/2011 | Funk et al. |
| 2011/0166300 A1 | 7/2011 | Dairoku et al. |
| 2011/0313113 A1 | 12/2011 | Sakamoto et al. |
| 2012/0001122 A1 | 1/2012 | Wattebled et al. |

FOREIGN PATENT DOCUMENTS

| | | |
|---|---|---|
| JP | 2002-121291 A | 4/2002 |
| JP | 2002-226599 A | 8/2002 |
| JP | 2004-197087 A | 7/2004 |
| JP | 2005-162834 A | 6/2005 |
| JP | 2006-160774 A | 6/2006 |
| JP | 2007-224224 A | 9/2007 |
| JP | 4132592 | 8/2008 |
| JP | 2010-053296 A | 3/2010 |
| WO | 91/15368 | 10/1991 |
| WO | 92/18171 | 10/1992 |
| WO | 92/20723 | 11/1992 |
| WO | 94/22502 | 10/1994 |
| WO | 2000/22017 | 4/2000 |
| WO | 2005/063313 | 7/2005 |
| WO | 2007/057350 | 5/2007 |
| WO | 2008/034786 | 3/2008 |
| WO | 2008/037676 | 4/2008 |
| WO | 2008/087114 | 7/2008 |
| WO | 2009/031701 | 3/2009 |
| WO | 2009/153196 | 12/2009 |
| WO | 2010/006937 | 1/2010 |
| WO | 2010/032694 A1 | 3/2010 |
| WO | 2010/044281 A1 | 4/2010 |
| WO | 2010/095427 | 8/2010 |
| WO | 2010/115671 | 10/2010 |

METHOD FOR PRODUCING POLYACRYLIC ACID (SALT) TYPE WATER ABSORBENT RESIN POWDER

CROSS REFERENCE TO RELATED APPLICATIONS

This application is a National Stage of International Application No. PCT/JP2011/060325 filed on Apr. 27, 2011, which claims priority to Japanese Application No. 2010-102741 filed Apr. 27, 2010, Japanese Application No. 2011-015186 filed Jan. 27, 2011, and Application No. 2011-015187 filed Jan. 27, 2011. The contents of the prior applications are incorporated herein by reference in their entirety.

TECHNICAL FIELD

The present invention relates to a method for producing a polyacrylic acid (salt)-type water absorbent resin powder. More particularly, the present invention relates to a method for producing a water absorbent resin powder that is used in hygiene product such as a disposable diaper and a sanitary napkin and the like, and relates to a method for producing a polyacrylic acid (salt)-type water absorbent resin powder having excellent water absorption performance (particularly, a fast water absorption rate). That is, the present invention relates to a method for producing a polyacrylic acid (salt)-type water absorbent resin powder having an improved water absorption rate (FSR), while maintaining the liquid permeability or the water absorption capacity under load.

BACKGROUND ART

A water absorbent resin (SAP/Super Absorbent Polymer) is a water-swellable, water-insoluble polymeric gellant, and is mainly used for disposable articles as water absorbent articles such as a disposable diapers and a sanitary napkin, as well as an agricultural and horticultural water retaining agent, an industrial water stopping agent and the like. As such a water absorbent resin, many monomers and hydrophilic polymers have been proposed as raw materials. Among them, a polyacrylic acid (salt)-type water absorbent resin, which is formed by using an acrylic acid and/or a salt thereof as a monomer, is widely used in industrial purposes due to its high water absorption performance.

Such a water absorbent resin is produced through a polymerization step, a drying step (if necessary, removal of undried materials), a pulverization step, a classification step, a surface crosslinking step, and the like (Patent Literatures 1 to 10). Along with a performance improvement of a disposable diaper, which is a main application of a water absorbent resin, a water absorbent resin is also required to have many functions (physical properties). Specifically, many physical properties not only limited to high water absorption capacity but also including gel strength, extractable polymer content, water absorption rate, water absorption capacity under load, liquid permeability, particle size distribution, urine resistance, antibacterial physical properties, impact resistance (damage resistance), powder fluidity, deodorant property, coloration resistance (degree of whiteness), low dust property and the like, are required for the water absorbent resin. Therefore, numerous suggestions have been made on the surface crosslinking technology, additives, modification of production step, and the like.

Among the physical properties described above, with regard to liquid permeability, in accordance with increase of using amount of water absorbent resin in a disposable diaper (for example, 50% by weight or more), the liquid permeability is regarded as a more important factor in recent years. Furthermore, there have been suggested many methods for improvement or technologies for amelioration of liquid permeability under a load or liquid permeability without load, such as SFC (Saline Flow Conductivity; Patent Literature 11) and GBP (Gel Bed Permeability; Patent Literatures 12 to 14).

Furthermore, in addition to liquid permeability, water absorption rate is also an important fundamental property of a water absorbent resin, and as a method of increasing such water absorption rate, a technology of enhancing the water absorption rate by increasing the specific surface area is known. Specifically, a technology of finely controlling the particle size (Patent Literatures 15 and 16), a technology of agglomerating fine particles that have a large surface area (Patent Literatures 17 to 19), a technology of freeze-drying a hydrogel to make the product porous (Patent Literature 20), a technology of simultaneously agglomerating and surface crosslinking particles (Patent Literatures 21 to 23), a technology for performing foaming polymerization (Patent Literatures 24 to 42), a technology of foaming and crosslinking after polymerization (Patent Literature 43), a technology of incorporating gas bubbles into an aqueous monomer solution by using a microbubble generating apparatus (Patent Literature 44), a technology of using hollow fine particles in a hydrogel (Patent Literature 45), and the like have been proposed.

Known examples of the technologies for performing foaming polymerization (Patent Literatures 24 to 42) include, as a foaming agent that is used for the monomer, a technology of using a carbonate (Patent Literatures 24 to 32), a technology of using an organic solvent (Patent Literatures 33 and 34), a technology of using an inert gas (Patent Literatures 35 to 37), a technology of using an azo compound (Patent Literatures 38 and 39), a technology of using an insoluble inorganic powder or water-insoluble particles (Patent Literatures 40 and 41), a technology of polymerizing, without stirring, a slurry in which fine precipitates of an acrylic acid sodium salt at a concentration of 45 to 60% by weight are dispersed and an inert gas in the form of microbubbles is incorporated (Patent Literature 42) and the like.

In the conventional technologies for enhancing the water absorption rate by increasing the specific surface area (Patent Literatures 15 to 45 etc.), an increase in the water absorption rate to a certain extent may be expected, but the technologies do not still exhibit sufficient effects and necessitate special apparatuses or highly expensive raw materials (a large amount of surfactants or foaming agents). Furthermore, the relevant technologies have a problem that other physical properties such as liquid permeability (Patent Literatures 11 to 14 and 56 to 59), impact resistance (Patent Literature 46), bulk density (Patent Literatures 47 and 48), water absorption capacity under load (Patent Literatures 52 to 55) deteriorate and the like. That is, in general, since the water absorption rate and the specific surface area are positively correlated, while liquid permeability and the specific surface area are negatively correlated, it has been very difficult to achieve a good balance between water absorption rate and liquid permeability, which both depend large on the surface area.

Furthermore, in addition to the water absorption rate, many parameter physical properties such as the water absorption capacity under load (Patent Literatures 52 to 55) and liquid permeability (Patent Literatures 56 to 59) have been suggested. However, generally, when the water absorption rate is increased, the water absorption capacity under load (for example, AAP) or liquid permeability (for example, SFC or GBP) tends to decrease, and therefore, it is difficult to achieve a balance between them.

Also, by making the particle size smaller or foaming, the surface area increases, and the water absorption rate can be enhanced. However, increasing the surface area inevitably causes a significant decrease in the liquid permeability or the bulk density. A decrease in the bulk density makes the water absorbent resin bulky and decreases the particle strength. Therefore, a decrease in the bulk density is not preferable from the viewpoints of the transport or storage of the water absorbent resin, the use of the water absorbent resin in disposable diapers and the like.

Furthermore, the technology of dispersing gas bubbles by using a large amount of surfactants (Patent Literatures 35 and 36) has a problem that the technology causes not only an increase in the cost due to the surfactants, but also a decrease in the surface tension of the water absorbent resin, so that the amount of return after liquid once absorbed in disposable diapers and the like increases.

Also, in many of the applications of water absorbent resins, a water absorbent resin is used in hygiene products such as disposable diapers and sanitary napkins, and is compositized with white pulp. Accordingly, it is requested that the water absorbent resin be white in color from the viewpoint of the sense of cleanness, and many technologies for improving coloration have been proposed (Patent Literatures 49 to 51). However, from the viewpoints of the cost or safety of the coloration preventing agent, complicatedness of the steps, and the effect, those technologies still cannot be said to be satisfactory.

PRIOR PUBLICATION

Patent Literature

Patent Literature 1: U.S. Pat. No. 6,576,713
Patent Literature 2: U.S. Pat. No. 6,817,557
Patent Literature 3: U.S. Pat. No. 6,291,636
Patent Literature 4: U.S. Pat. No. 6,641,064
Patent Literature 5: US-A-2008-0287631
Patent Literature 6: EP Patent No. 1 957 188
Patent Literature 7: U.S. Pat. No. 7,265,190
Patent Literature 8: JP-A-2005-162834
Patent Literature 9: U.S. Pat. No. 6,710,141
Patent Literature 10: U.S. Pat. No. 7,091,253
Patent Literature 11: U.S. Pat. No. 5,562,646
Patent Literature 12: US-A-2005-0256469
Patent Literature 13: U.S. Pat. No. 7,169,843
Patent Literature 14: U.S. Pat. No. 7,173,086
Patent Literature 15: US-A-2007-015860
Patent Literature 16: WO 92/18171 A
Patent Literature 17: U.S. Pat. No. 5,624,967
Patent Literature 18: US-A-2007-0015860
Patent Literature 19: U.S. Pat. No. 5,002,986
Patent Literature 20: U.S. Pat. No. 6,939,914
Patent Literature 21: U.S. Pat. No. 5,124,188
Patent Literature 22: EP Patent No. 0 595 803 B
Patent Literature 23: EP Patent No. 0 450 922 B
Patent Literature 24: U.S. Pat. No. 5,118,719
Patent Literature 25: WO 91/15368 A
Patent Literature 26: U.S. Pat. No. 5,154,713
Patent Literature 27: U.S. Pat. No. 5,314,420
Patent Literature 28: U.S. Pat. No. 5,399,591
Patent Literature 29: U.S. Pat. No. 5,451,613
Patent Literature 30: U.S. Pat. No. 5,462,972
Patent Literature 31: U.S. Pat. No. 5,712,316
Patent Literature 32: WO 2005/063313 A
Patent Literature 33: WO 94/022502 A
Patent Literature 34: U.S. Pat. No. 4,703,067
Patent Literature 35: U.S. Pat. No. 6,136,873
Patent Literature 36: U.S. Pat. No. 6,750,262
Patent Literature 37: U.S. Pat. No. 6,107,358
Patent Literature 38: U.S. Pat. No. 5,856,370
Patent Literature 39: U.S. Pat. No. 5,985,944
Patent Literature 40: US-A-2010-0268181
Patent Literature 41: US-A-2007-0225422
Patent Literature 42: JP-A-1-318021
Patent Literature 43: US-A-2005-0176834
Patent Literature 44: WO 2010/095427 A
Patent Literature 45: WO 2010/115671 A
Patent Literature 46: U.S. Pat. No. 6,414,214
Patent Literature 47: U.S. Pat. No. 6,562,879
Patent Literature 48: U.S. Pat. No. 7,582,705
Patent Literature 49: U.S. Pat. No. 6,359,049
Patent Literature 50: US-A-2007-0197749
Patent Literature 51: US-A-2006-0036043
Patent Literature 52: U.S. Pat. No. 5,562,646
Patent Literature 53: US-A-2005-0256469
Patent Literature 54: U.S. Pat. No. 7,169,843
Patent Literature 55: U.S. Pat. No. 7,173,086
Patent Literature 56: U.S. Pat. No. 5,147,343
Patent Literature 57: U.S. Pat. No. 5,149,335
Patent Literature 58: US-A-2008-119586
Patent Literature 59: U.S. Pat. No. 5,601,542

SUMMARY OF INVENTION

Technical Problem

Conventionally, as a technique of enhancing the water absorption rate of a water absorbent resin, attention has been paid to the specific surface area of the water absorbent resin or the raw materials, and many methods have been proposed such as foaming polymerization, agglomeration, surface crosslinking agents, and additives (a polyamine polymer, inorganic fine particles, and a thermoplastic polymer). However, alteration or addition of the raw materials of the water absorbent resin has caused not only problems such as a decrease in the safety of the raw materials and an increase in the cost, but also a decrease in other physical properties of the water absorbent resin. Furthermore, when the water absorption rate (for example, FSR) is increased, other physical properties such as liquid permeability (for example, SFC and GBP) tend to decrease, and thus, it is difficult to achieve a balance between the two physical properties.

Furthermore, addition of new production steps may cause an increase in the cost due to high facility investment or energy consumption, and may also require industrially complicated operation, thereby rather causing a decrease in productivity or physical properties.

Also, the techniques described above exhibit effects to the extent of small scales such as in laboratories; however, in large scales such as in production facility (for example, the production amount is 1 [t/hr] or greater), the techniques may not exhibit sufficient effects.

Thus, in order to improve the problems described above, an object of the present invention is to provide a method of enhancing conflicting physical properties (for example, water absorption rate (FSR) and liquid permeability (SFC)) of a water absorbent resin in large-scale production by a simple technique, without requiring any alteration of raw materials or high facility investment, and thereby achieving a balance between the physical properties and stabilization of the physical properties.

Another object of the present invention is to provide a water absorbent resin powder which achieves a balance between liquid permeability (for example, SFC) and water absorption rate (for example, FSR), which are conflicting physical properties, and has a high degree of whiteness. More particularly, it is an object of the invention to provide a white water absorbent resin powder having the enhanced water absorption rate, while maintaining, or without greatly impairing, other physical properties of the water absorbent resin powder, such as bulk density, surface tension, water absorption capacity under load, and impact resistance, and without using highly expensive raw materials or apparatuses.

Solution to Problem

The present invention was achieved in view of the conventional problems described above. That is, the problems are solved by a production method of enhancing the water absorption rate (FSR) and liquid permeability (SFC), and thereby achieving a balance between the physical properties and stabilization of the physical properties, the method including a fine powder recovery step and a drying step involving particular conditions.

Specifically, as a method for increasing the water absorption rate, it has already been known to increase the surface area of the water absorbent resin. However, in the related art technologies described above, it was found that a large amount of balloon-like dried polymers are generated at the time of drying, and then, by pulverization and classification, the polymers are subjected to form a scale-like water absorbent resin, and as a result, the scale-like shape is causative of deterioration of liquid permeability of the water absorbent resin (see FIG. 6).

Thus, the inventors of the present invention further studied to solve the problems described above, and as a result, the inventors found that (1) the surface area of a water-containing gel-like crosslinked polymer and a dried substance thereof is increased by including a step of adding water absorbent resin fine particles or a hydrated-particles thereof before the drying step; and (2) a water-containing gel-like crosslinked polymer is dried so as not to increase the amount of balloon-like dried polymer, while generating fine gas bubbles in a water-containing gel-like crosslinked polymer, by controlling the flow velocity and temperature of hot air that is used in the drying step to certain ranges, and thereby water absorption rate (FSR) and liquid permeability (SFC) are enhanced, while a balance between the physical properties and stabilization of the physical properties can be achieved.

Furthermore, according to the present invention, it was found that a balance is achieved between liquid permeability (for example, SFC) and water absorption rate (for example, FSR), which are conflicting physical properties, and thereby a water absorbent resin powder having a high degree of whiteness is obtained, by carrying out a step of foaming a water-containing gel-like crosslinked polymer is carried out, that is, by means of a production method which includes a foaming step for a water-containing gel-like crosslinked polymer, and any one of a fine powder recovery step and a drying step involving particular conditions.

As an exemplary embodiment of the present invention, a production method including a fine powder recovery step and a drying step involving particular conditions is provided. That is, while conventional techniques for enhancing water absorption rate focus more on the increase in the specific surface area by foaming polymerization, agglomeration or the like, or on the alteration of raw materials, the present invention paid attention for the first time to the relationship between the water absorption rate and the drying step. There, it was found that the flow velocity, dew point and temperature of hot air affect the water absorption rate, and that the water absorption rate is increased particularly by performing a drying step involving particular conditions (preferably, a particular through-circulation band type hot air drying) and addition (recovery) of fine particles, and thereby a water absorbent resin powder having a high degree of whiteness may be obtained by achieving a balance between liquid permeability (for example, SFC) and water absorption rate (for example, FSR), which are conflicting physical properties. Thus, the present invention was completed.

That is, in order to solve the problems described above, the method for producing a water absorbent resin powder of the present invention is a method for producing a polyacrylic acid (salt)-type water absorbent resin powder, which includes, in sequence, a polymerization step of an aqueous solution of acrylic acid (salt)-type monomer; a gel-crushing step of a water-containing gel-like crosslinked polymer during or after polymerization; a drying step of the water-containing gel-like crosslinked polymer; and a pulverization and a classification step of the dried polymer, characterized in that water absorbent resin fine particles having a particle size of less than 150 µm or a hydrated-particles thereof are added to a step prior to the drying step, and that in the drying step, hot air drying is carried out at an average flow velocity of 1.0 to 3.0 [m/s], a dew point of 30 to 100° C., and a hot air temperature of 140 to 235° C.

Advantageous Effects of Invention

According to the present invention, by a production method including a fine powder recovery step and a drying step involving particular conditions (for example, performing particular through-circulation band type hot air drying and addition (recovery) of fine particles), conflicting physical properties of a water absorbent resin (for example, water absorption rate (FSR) and liquid permeability (SFC)) can be enhanced, and a balance between the physical properties and stabilization of the physical properties can be achieved. Thus, a water absorbent resin powder which is excellent in both the physical properties can be obtained.

Furthermore, according to the present invention, a water absorbent resin powder having a high degree of whiteness, in which a balance is achieved between liquid permeability (for example, SFC) and water absorption rate (for example, FSR), which are conflicting physical properties, is obtained by having a step of foaming a water-containing gel-like crosslinked polymer (preferably, a foaming polymerization step).

Furthermore, according to the method for producing a water absorbent resin powder related to the present invention, a water absorbent resin powder having a high water absorption rate can be efficiently produced with high productivity, without using a large amount of a surfactant and/or a dispersant.

Figure 4:
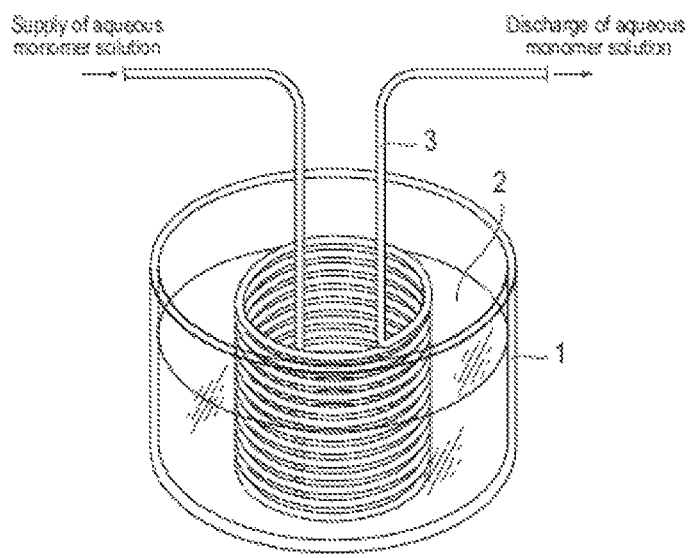
FIG. 4 is a perspective view illustrating an example of the apparatus used in a method of incorporating gas bubbles in a foaming step of a water-containing gel-like crosslinked polymer in the production method related to the present invention, which is used for a method of continuously increasing the temperature by heating an aqueous solution of an acrylic acid (salt)-type monomer.
Figure 5:
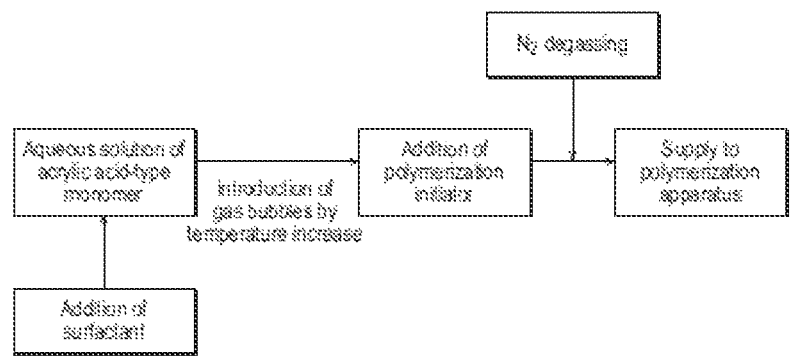
FIG. 5 is a flow diagram schematically illustrating an exemplary embodiment in which, in a foaming step of a water-containing gel-like crosslinked polymer in the production method related to the present invention, as method for introducing gas bubbles into the aqueous solution of acrylic acid (salt)-type monomer, gas bubbles are introduced by increasing the temperature of the aqueous solution of acrylic acid (salt)-type monomer, subsequently an inert gas (for example, nitrogen gas) is further introduced, and deoxygenation is carried out before polymerization.
Figure 7:
FIG. 7 is a schematic diagram illustrating a drying step of a water-containing gel-like crosslinked polymer in the production method related to the present invention.

Meanwhile, as another methods for incorporating gas bubbles in the production method related to the present invention, the schematic flow diagrams of [FIG. 4], [FIG. 5], [FIG. 7] to [FIG. 11] described in JP Patent Application No. 2010-179515 can be applied.

BEST MODE FOR CARRYING OUT THE INVENTION

Hereinafter, the method for producing a polyacrylic acid (salt)-type water absorbent resin powder according to the present invention will be described in detail. A scope of the present invention, however, should not be restricted to these explanations, and embodiments other than the following exemplification also may be executed by modification, as appropriate, unless a scope of the present invention is not impaired. Specifically, the present invention is not limited to the various exemplary embodiments described below, and can be modified into various embodiments within the scope illustrated by the claims. Exemplary embodiments that can be obtained by appropriately combining the technical means that are respectively disclosed in different exemplary embodiments, are also included in the technical scope of the present invention.

[1] Definition of Terms (1-1) "Water Absorbent Resin"

The term "water absorbent resin" used herein means a water-swellable and water-insoluble polymeric gellant having the physical properties described below. That is, it means a polymeric gellant having a CRC (water absorption capacity without load/specified in ERT441.2-02) indicated as "water-swellable property" of equal to or higher than 5 g/g, and Ext (Extractables/specified in ERT470.2-02) indicated as "water-insoluble property" of 0 to 50% by weight.

The water absorbent resin is not specifically limited, and it can be appropriately designed according to the use. Preferably, it is a hydrophilic crosslinked polymer obtained by crosslinking polymerization of an unsaturated monomer having a carboxyl group. The water absorbent resin is not limited to an embodiment where whole amount (100%) is a polymer, and may include additives and the like as another component except for the water absorbent resin, in an amount of the range to maintain the performance. Specifically, even a water absorbent resin composition is broadly referred to as a water absorbent resin in the invention. Meanwhile, the shape of the water absorbent resin may be a sheet form, a fibrous form, a film form, a powder form, a gel form or the like; however, in the present invention, a water absorbent resin in a powder form is preferred, and such a water absorbent resin may be referred to as a "water absorbent resin powder". Furthermore, the presence or absence of surface crosslinking does not matter.

(1-2) "Polyacrylic Acid (Salt)"

The term "polyacrylic acid (salt)" used herein means a polymer which contains an optional graft component, and contains acrylic acid and/or a salt thereof (hereinafter, referred to as acrylic acid (salt)) as a main component, as a repeating unit.

Specifically, it represents a polymer containing acrylic acid (salt) essentially in 50 to 100% by mole, preferably 70 to 100% by mole, still more preferably 90 to 100% by mole, and particularly preferably substantially 100% by mole, in the entire monomers (excluding an internal crosslinking agent) used in polymerization. The polyacrylic acid salt as polymer essentially includes a water soluble salt, and the salt is preferably a monovalent salt, and further preferably an alkali metal salt or an ammonium salt, the alkali metal salt is more preferable, and further a sodium salt is particularly preferable.

(1-3) "Water Absorbent Resin Fine Particles"

The "water absorbent resin fine particles" (also known as fine powder) used herein means a water absorbent resin containing particles having 50% by weight or greater, preferably 70% by weight or greater of a particle size of less than 150 μm, or preferably less than 106 μm.

Meanwhile, the particle size of the water absorbent resin fine particles is measured according to (1-4) (e) "PSD" (ERT420.0-02) which is described later, but may also be measured by appropriately applying a standard sieve having a mesh size of 106 μm or 75 μm.

(1-4) EDANA and ERT

The term "EDANA" is an abbreviation of European Disposables and Nonwovens Association, and the term "ERT" is an abbreviation of the measurement method (EDANA Recommended Test Methods) for the water absorbent resin of a European standard (nearly a world standard). Meanwhile, in the present description, unless otherwise specified, the ERT original (which is a known literature revised in 2002) is referred to for measuring physical properties of the water absorbent resin.

(a) CRC (ERT441.2-02)

The term "CRC" is an abbreviation of centrifuge retention capacity and it represents water absorption capacity without load (herein below also referred to as "water absorption capacity"). Specifically, it is an water absorption capacity (unit: [g/g]) at which 0.2 g of a water absorbent resin present in a non-woven fabric is freely swollen in a large excess amount of a 0.9 wt % sodium chloride aqueous solution for 30 minutes and further drained by centrifugation (250 G).

(b) "AAP" (ERT442.2-02)

The term "AAP" is an abbreviation of absorption against pressure and it means water absorption capacity under load. Specifically, AAP is a water absorption capacity (unit; g/g) after swelling a water-absorbent resin with an aqueous 0.9% by weight sodium chloride solution under a load of 2.06 kPa (0.3 psi) for 1 hour.) The water absorption capacity (unit: [g/g]) is measured by 0.9 g of a water absorbent resin which is placed and swelled under a pressure of 2.06 kPa (0.3 psi) in a 0.9 wt % sodium chloride aqueous solution for an hour. In the invention, the measurement was made with changing the pressure condition into a pressure of 4.83 kPa (0.7 psi) for one hour.

(c) "Ext" (ERT470.2-02)

The term "Ext" is an abbreviation of extractables and represents water-soluble content (amount of water-solubles). The extractables are of a value (unit: weight %) determined through steps of dissolving 1 g of a water absorbent resin in 200 mL of a 0.9% by weight sodium chloride aqueous solution, stirring a mixture thereof for 16 hours, and measuring an amount of the polymer dissolved in the solution by pH titration.

(d) "Residual Monomers" (ERT410.2-02)

The term "Residual Monomers" means an amount of monomers remaining in a water-absorbent resin. Specifically, it is a value (unit; ppm) obtained by charging 1 g of a water-absorbent resin into 200 g of an aqueous 0.9% by weight sodium chloride solution, stirring the mixture for 1 hours, and measuring an amount of eluted monomers into the aqueous solution by high-performance liquid chromatography.

(e) "PSD" (ERT420.2-02)

The term "PSD" is an abbreviation of a particle size distribution and represents a particle size distribution determined by sieve classification. The weight average particle diameter (D50) and particle size distribution width are measured according to the same method as "(1) Average Particle Size and Distribution of Particle Size" described in lines 25 to 43 at page 7 of EP Patent No. 0349240.

(F) Other Physical Properties of Water Absorbent Resin Defined by EDANA

"Respirable Particles" (ERT480.2-02): It means the respirable dust of a water absorbent resin.

"Dust" (ERT490.2-02): It means powder dust contained in a water absorbent resin.

(1-5) "FSR"

The term "FSR" is an abbreviation of Free Swell Rate, and it means water absorption rate (free swell capacity). Specifically, the FSR is the rate (unit: [g/g/s]) at which 1 g of a water absorbent resin absorbs 20 g of a 0.9 wt % aqueous solution of sodium chloride.

(1-6) "Liquid Permeability"

The term "liquid permeability" used herein represents flow of liquid that flows among particles of water absorbent resin powder swelled with load or without load. A typical measurement method of "liquid permeability" includes SFC (Saline Flow Conductivity) or GBP (Gel Bed Permeability).

The term "SFC (saline flow conductivity)" represents a liquid permeability of 0.69% by weight of sodium chloride aqueous solution for a water absorbent resin powder with load of 2.07 kPa. SFC is measured by SFC testing method described in the specification of U.S. Pat. No. 5,669,894. The term "GBP" represents a liquid permeability of 0.69% by weight of sodium chloride aqueous solution for a water absorbent resin powder with load or in free expansion. GBP is measured by GBP testing method described in WO 2005/016393.

(1-7) "Initial Color Hue" and "Color Hue Over Time"

The term "initial color hue" used herein means color hue of a water absorbent resin right after the production or color hue of a water absorbent resin right after the shipment to a user. In general, it is controlled for color hue before shipment from factory. The term "color hue over time" used herein means color hue of a water absorbent resin after storage for long periods at unused condition or after the distribution. Examples of the color hue measurement method include those described in WO 2009/005114 (EP patent No. 2163302) (for example, Lab values, YI values, WB values, and the like).

Furthermore, a change from the initial color hue is referred to as the "coloration over time". The coloration of a water absorbent resin over time causes product value of a disposable diaper lower. Then, the coloration over time serves as one of the management indices. The coloration over time occurs over several months to several years, and it is determined by acceleration test described in WO 2009/005114 (EP patent No. 2163302) (acceleration test under high temperature and high humidity).

(1-8) Others

The term "X to Y" indicating a range, used herein, represents "X or more and Y or less". The symbol "t (ton)" which is a unit of weight represents "Metric ton". The unit "ppm" represents "ppm by weight" or "ppm by mass" if not otherwise specified. In the present description "mass" and "weight", "% by mass" and "% by weight", and "parts by mass" and "parts by weight" have the same meaning as each other. The term "-acid (salt)" represents "-acid and/or a salt thereof", and the term "(meth)acryl" represents "acryl and/or methacryl".

[2] Method for Producing Polyacrylic Acid (Salt)-Type Water Absorbent Resin Powder One method of the methods for producing a water absorbent resin powder of the present invention is a production method intended for an enhancement of the water absorption rate (FSR), characterized by performing fine powder recovery, and performing drying under particular conditions, and still more preferably, a foaming step of a water-containing gel-like crosslinked polymer is carried out. Through the production method according to the present invention, the water absorption rate (FSR) of the water absorbent resin powder thus obtained increases, and a balance between the water absorption rate and liquid permeability (SFC) can be performed. Furthermore, the method is preferable because it is not necessary to use highly expensive raw materials or apparatuses, while maintaining, or without greatly impairing, other physical properties of a water absorbent resin powder, such as bulk density, surface tension, water absorption capacity under load, and impact resistance. Meanwhile, the term "foaming step of a water-containing gel-like crosslinked polymer" used herein means that a water-containing gel-like crosslinked polymer containing gas bubbles is obtained in a polymerization step for an aqueous solution of acrylic acid (salt)-type monomer or in a drying step for the water-containing gel-like crosslinked polymer.

(2-1) Aqueous Solution of Acrylic Acid (Salt)-Type Monomer

An aqueous solution of acrylic acid (salt)-type monomer used herein refers to an aqueous solution of monomers including acrylic acid (salt) as a main component, which is prepared to contain, as necessary, the components that constitute a water absorbent resin powder, such as a crosslinking agent, a graft component, and trace components (a chelating agent, a surfactant, a dispersant, and the like), and is supplied to polymerization in an unchanged state, only with a polymerization initiator being added thereto. Hereinafter, the aqueous solution of acrylic acid (salt)-type monomer may be simply referred to as "aqueous monomer solution."

The acrylic acid (salt) may be unneutralized or may be in a salt form (a completely neutralized form or a partially neutralized form), and the aqueous monomer solution may have a concentration over the saturation concentration, while a supersaturated aqueous solution or aqueous slurry solution (aqueous dispersion liquid) of acrylic acid (salt) is also used as the aqueous monomer solution of the present invention. Meanwhile, from the viewpoint of the physical properties of the water absorbent resin powder thus obtained, it is preferable to use an aqueous monomer solution at a concentration lower than or equal to the saturation concentration. Furthermore, the solvent for the monomer is preferably water, and the acrylic acid (salt)-type monomer is handled as an aqueous solution. Here, the "aqueous solution" is such that 100% by weight of water as the entire solvent is not limited, and 0 to 30% by weight, and preferably 0 to 5% by weight of a water-soluble organic solvent (for example, an alcohol etc.) may be used in combination. In the present invention, these are regarded as aqueous solutions.

The "aqueous solution of acrylic acid (salt)-type monomer during blending" used herein refers to an aqueous solution of acrylic acid (salt) before all the constituent components are incorporated into the aqueous monomer solution containing acrylic acid (salt) as main component, as described above, and specifically corresponds to an aqueous acrylic acid solution, or a completely neutralized or partially neutralized aqueous solution of an acrylic acid salt. When the aqueous solution of acrylic acid (salt)-type monomer during blending is further neutralized, water as a solvent is mixed to the aqueous solution, or the trace components and the like described above are mixed, the final aqueous solution of acrylic acid (salt) monomer is obtained. Meanwhile, in regard to this final aqueous solution of acrylic acid (salt)-type monomer, the state before the aqueous solution is introduced into a polymerizing apparatus, or the state after the aqueous solution has been introduced into a polymerizing apparatus but before polymerization begin, is referred to as an "aqueous solution of acrylic acid (salt)-type monomer after mixing and before the polymerization step."

(a) Monomers (Excluding Crosslinking Agent)

The acrylic acid (salt)-type monomer of the present invention is not particularly limited as long as the monomer forms a water absorbent resin powder by polymerization, and examples thereof include anionic unsaturated monomers (salts) such as (meth)acrylic acid, maleic acid (or anhydride thereof), fumaric acid, itaconic acid, cinnamic acid, acrylonitrile, vinylsulfonic acid, allyltoluenesulfonic acid, vinyltoluenesulfonic acid, styrenesulfonic acid, 2-(meth)acrylamido-2-methylpropanesulfonic acid, 2-(meth)acryloylethanesulfonic acid, 2-(meth)acryloylpropanesulfonic acid, and 2-hydroxyethyl (meth)acryloylphosphate; nonionic unsaturated monomers such as 2-hydroxyethyl (meth)acrylate and 2-hydroxypropyl (meth)acrylate; mercapto group-containing unsaturated monomers; phenolic hydroxyl group-containing unsaturated monomers; amide group-containing unsaturated monomers such as (meth)acrylamide, N-ethyl (meth)acrylamide, and N,N-dimethyl (meth)acrylamide; and amino group-containing unsaturated monomers such as N,N-dimethylaminoethyl (meth)acrylate, N,N-dimethylaminopropyl (meth)acrylate, N,N-dimethylaminopropyl (meth)acrylamide, and the like. These acrylic acid (salt)-type monomers may be used individually or in combination of two or more kinds. A hydrophobic unsaturated monomer may also be used to the extent that hydrophilicity of the hydrogel thus obtained is not severely impaired. Examples of the hydrophobic unsaturated monomer include methyl (meth)acrylate, ethyl (meth)acrylate, butyl (meth)acrylate, vinyl acetate, vinyl propionate and the like.

The content (amount of use) of the acrylic acid (salt)-type monomer is usually 50% by mole or greater, preferably 70% by mole or greater, more preferably 80% by mole or greater, still more preferably 90% by mole or greater, and particularly preferably 95% by mole or greater (the upper limit is 100% by mole), relative to the total amount of the monomers (excluding the crosslinking agent). Meanwhile, the polyacrylic acid (salt) according to the present invention is a concept which is not limited to unneutralized polymer (neutralization rate: 0% by mole) and includes partially neutralized or completely neutralized (neutralization rate: 100% by mole).

In order to solve the problems of the present invention (enhancement of water absorption rate), it is preferable that at least a portion of the acid groups of the hydrogel be neutralized. The neutralization can be carried out before polymerization, during polymerization, or after polymerization of acrylic acid. In view of enhanced productivity of the water absorbent resin powder, the AAP (water absorption capacity under load) or the like, it is preferable to perform neutralization before polymerization. That is, it is preferable to use neutralized acrylic acid (still more preferably, a partially neutralized salt of acrylic acid) as a monomer. Meanwhile, as disclosed in Patent Literature 105 which is described late, neutralization of a water-containing gel-like crosslinked polymer after polymerization requires high shear force. Thus, when neutralization is carried out after polymerization of the foaming polymerization which is described late, the gas bubbles present in the water-containing gel-like crosslinked polymer may be squashed or become microscopically non-uniform, and thereby the reactivity of the surface crosslinking agent (particularly, the dehydration reactive surface crosslinking agent which is described late) may decrease. Thus, from the viewpoints of the water absorption rate and other physical properties, it is not suitable for the present invention to carry out neutralization after polymerization.

The partially neutralized salt of acrylic acid (acrylic acid (salt)) is not especially limited, however, in view of water-absorbing performance such as absorption capacity (CRC) or water absorption rate (FSR) of the water-absorbent resin powder, obtained as a final product, the acrylic acid (salt)-type monomer or the water-containing gel-like crosslinked polymer after polymerization may be partially or entirely in a salt form, it is preferably a monovalent salt of acrylic acid selected from an alkali metal salt, alkaline earth metal salts, an ammonium salt, hydroxyammonium salt, amine salt and alkylamine salt of acrylic acid; more preferably alkali metal salt of acrylic acid; and still more preferably acrylic acid salt selected from sodium salt, lithium salt and potassium salt. Among them, from the viewpoint of cost, sodium salt of acrylic acid is particularly preferred. Therefore, although there are no particular limitations, the basic substance that is used for the neutralization of acrylic acid as a monomer or a hydrogel after polymerization is preferably a monovalent basic substance, such as a hydroxide of an alkali metal such as sodium hydroxide, potassium hydroxide, or lithium hydroxide, or a (hydrogen) carbonate such as sodium (hydrogen) carbonate or potassium (hydrogen) carbonate; and is particularly preferably sodium hydroxide.

The neutralization rate of the neutralized acrylic acid (salt)-type monomer or the water-containing gel-like crosslinked polymer after polymerization is not particularly limited, but from the viewpoints of the physical properties of the water absorbent resin powder thus obtained and the reactivity of the surface crosslinking agent, the neutralization rate is preferably 30% to 100% by mole, more preferably 40% to 100% by mole, still more preferably 50% to 100% by mole, further still more preferably 65% to 100 (particularly, 90) % by mole, and most preferably 70% to 100 (particularly, 80) % by mole.

Although there are no particular limitations, the temperature at the time of neutralization (neutralization temperature) is appropriately determined to be preferably 10° C. to 100° C., and still more preferably 30° C. to 90° C. In addition, preferred conditions for the neutralization treatment are illustrated in EP Patent No. 574 260, and the conditions described in the publication can also be applied to the present invention. Meanwhile, for the applications which have a possibility of being brought into contact with human body, such as disposable diapers, neutralization after polymerization is not required.

Meanwhile, from the viewpoint of the acid odor of the water absorbent resin powder thus obtained, it is preferable that the content of acetic acid or propionic acid in the acrylic acid used is smaller, and for example, the content of propionic acid is preferably less than 400 ppm, more preferably less than 300 ppm, and particularly preferably 100 ppm or less, relative to acrylic acid, and/or the content of acetic acid is preferably less than 1,000 ppm, more preferably less than 500 ppm, and particularly preferably 200 ppm or less, relative to acrylic acid.

(b) Crosslinking Agent (Internal Crosslinking Agent)

Furthermore, when a hydrogel of a water-swellable polymer is obtained, for example, (poly)ethylene glycol di(meth)acrylates such as ethylene glycol diacrylate, ethylene glycol dimethacrylate, diethylene glycol diacrylate, diethylene glycol dimethacrylate, triethylene glycol diacrylate, triethylene glycol dimethacrylate, polyethylene glycol diacrylate, and polyethylene glycol dimethacrylate; and internal crosslinking agents such as (poly)propylene glycol di(meth)acrylate, trimethylolpropane triacrylate, trimethylolpropane trimethacrylate, pentaerythritol diacrylate, pentaerythritol dimethacrylate, pentaerythritol triacrylate, pentaerythritol trimethacrylate, pentaerythritol hexa(meth)acrylate, glycerin tri(meth)acrylate, glycerin acrylate methacrylate, ethylene oxide-modified trimethylolpropane tri(meth)acrylate, N,N'-methylenebis(meth)acrylamide, triallyl isocyanurate, triallyl cyanurate, triallyl isocyanurate, triallyl phosphate, triallylamine, poly(meth)allyloxyalkane, (poly)ethylene glycol diglycidyl ether, glycerol diglycidyl ether, ethylene glycol, polyethylene glycol, propylene glycol, glycerin, 1,4-butanediol, pentaerythritol, ethylenediamine, ethylene carbonate, propylene carbonate, polyethyleneimine and glycidyl (meth)acrylate, may be used in combination with the monomers described above. Among these, one kind or two or more kinds can be used in consideration of reactivity, and among them, it is preferable to use a compound having two or more polymerizable unsaturated groups.

The amount of use of the internal crosslinking agent can be appropriately determined based on the desired physical properties of the water absorbent resin powder, but the amount of use is preferably 0.0001% to 5% by mole, more preferably 0.001% to 2% by mole, still more preferably 0.005% to 1% by mole, particularly preferably 0.01% to 0.5% by mole, and most preferably 0.01% to 0.2% by mole, relative to the total amount of the acrylic acid (salt)-type monomer. If the amount of use is less than 0.0001% by mole, the extractables of the water absorbent resin powder thus obtained may become so large that a sufficient amount of water absorption under pressure may not be secured. On the other hand, if the amount of use is greater than 5% by mole, the crosslinking density of the water absorbent resin powder thus obtained is high, and the amount of water absorption becomes insufficient. Meanwhile, the internal crosslinking agent may be added all at once, or may be added in divided portions.

(c) Other Components of Aqueous Monomer Solution

Furthermore, in order to improve the various physical properties of the water absorbent resin powder thus obtained, water-soluble resins or water absorbent resins such as starch, cellulose, polyvinyl alcohol (PVA), polyacrylic acid (salt), and polyethyleneimine; various foaming agents (carbonates, azo compounds, gas bubbles, and the like), surfactants, additives which is described late, and the like can be added as optional components to the aqueous solution of acrylic acid (salt), hydrogel after polymerization, or a dried substance or powder thereof. In the case of a water-soluble resin or water absorbent resin such as described above, the amount of addition is preferably 0% to 50% by weight, more preferably 0% to 20% by weight, still more preferably 0% to 10% by weight, and particularly preferably 0% to 3% by weight, relative to the amount of the monomers. Furthermore, in the case of a foaming agent, a surfactant and an additive such as described above, the amount of addition is preferably 0% to 5% by weight, and more preferably 0% to 1% by weight, relative to the amount of monomers. Meanwhile, the use of the water-soluble resin or water absorbent resin at the time of polymerization yields a graft polymer or a water absorbent resin composition; however, in the present invention, a starch-acrylic acid polymer, a PVA-acrylic acid polymer and the like are also collectively referred to as polyacrylic acid (salt)-type water absorbent resins.

(Surfactant/Dispersant)

According to the present invention, in order to solve the problems of the present invention more effectively for the purpose of enhancing the water absorption rate or the like, when a foaming step of a water-containing gel-like crosslinked polymer (foaming polymerization or foaming drying; particularly, foaming polymerization) is carried out, the techniques which is described late can be appropriately applied. However, a preferred foaming polymerization method is to use an aqueous solution of acrylic acid (salt)-type monomer containing gas bubbles. This inclusion of gas bubbles can be verified by clouding or volume expansion (for example, preferably 1.01 to 10 times, and more preferably 1.01 to 1.1 times) due to gas bubbles in the aqueous solution of acrylic acid (salt)-type monomer, and the like.

Furthermore, in the case of carrying out foaming polymerization, the gas bubbles can be stably suspended by adding a surfactant and/or a dispersant to the aqueous solution of acrylic acid (salt) monomer during blending, or after blending and before the polymerization step. Also, a water absorbent resin powder having desired physical properties is obtained by appropriately designing the type, amount of addition and the like of the surfactant or the dispersant. Meanwhile, the surfactant is preferably a non-polymeric compound, and the dispersant is preferably a polymeric compound. Furthermore, for an increase in the water absorption rate, it is preferable to use a surfactant or a dispersant, more preferably a surfactant, and still more preferably a surfactant and a dispersant.

The amount of addition of the surfactant and/or dispersant is appropriately designed depending on the type, and the specific values will be described late. However, preferably, the surfactant and/or dispersant is added to the aqueous solution of acrylic acid (salt)-type monomer such that the surface tension of the water absorbent resin powder thus obtained is 60 [mN/m] or greater, and more preferably to be in the range described in section "(3-7) Surface tension." If the surface tension is less than 60 [mN/m], the amount of return after liquid once absorbed tends to increase at the time of use of disposable diapers, which is not preferable. Meanwhile, in order to prevent a decrease in the surface tension, it is preferable to use a surfactant which is reactive or polymerizable with the water absorbent resin powder or the acrylic acid (salt)-type monomer, for example, a surfactant having an unsaturated polymerizable group (particularly, an α,β-unsaturated double bond) or a reactive group (a hydroxyl group or an amino group); and it is also preferable to use a hydrophilic surfactant (HLB: 1 to 18, particularly 8 to 15) having high solubility in water.

(Surfactant)

According to the present invention, there are no particular limitations on the surfactant that can be used, and examples include the surfactants disclosed in Patent Literature 35 or Patent Literature 37, that is, nonionic surfactants, anionic surfactants, cationic surfactants, and amphoteric surfactants. These surfactants may also be surfactants that are polymerizable or reactive with the acrylic acid (salt)-type monomer or the water absorbent resin powder.

Examples of the nonionic surfactants include polyoxyalkylene alkyl ethers such as polyoxyethylene lauryl ether, polyoxyethylene cetyl ether, polyoxyethylene stearyl ether, and polyoxyethylene oleyl ether; polyoxyalkylene alkyl phenyl ethers such as polyoxyethylene octyl phenyl ether and polyoxyethylene nonyl phenyl ether; polyoxyalkylene alkyl amino ethers such as polyoxyethylene lauryl amino ether and polyoxyethylene stearyl amino ether; sorbitan fatty acid esters such as sorbitan monolaurate, sorbitan monopalmitate, sorbitan monostearate, and sorbitan monooleate; polyoxyalkylene sorbitan fatty acid esters such as polyoxyethylene sorbitan monolaurate, polyoxyethylene sorbitan monopalmitate, polyoxyethylene sorbitan monostearate, and polyoxyethylene sorbitan monooleate; polyalkylene glycol fatty acid esters such as polyethylene glycol monolaurate, polyethylene glycol monooleate, polyethylene glycol monostearate, polyethylene glycol dilaurate, and polyethylene glycol distearate; and glycerin fatty acid esters such as lauric acid monoglyceride, stearic acid monoglyceride, oleic acid monoglyceride, and the like.

Examples of the anionic surfactants include salts of sulfuric acid ester such as sodium polyoxyethylene lauryl ether sulfate, sodium polyoxyethylene octyl phenyl ether sulfate, sodium polyoxyethylene nonyl phenyl ether sulfate, triethanolamine lauryl sulfate, sodium lauryl sulfate, potassium lauryl sulfate, and ammonium lauryl sulfate; salt of sulfonic acid such as sodium dodecylbenzenesulfonate, sodium alkylnaphthalenesulfonate, and sodium dialkylsulfosuccinate; and salts of phosphate ester such as potassium alkyl phosphate, and the like.

Examples of the cationic surfactants include quaternary ammonium salts such as lauryltrimethylammonium chloride, stearyltrimethylammonium chloride, cetyltrimethylammonium chloride, stearyltrimethylammonium chloride, and the like.

Furthermore, in addition to the surfactants described above, silicone-type surfactants may also be used. Examples of the silicone-type surfactants include anionic, nonionic and cationic silicone-type surfactants, as well as polyoxyalkylene-modified silicone-type surfactants etc., and specific examples include polyoxyethylene-modified dimethylpolysiloxane, polyoxyethylene-polyoxypropylene block or random copolymer-modified dimesylpolysiloxane, dimethylpolysiloxane modified with a polyoxyethylene having alkyl groups each having 1 to 12 carbon atoms at the chain ends, dimethylpolysiloxane modified with a polyoxyethylene-polyoxypropylene block or random copolymer having alkyl groups each having 1 to 12 carbon atoms at the chain ends, and polyoxyalkylene modification products of a dimethylpolysiloxane derivative having an amino group, an epoxy group or the like at the chain ends and/or in the interior of the molecule of dimethylpolysiloxane, and the like. Among these, polyoxyethylene-modified dimethylpolysiloxane, and polyoxyethylene-polyoxypropylene block or random copolymer-modified dimesylpolysiloxane are preferred, and polyoxyethylene-modified dimethylpolysiloxane is more preferred because it can be industrially available at low cost.

These surfactants may be used singly, or two or more kinds may be used in combination. Furthermore, the surfactants may also be used in combination with the dispersants (particularly, polymer dispersants) which is described late. Among these surfactants, from the viewpoint of effect, it is preferable to use an anionic surfactant, a nonionic surfactant or a silicone-type surfactant, and it is still more preferable to use a nonionic surfactant or a silicone-type surfactant.

The amount of addition of the surfactant is appropriately determined in accordance with the type of the surfactant or the intended physical properties (particularly, the water absorption rate or surface tension), but the amount of addition is preferably greater than 0 and less than or equal to 2% by weight, more preferably greater than 0 and less than or equal to 0.03% by weight, still more preferably greater than 0 and less than or equal to 0.015% by weight, particularly preferably greater than 0 and less than or equal to 0.01% by weight, and most preferably greater than 0 and less than or equal to 0.0085% by weight, relative to the total amount of the monomers used. Meanwhile, the amount of addition of the surfactant is also similarly applied to the water absorbent resin powder thus obtained. If the amount of addition is greater than 2% by weight, it is difficult to control foaming at the time of polymerization reaction, and therefore, it is not preferable. Furthermore, since the surfactant excessively decreases the surface tension of the water absorbent resin powder, the amount of return after liquid once absorbed increases, at the time of the use of disposable diapers and the like, which is not preferable.

Furthermore, the surfactant of a trace amount is preferably at a concentration of greater than 0 ppm, and particularly preferably 0.1 ppm or greater, more preferably in the order of 1 ppm or greater, 5 ppm or greater, and 10 ppm or greater, in order to enhance the physical properties of the water absorbent resin powder after surface crosslinking or after powder transport.

(Dispersant)

According to the present invention, it is preferable to incorporate a dispersant in order to solve the objects of the present invention more effectively. There are no particular limitations on the dispersant, and a water absorbent polymer dispersant or a hydrophilic polymer dispersant exhibiting water absorbency is preferred, while a water-soluble polymer dispersant is more preferred. Furthermore, the weight average molecular weight is appropriately determined depending on the type of the dispersant, but the weight average molecular weight is preferably 500 to 10,000,000, more preferably 5,000 to 5,000,000, and particularly preferably 10,000 to 3,000,000.

The type of the dispersant is not particularly limited, and examples thereof include hydrophilic polymers such as starch, starch derivatives, cellulose, cellulose derivatives, polyvinyl alcohol (PVA), carboxymethyl cellulose (sodium), hydroxyethyl cellulose, polyacrylic acid (salt), a crosslinked product of polyacrylic acid (salt). Among them, from the viewpoint of the effect of the present invention, a water-soluble polymer dispersant selected from starch, cellulose and PVA is preferred. The amount of use of these dispersants is preferably 0 parts to 50 parts by weight, more preferably 0.01 parts to 20 parts by weight, still more preferably 0.05 parts to 10 parts by weight, and particularly preferably 0.1 parts to 5 parts by weight, relative to 100 parts by weight of the acrylic acid (salt)-type monomer. Furthermore, the amount of the dispersant is similarly applied also to the water absorbent resin powder thus obtained.

If the amount of use of the dispersant is greater than 50 parts by weight, it is not preferable because it is difficult to control foaming at the time of the polymerization reaction. Furthermore, it is not preferable because the water absorption capacity and the like of the water absorbent resin powder is excessively decreased, and the amount of return after liquid once absorbed increases at the time of use in disposable diapers and the like.

(Polymerization Inhibitor)

In order to solve the objects of the present invention more effectively, the acrylic acid (salt)-type monomer of the present invention contains a polymerization inhibitor. The polymerization inhibitor is not particularly limited, but examples include the N-oxyl compounds, manganese compounds, substituted phenol compounds and the like disclosed in WO 2008/096713 (US-A-2010-0009846). Among them, substituted phenols are preferred, and methoxyphenol compounds are particularly preferred.

Examples of the methoxyphenol compounds include o-, m- and p-methoxyphenols, methoxyphenols having one or two or more substituents such as a methyl group, a t-butyl group, and a hydroxyl group and the like, but in the present invention, p-methoxyphenol is particularly preferred.

Meanwhile, the content of the methoxyphenol compounds in the acrylic acid (salt)-type monomer is preferably 200 ppm or less relative to acrylic acid. Furthermore, the content is more preferably 10 ppm to 200 ppm, preferably in the order of 5 ppm to 160 ppm, 10 ppm to 160 ppm, 10 ppm to 100 ppm, and 10 ppm to 80 ppm, and most preferably 10 ppm to 70 ppm.

As will be described in Example 2-12/Example 2-13 below, if the content is greater than 200 ppm, there is a risk that the color hue of the water absorbent resin powder thus obtained may deteriorate (coloration such as yellow tinge or yellowing), and therefore, it is not preferable. Furthermore, if the content is less than 5 ppm, that is, when p-methoxyphenol is removed by purification such as distillation, the risk of causing polymerization increases before intended polymerization begins, and the weather resistance of the water absorbent resin powder thus obtained decreases, which is not preferable. Meanwhile, the term "weather resistance" means, as will be defined in the Examples, the absolute amount of increment of the extractables by light, and a smaller value is more preferred.

(2-2) Polymerization Step

The present step is a step of polymerizing an acrylic acid (salt)-type monomer (aqueous solution), and obtaining a water-containing gel-like crosslinked polymer (hereinafter, referred to as "hydrogel").

In regard to the production method of the present invention, it is preferable to carry out a step of incorporating gas bubbles into a hydrogel (a step for obtaining a hydrogel in which gas bubbles are incorporated) in the polymerization step from the viewpoints of water absorption rate and liquid permeability, and therefore, foaming polymerization or boiling polymerization which is described late is more preferred, while foaming polymerization is still more preferred. In the present specification, a step of generating gas bubbles at the time of polymerization (during polymerization) means boiling polymerization, or polymerization using a foaming agent which generates a gas by heat of polymerization. A step of generating gas bubbles immediately before polymerization means foaming polymerization of incorporating gas bubbles into the acrylic acid (salt)-type monomer before polymerization.

Meanwhile, according to the present invention, the term "foaming polymerization" means that the method includes a step of generating and incorporating gas bubbles into an aqueous monomer solution (foaming step), and polymerization is carried out in a state that the aqueous monomer solution at the time of polymerization has gas bubbles.

Furthermore, according to the present invention, the term "boiling polymerization" means that polymerization is carried out in a state that a component in the aqueous monomer solution or the hydrogel, particularly water, is boiling. At this time, gas bubbles are generated in the hydrogel due to water vapor.

In the production method of the present invention, when foaming polymerization is carried out, gas bubbles are generated and incorporated into the aqueous monomer solution according to the following method (A) ((A) foaming step), and then polymerization is carried out ((B) polymerization method). Thereby, a gas bubble incorporation step is carried out. Furthermore, in the case of boiling polymerization, known methods are applied without any particular limitations; however, polymerization can be carried out according to the following method (B) without the foaming step of (A). Furthermore, even when the polymerization step with the gas bubble incorporation step is not selected, polymerization can be carried out according to the following method (B).

(A) Foaming Step

According to the present invention, when foaming polymerization is carried out, preferably, a step of incorporating gas bubbles into the acrylic acid (salt)-type monomer or water-containing gel-like polymer is included.

There are no particular limitations on the method of incorporating gas bubbles, but for example, a method of incorporating gas bubbles by introducing or generating the gas bubbles (an inert gas is preferred, and nitrogen gas is particularly preferred) in the acrylic acid (salt)-type monomer, and a method of using a foaming agent which generates gas bubbles at the time of polymerization, may be used. As the foaming agent, a foaming agent that is solid or liquid at ambient temperature is preferred, and a water-soluble solid foaming agent is particularly preferred. Specific examples include organic or inorganic carbonate compounds generating $CO_2$ (particularly, inorganic carbonates, hydrogen carbonates, urea compounds, alkylene carbonates, and the like), azo compounds generating N2 (particularly, water-soluble azo compounds, and the like), and the like. The technology of performing foaming polymerization is described in Patent Literatures 24 to 42 etc. described above, and can be appropriately used.

In the present specification, examples of the method of generating and incorporating gas bubbles in an aqueous monomer solution include (A-1) a method of introducing a gas or a method of using a foaming agent or the like; and (A-2) a method of decreasing the solubility of a dissolved gas. Together with the methods of (A-1) and (A-2), it is preferable to dissolve and/or disperse gas bubbles in the aqueous solution of acrylic acid (salt)-type monomer in the presence of a surfactant and/or dispersant, and thereby gas bubbles enable to be dispersed in these effectively as fine gas bubbles (microbubbles or nanobubbles).

(A-1) Method of Introducing Gas or Method of Using Foaming Agent

As an embodiment for generating and incorporating gas bubbles in the aqueous monomer solution in the present invention, various foaming agents in the form of gas, liquid or solid can be used. Among these, preferably a solid foaming agent (preferably, a carbonate) or a gas, still more preferably a compound which is gas at ambient temperature, and particularly preferably an inert gas, is introduced. At that time, the surfactants and/or dispersants described above are preferably used.

In order to introduce gas bubbles into the monomer at the time of polymerization, the methods described in Patent Literatures 35 to 37 may be used, and among them, the methods described in JP Patent Application No. 2010-179515 (filing date: Aug. 10, 2010) and PCT/JP2010/073254 (international filing date: Dec. 24, 2010) can be particularly preferably used.

(a) Gas

There are no particular limitations on the gas, but examples include oxygen, air, nitrogen, carbon dioxide, ozone, and mixtures thereof, or the like. Preferred examples include air, nitrogen, and carbon dioxide, or the like. Furthermore, from the viewpoints of polymerizability and cost, air and nitrogen are particularly preferred. The pressure employed when these gases are introduced or the pressure after these gases have been introduced is appropriately determined to be under ordinary pressure, under pressurization or under reduced pressure. Furthermore, as the method for introducing a gas, known methods such as a static mixer system, a cavitation system, and a venturi system can be appropriately used, and these methods may be used in combination. Furthermore, it is preferable to introduce microbubbles or nanobubbles, because the amount of gas introduction can be made large.

(b) Expansion Factor

When gas bubbles are incorporated into the monomer at the time of polymerization, the volume of the aqueous monomer solution expands as a result of addition of a foaming agent or introduction of a gas. However, the expansion factor of the volume of the aqueous monomer solution immediately before polymerization, relative to in the case where addition of a foaming agent or introduction of a gas is not applied, is preferably 5 times or less as the upper limit, and more preferably in the order of 3 times or less, 2 times or less, 1.1 times or less, 1.05 times or less, 1.04 times or less, and 1.02 times or less. Furthermore, the expansion factor is preferably greater than 1 time as the lower limit, and particularly preferably 1.01 times or greater. Meanwhile, the expansion factor is preferably such that the value immediately before polymerization is in the range described above. Conventionally, methods of carrying out polymerization in a state in which a large amount of gas bubbles are dispersed have been known; however, since polymerization of the present invention is carried out without excessively dispersing gas bubbles, there is almost no decrease in the bulk density. Meanwhile, the expansion factor can be easily measured by comparing the volumes of aqueous monomer solutions having the same weight at the same temperature by using a graduated cylinder, a graduated flask or the like.

(c) Particle Size of Gas Bubbles

Furthermore, in the case of using microbubbles or nanobubbles as the gas to be introduced into the aqueous monomer solution, the volume average particle size is preferably 500 µm or less, and more preferably 100 µm or less. Furthermore, the volume average particle size is preferably 50 nm (more preferably, 10 µm) to 500 µm, more preferably 100 nm (more preferably, 10 µm) to 100 µm, still more preferably 50 µm or less, particularly preferably 20 µm or less, and most preferably 5 µm or less. In order to satisfy the above expansion factor, it is preferable to use microbubbles or nanobubbles having a small volume average diameter.

Meanwhile, the size or number of the gas bubbles can be measured by (a) a laser diffraction scattering method (also known as a static light scattering method), (b) a dynamic light scattering method, (c) an electrical detection band method (usually known as Coulter counter method), (d) a particle counter method (light scattering system or light interception system), (e) visualization method involving camera imaging, (f) an interference image method involving laser light and CCD cameras, or the like. The gas bubbles in the order of nanometers can be measured by (a) a laser diffraction scattering method, or (b) a dynamic light scattering method. Among them, a light scattering method is preferred, and a dynamic light scattering method is particularly preferred.

(d) Foaming Agent

Examples of the foaming agent that is used in the present invention include reactive foaming agents such as carbonates and azo compounds; and foaming agents that vaporize as a result of an increase in the temperature of low-boiling point organic solvents etc.; and the like. Among them, sodium carbonate, sodium hydrogen carbonate, and azo compounds are preferred, and sodium hydrogen carbonate is particularly preferred from the viewpoint of handleability.

(A-2) Method for Decreasing Solubility of Dissolved Gas

According to the present invention, as the method for introducing gas bubbles into the aqueous monomer solution in the foaming polymerization, a method of generating gas bubbles by decreasing the solubility of a dissolved gas is preferably used.

That is, the method of incorporating gas bubbles in the present invention is preferably the method described in JP Patent Application No. 2010-179515 (filing date: Aug. 10, 2010) or PCT/JP2010/073254 (international filing date: Dec. 24, 2010), the disclosures of which are incorporated in the present specification. That is, the method of dissolving and/or dispersing gas bubbles into the aqueous solution of acrylic acid (salt)-type monomer is a method of generating a dissolved gas contained in the aqueous solution, in the presence of a surfactant and/or dispersant, without introducing a gas (for example, an inert gas) into the aqueous monomer solution, and effectively dispersing this dissolved gas into fine gas bubbles (microbubbles or nanobubbles). Specifically, at least one of the following method (a) or method (b) is used.

(1) Method (a) Method Based on Increase in Temperature of Aqueous Solution of Acrylic Acid (Salt)-Type Monomer According to the present invention, the method (a) is a method of increasing the temperature of an aqueous monomer solution prepared by mixing an acrylic acid (salt)-type monomer, an internal crosslinking agent and water, or the temperature of an aqueous monomer solution prepared by incorporating various trace components to the aforementioned aqueous solution, and thereby decreasing the solubility of a gas in the aqueous solution. At this time, if a surfactant and/or a dispersant is contained in the aqueous monomer solution, the gas bubbles generated are stably dispersed at a desired particle size (preferably 500 µm or less), which is preferable.

The temperature increase can be carried out by using a heat exchanger composed of piping and/or containers, electron irradiation, or the like. The temperature for the temperature increase is desirably a high temperature capable of decreasing the solubility of a gas, and specifically, the temperature is preferably 40° C. to the boiling point of the aqueous monomer solution, more preferably 50° C. to 100° C., still more preferably 60° C. to 98° C., and most preferably 70° C. to 95° C. Furthermore, the time for the temperature increase is such that it is preferable to heat the aqueous monomer solution rapidly in a short time in order to generate a large amount of gas bubbles, and specifically, the time is preferably 60 seconds or less, more preferably 30 seconds or less, and particularly preferably 10 seconds or less.

Furthermore, an example of the method for the temperature increase may be a method of utilizing neutralization heat, and this can also be used in combination with the temperature increase caused by a heat exchanger or electron irradiation. The method of utilizing neutralization heat is to utilize the neutralization heat generated when the degree of neutralization rate of the monomer is increased (neutralization reaction) (13.9 [kcal/mol] (25° C.)), and in the present invention, a single-stage neutralization or multistage neutralization (second-stage neutralization or more) may be used. The neutralization reaction (neutralization step) may be of a continuous type or a batch type, and the step may be single-stage neutralization or multistage neutralization up to a predetermined neutralization rate. Furthermore, in order to increase the amount of gas bubbles generated at the time of the temperature increase, a gas may be dissolved or dispersed in advance in the aqueous monomer solution before the temperature increase.

As a method based on the increase in the temperature of the aqueous solution of acrylic acid (salt)-type monomer, FIG. 4 presents an example. FIG. 4 is a schematic diagram illustrating that oil 2 is placed in a constant temperature bath 1 for the temperature increase of the aqueous monomer solution, and a stainless steel coil 3 is immersed in the constant temperature bath 1. The aqueous monomer solution is supplied through the stainless steel coil in the direction of the arrow shown in the diagram, and thereby passes through the heated oil.

(2) Method (b) Method Based on Mixing of Water-Soluble Organic Substance

According to the present invention, the method (b) is a method of incorporating a water-soluble organic substance in which a gas is not dissolved or is sparingly dissolved, into the acrylic acid (salt)-type monomer, or into an aqueous monomer solution prepared by mixing the monomer with an internal crosslinking agent and water, and thereby decreasing the solubility of the gas in the aqueous solution. For example, a method of mixing a monomer that does not contain a gas, with an aqueous solution of acrylic acid (salt)-type monomer containing a gas (dissolved therein), which causes a gas that may not be dissolved in the aqueous solution after the mixing to be generated, and dispersing the gas into fine gas bubbles, may be used. At this time, if the aqueous monomer solution contains a surfactant and/or a dispersant, the particle size of the gas bubbles becomes a suitable size (preferably, 500 µm or less), and therefore, it is preferable. Furthermore, particularly, a method of adding a surfactant and/or a dispersant into an aqueous solution of acrylic acid (salt)-type monomer during blending or after blending before the polymerization step, and subsequently further incorporating a water-soluble organic substance into the aqueous solution of acrylic acid (salt)-type monomer before the polymerization step, is preferred.

(3) Dissolved Gas in Method for Decreasing Solubility of Dissolved Gas

The volume average particle size of the gas bubbles that are introduced into the aqueous solution of acrylic acid (salt)-type monomer by the method (a) and/or the method (b), is 500 µm or less, preferably 50 nm (more preferably 10 µm) to 500 µm, more preferably 100 nm (more preferably 10 µm) to 100 µm, still more preferably 50 µm or less, particularly preferably 20 µm or less, and most preferably 5 µm or less. The volume average particle size is also applied in the case where gas bubbles are introduced into the aqueous solution of acrylic acid-type monomer by other means.

If the volume average particle size is less than 50 nm, the surface area of the water absorbent resin powder thus obtained is small, and an increase in the water absorption rate is not expected. On the contrary, if the volume average particle size is greater than 500 µm, since large closed gas bubbles are formed in the water absorbent resin powder thus obtained, the water absorbent resin powder has brittle strength.

The solubility of the gas is determined based on the type of the gas or the solvent, or temperature, and for example, gas solubilities in water at 25° C. are as follows: carbon dioxide: 1.05 [ml/ml], oxygen: 0.0285 [ml/ml], and nitrogen: 0.0147 [ml/ml]. The solubilities of these gases are decreased as a result of an increase in temperature, or incorporation of a water-soluble organic substance (preferably, acrylic acid). In the present invention, it is desirable to disperse the gas bubbles generated by a decrease in solubility, in the aqueous solution of acrylic acid (salt)-type monomer by means of a surfactant or a dispersant.

According to the present invention, in order to decrease the solubility of a gas by means of an increase in the temperature of the aqueous solution of acrylic acid (salt)-type monomer, and to thereby disperse the gas bubbles thus generated in the aqueous monomer solution, it is preferable to have a large amount of the gas dissolved in advance in the aqueous monomer solution. Therefore, the content of the dissolved gas in the aqueous monomer solution is preferably larger than 1 ppm, more preferably 2 ppm to 50,000 ppm, still more preferably 3 ppm to 30,000 ppm, and particularly preferably 3 ppm to 10,000 ppm.

(B) Polymerization Method (Polymerization Step)

Hereinafter, the polymerization method (polymerization step) that is applicable to the present invention will be described. In the present invention, polymerization is carried out according to the following method, irrespective of the presence or absence of a gas bubble incorporation step in the polymerization step.

The polymerization step (method) of the present invention can be carried out under ordinary pressure, under pressurization or under reduced pressure, but preferably, the polymerization step is carried out under ordinary pressure (or a pressure close to ordinary pressure; usually ±10 mm Hg). Meanwhile, from the viewpoint of the physical properties of the water absorbent resin powder thus obtained, a method of polymerizing a monomer (aqueous solution) containing gas bubbles as disclosed in Patent Literatures 35 to 37 and 44 mentioned above, and particularly in JP Patent Application No. 2010-179515 (WO PCT/JP2010/07254) etc., as well as a method of polymerizing a monomer (aqueous solution) containing a foaming agent as disclosed in Patent Literatures 24 to 34 etc., and a method of incorporating a foaming agent into a hydrogel during polymerization or after polymerization, and foaming the system after polymerization or during drying, may be used. Furthermore, in the case of foaming polymerization as well as in other cases, the polymerization methods described below are applicable.

(B-1) Polymerization Method

In the present invention, foaming polymerization is carried out by incorporating gas bubbles by the method described in the section (A-1) or (A-2), and then, performing polymerization. Furthermore, as the method of incorporating gas bubbles, a method of decreasing the dissolved gas is preferred, and among others, a method of decreasing the solubility of the gas in an aqueous solution by means of an increase in the temperature of the aqueous monomer solution in the presence of a surfactant (dispersant) is preferred.

According to the present invention, at the time of polymerizing the aqueous monomer solution, usually aqueous solution polymerization, reversed phase suspension polymerization or the like is employed from the viewpoints of the water absorption performance of the water absorbent resin powder thus obtained, the ease of the control of polymerization and the like. However, in order to solve the problems of the present invention, preferably aqueous solution polymerization, and more preferably continuous aqueous solution polymerization is employed. The aforementioned polymerization methods are preferably applied in, among others, the production in a huge scale with a large production amount per line of the water absorbent resin. The production amount is preferably 0.5 [t/hr] or greater, more preferably 1 [t/hr] or greater, still more preferably 5 [t/hr] or greater, and particularly preferably 10 [t/hr] or greater. Furthermore, preferred forms of the aqueous solution polymerization include continuous kneader polymerization (disclosed in, for example, U.S. Pat. No. 6,987,151 and U.S. Pat. No. 6,710,141 etc.), batch kneader polymerization (disclosed in, for example, U.S. Pat. No. 6,987,151 and U.S. Pat. No. 6,710,141 etc.), continuous belt polymerization (disclosed in, for example, U.S. Pat. No. 4,893,999, U.S. Pat. No. 6,241,928, and US-A-2005-215734 etc.), and the like. Among these, continuous belt polymerization is particularly preferred. In such aqueous solution polymerization, a water absorbent resin powder can be produced with high productivity.

Meanwhile, in order to solve the problems of the present invention, most preferred examples of the continuous aqueous solution polymerization include high temperature initiation polymerization in which the polymerization initiation temperature is preferably set to 30° C. or higher, more preferably 35° C. or higher, still more preferably 40° C. or higher, and particularly preferably 50° C. or higher (the upper limit is the boiling point); or high monomer concentration polymerization in which the monomer concentration is preferably set to 35% by weight or greater, more preferably 40% by weight or greater, and still more preferably 45% by weight or greater (the upper limit is the saturation concentration or 75% by weight or less). Even in the case of such high temperature initiation polymerization or high monomer concentration polymerization, according to the present invention, the stability of the monomer is excellent, and a white water absorbent resin powder is obtained. Therefore, more remarkable effects are exhibited under the conditions described above, and production in an industrial scale is facilitated. Meanwhile, the polymerization initiation temperature is defined as the liquid temperature of the aqueous monomer solution immediately before the supply to the polymerization reactor, but the conditions disclosed in U.S. Pat. No. 6,906,159 and U.S. Pat. No. 7,091,253 etc. can be preferably applied to the present invention.

Furthermore, in order to solve the problem of the present invention relevant to an enhancement of the water absorption rate (for example, FSR), it is preferable to carry out the continuous aqueous solution polymerization described above as foaming polymerization or boiling polymerization. In both cases, since gas bubbles are present in the hydrogel, the water absorption rate is accelerated. Meanwhile, the maximum temperature for boiling polymerization is equal to or higher than the boiling point, preferably 100° C. to 140° C., more preferably 105° C. to 130° C., and still more preferably 110° C. to 120° C. Furthermore, at that time, it is preferable that the solid content be increased by 1% by weight or greater, more preferably 2% by weigh or greater, and particularly preferably 5% by weight or greater, from the viewpoint of the physical properties.

Furthermore, these polymerization steps can be carried out even in an air atmosphere, but from the viewpoint of preventing coloration, it is preferable to perform the polymerization steps in an inert gas atmosphere of nitrogen, argon or the like (for example, at an oxygen concentration of 1% by volume or less). Furthermore, it is preferable to perform polymerization after the dissolved oxygen in the monomer or the solution containing the monomer has been sufficiently substituted by an inert gas (for example, dissolved oxygen concentration: less than 1 [mg/L]). Furthermore, in the present invention, a water absorbent resin powder having superior physical properties and a higher degree of whiteness in which, even if the system is degassed, gelation does not occur before polymerization due to the excellent stability of the monomer, is provided.

Furthermore, during the polymerization step, the polymerization initiation time (time required from the time point at which a polymerization initiator is added, to the time point of initiation of polymerization) is preferably longer than 0 seconds and shorter than or equal to 300 seconds, and more preferably 1 second to 240 seconds, from the viewpoint of suppressing a reduction of gas bubbles in the aqueous monomer solution. If the polymerization initiation time exceeds 300 seconds, it is not preferable because the amount of introduction of gas bubbles into the water absorbent resin powder is small and the effect of the present invention may not be exhibited.

(Particularly Suitable Conditions for Foaming Polymerization)

Hereinafter, particularly suitable conditions for performing foaming polymerization will be described.

In the case of carrying out foaming polymerization examples of the polymerization method for obtaining a water absorbent resin powder include spray polymerization, droplet polymerization, aqueous solution polymerization, reversed phase suspension polymerization or the like. However, in order to solve the problems of the present invention, aqueous solution polymerization is particularly preferred, and among others, continuous belt polymerization or continuous kneader polymerization is preferred, while it is preferable to carry out the step at the temperature and concentration described below.

According to the present invention, in order to accelerate foaming, high temperature initiation polymerization is preferred, and the initiation temperature is preferably 40° C. or higher, and more preferably in the following order of 50° C. or higher, 60° C. or higher, 70° C. or higher, and 80° C. or higher. Furthermore, in order to accelerate foaming, a higher maximum arrival temperature at the time of polymerization is preferred, and the maximum arrival temperature is preferably 100° C. or higher, more preferably 100° C. to 130° C., and still more preferably 105° C. to 120° C.

Furthermore, in regard to the concentration of the aqueous monomer solution at the time of polymerization, usually there are no particular limitations, and a concentration of 20% by weight to the saturation concentration is preferred. If the concentration is less than 20% by weight, it is not preferable because productivity is decreased. Meanwhile, since polymerization in the form of a slurry of the monomer (aqueous dispersion liquid of an acrylic acid salt) may cause deterioration of the physical properties, it is preferable to perform polymerization at a concentration less than or equal to the saturation concentration (see Patent Literature 42).

On the other hand, according to the present invention, in order to accelerate foaming in the concentration range described above, it is preferable to increase the concentration of the aqueous solution of acrylic acid (salt)-type monomer, and the concentration of the aqueous solution is preferably 40% by weight or greater, more preferably 45% by weight or greater, and particularly preferably 50% by weight or greater. The upper limit of the concentration is preferably 90% by weight or less, more preferably 80% by weight or less, and particularly preferably 70% by weight or less. The concentration is applied as the solid content for the water-containing gel-like crosslinked polymer after polymerization. Meanwhile, when the monomer concentration at the time of polymerization is set to 35% by weight or greater, preferably 40% by weight or greater, and more preferably 45% by weight or greater, the water absorption rate (FSR) is further increased, and the stability of fine gas bubbles is increased. Therefore, superiority of the present invention is manifested.

(Polymerization Initiator)

The polymerization initiator used in the present invention is appropriately determined based on the form of polymerization and is not particularly limited. As such a polymerization initiator, a photodecomposition-type polymerization initiator, a thermal decomposition-type polymerization initiator, a redox-type polymerization initiator or the like can be exemplified.

Examples of the photodecomposition-type polymerization initiator include benzoin derivatives, benzyl derivatives, acetophenone derivatives, benzophenone derivatives, and azo compounds or the like. Furthermore, examples of the thermally degradable type polymerization initiator include persulfates such as sodium persulfate, potassium persulfate, and ammonium persulfate; peroxides such as hydrogen peroxide, t-butyl peroxide, and methyl ethyl ketone peroxide; azo compounds such as V-50 (manufactured by Wako Pure Chemical Industries, Ltd., 2,2'-azobis(2-amidinopropane)hydrochloride), 2,2'-azobis(2-amidinopropane)dihydrochloride, and 2,2'-azobis[2-(2-imidazolin-2-yl)propane]dihydrochloride; and the like. Also, examples of the redox-type polymerization initiator include systems obtained by combining the persulfates or peroxides with reducing compounds such as L-ascorbic acid, sodium hydrogen sulfite, and ferrous salts. It is preferable to use a persulfate in combination with a reducing agent as necessary. Furthermore, according to a preferred embodiment, a photodecomposition-type polymerization initiator and a thermal decomposition-type polymerization initiator as described above may be used in combination. Meanwhile, the azo compounds are preferred because they can also act as foaming agents for generating N2 gas at the time of polymerization.

Furthermore, the amount of use of the polymerization initiator is, in the case of a water-soluble polymer, preferably 0.0001% to 0.5% by weight, and more preferably 0.0002% to 0.1% by weight, relative to the monomer, and in the case of a water-swellable polymer, the amount of use is preferably 0.01% to 2% by weight, and more preferably 0.05% to 1% by weight, relative to the monomer. If the amount of use is greater than 0.5% by weight, the color hue of the water absorbent resin powder is deteriorated, and thus it is not preferable. Furthermore, if the amount of use is less than 0.0001% by weight, the amount of residual monomers (monomer) increases, and thus it is not preferable.

(Additives and the Like)

At the time of polymerization as described above, a chain transfer agent such as hypophosphorous acid (salt), a chelating agent and the like may be further added to the reaction system before polymerization or during polymerization as necessary, in an amount of preferably 0% to 3% by weight, and more preferably 0.1% to 1% by weight.

(2-3) Gel-Crushing Step

The present step is a step for cracking (gel-crushing) the hydrogel obtained in the polymerization step described above, and thereby obtaining a particulate water-containing gel (hereinafter, may be referred to as "particulate hydrogel" or simply as "hydrogel").

The hydrogel obtained in the polymerization step may be directly subjected to drying, but in order to solve the problems described above, the hydrogel is preferably gel-crushed at the time of polymerization or after polymerization, by using a gel-crusher (cracker) (a kneader, a meat chopper, a cutter mill or the like) as necessary, to form a particulate form. That is, between the polymerization step based on continuous belt polymerization or continuous kneader polymerization and the drying step, a gel-crushing step of the hydrogel (hereinafter, also referred to as "gel micronization" or "gel-crushing") may be further included. Meanwhile, even the case in which the gel is micronized by dispersion in a solvent at the time of polymerization, such as in reversed phase suspension polymerization, is considered to be included in the micronization of the present invention (micronization in the polymerization step). However, suitably, the gel is gel-crushed by using a gel-crusher.

According to the present invention, the water-containing gel-like crosslinked polymer obtained during polymerization or after polymerization is gel-crushed, and thus micronization is achieved. When the hydrogel is gel-crushed, particularly gel-crushed (micronized) by kneading, a balance between water absorption rate and liquid permeability is achieved, and impact resistance is also enhanced. That is, in order to solve the problems of the present invention, when the polymerization step is continuous kneader polymerization, the hydrogel is gel-crushed at the time of polymerization, and when the polymerization step is continuous belt polymerization, the hydrogel is gel-crushed after polymerization. That is, when kneader polymerization is carried out, since gel-crushing of the hydrogel can be carried out during polymerization by using a kneader, the gel-crushing step is included in the kneader polymerization step.

There are no particular limitations on the gel-crusher that can be used in the present invention, and examples include a gel crusher equipped with plural rotating stirring blades, such as a batch type or continuous type double-blade kneader; a single-screw extruder, a twin-screw extruder, a meat chopper and the like. Among them, a screw type extruder having a multi-hole plate at the front tip is preferred, and for example, the screw type extruder disclosed in JP-A-2000-63527 may be used.

The temperature of the hydrogel at the time of gel-crushing (cracking) is preferably 40° C. to 120° C., and more preferably 50° C. to 110° C., from the viewpoint of physical properties. If the gel temperature is lower than 40° C., due to the characteristics of the hydrogel, hardness increases, and it is difficult to control the particle shape and the particle size distribution at the time of gel-crushing. Furthermore, if the gel temperature is higher than 120° C., the softness of the hydrogel increases, and it is difficult to control the particle shape and the particle size distribution. Meanwhile, the gel temperature can be controlled by means of the temperature at the time of polymerization, heating or cooling after polymerization, or the like. Also, depending on the temperature after polymerization, it is preferable that the hydrogel be further warmed or heated to the temperature, and 50° C. to 80° C. is more preferred. Furthermore, the resin solid content (hereinafter, referred to as "solid content") of the particulate hydrogel at the time of gel-cracking or after cracking is not particularly limited, but in view of the physical properties, the resin solid content is preferably 20% to 80% by weight, more preferably 30% to 70% by weight, still more preferably 40% by weight or greater, and particularly preferably 40% to 60% by weight.

The weight average particle size (D50) of the particulate hydrogel after gel-crushing (cracking) is preferably 0.5 mm to 4 mm, more preferably 0.5 mm to 3 mm, and still more preferably 0.6 mm to 2 mm. When the weight average particle size (D50) of the particulate hydrogel is in the range described above, it is preferable because the physical properties are improved, and drying is efficiently carried out. If the weight average particle size (D50) is less than 0.5 mm, even in the drying method of using a particular gas flow velocity of the present invention, the amount of residual monomers (monomer) may increase, or the enhancing effect of the water absorption rate (FSR) may be lowered. Furthermore, if the weight average particle size (D50) is larger than 4 mm, it is not preferable because not only the drying time increases, but also the extractables (Ext) may increase. Furthermore, the proportion of the particulate hydrogel having a particle size of 5 mm or greater is preferably 0% to 10% by weight, and more preferably 0% to 5% by weight, of the total amount of the particulate hydrogel. Meanwhile, the particle size of the particulate hydrogel can be determined, in the same manner as in the case of the particle size of the water absorbent resin powder after the pulverization step, by classifying the particles with sieves having particular mesh sizes. Furthermore, the weight average particle size (D50) can also be determined in the same manner. However, in regard to the classification operation for the particulate hydrogel, if the measurement is difficult in dry classification methods due to aggregation or the like, measurement is made by using the wet classification method described in paragraph [0091] of JP-A-2000-63527.

Furthermore, the gel-crushing step described in JP Patent Application No. 2010-088993 (International Patent Application PCT/JP2011/058829), particularly a gel-crushing step employing a gel-crushing energy (GGE) of 18 to 60 [J/g], is applied to the present invention. The gel-crushing energy according to the present invention is, as the upper limit, preferably 60 [J/g] or less, more preferably 50 [J/g] or less, and still more preferably 40 [J/g] or less. Furthermore, the gel-crushing energy is, as the lower limit, preferably 18 [J/g] or greater, more preferably 20 [J/g] or greater, and still more preferably 25 [J/g] or greater.

(2-4) Drying Step

The present step is a step of drying the water-containing gel-like crosslinked polymer (hydrogel) obtained in the step described above, or a mixture of the hydrogel and water absorbent resin fine particles (hydrogel mixture), and obtaining a dried polymer (dried substance) or a dried polymer mixture (dried mixture). Meanwhile, the drying conditions or the like for the hydrogel mixture will be described in detail in the following section (2-6) Fine powder recovery step. Hereinafter, the hydrogel and/or hydrogel mixture will be referred to as "hydrogel etc."

It is contemplated that in the production method of the present invention, appropriate foaming is caused in the hydrogel during drying by controlling the hot air temperature, hot air flow velocity and hot air dew point in the drying step. However, it is preferable to further include a step of incorporating gas bubbles into the hydrogel at the time of drying by means of a foaming agent or the like, and obtaining a hydrogel containing gas bubbles. The foaming agent is, for example, preferably a thermally reactive foaming agent.

When the hydrogel etc. are introduced into a hot air dryer, the solid content thereof is in the range described above (preferably 20% to 80% by weight, more preferably 30% to 70% by weight, and still more preferably 40% to 60% by weight); however, since the solid content of the gel is high, the drying time can be shortened, and the damage of the polymer by drying can be reduced. Furthermore, the temperature at the time of introduction of the hydrogel etc. into the dryer is preferably 40° C. to 100° C., more preferably 50° C. to 100° C., still more preferably 60° C. to 100° C., and particularly preferably 70° C. to 100° C. If the temperature of the hydrogel etc. at the time of introduction into the dryer is lower than 40° C., it is not preferable because the enhancing effect of the water absorption rate is small, and surprisingly, the amount of water absorbent resin fine particles tends to increase after pulverization. Furthermore, if the temperature of the hydrogel etc. is higher than 100° C., it is not preferable because the dried substance obtained after drying tends to be colored. The temperature of the hydrogel etc. at the time of introduction into the dryer is also preferably applied to the temperature of the mixture of water absorbent resin fine particles and the hydrogel at the time of fine powder recovery which is described late.

The method of adjusting the solid content of the hydrogel etc. at the time of introduction into the dryer to the range described above, is not particularly limited, and the solid content can be adjusted by adjusting the monomer concentration at the time of polymerization, and aging the hydrogel etc. obtained after polymerization or after micronization (crushing), and evaporating the moisture contained in the hydrogel etc. in advance. In addition to that, a hydrogel may also be obtained by performing boiling polymerization, which performs polymerization with evaporating the moisture in the monomers.

In the present step, the particulate hydrogel obtained by the polymerization step and gel-crushing step, and/or a mixture thereof with the water absorbent resin fine particles generated in the pulverization and classification step is dried until a solid content in a predetermined range is obtained, and thereby a dried substance is obtained. Thereafter, a pulverization step and a classification step are carried out, and a water absorbent resin powder having a desired particle size is obtained.

The moisture content (defined as 100−solid content) of the dried substance obtained by the drying step is not particularly limited, but the dried substance is preferably particles (powder) having a moisture content to the extent that fluidity is exhibited even at room temperature. From the viewpoint described above, the moisture content of the dried substance is preferably 0.2 parts to 25 parts by weight, more preferably 0.3% to 15% by weight, still more preferably 0.5% to 10% by weight, and particularly preferably 0.5% to 5% by weight. When the moisture content is in the range described above, fluidity of the water absorbent resin powder is improved. Meanwhile, the moisture content is applied even for the water absorbent resin of final manufactured products.

As the drying apparatus used in the present invention, the hot air dryer exemplified in Patent Literatures 60 to 64 etc. which is described late (preferably a through-circulation type hot air dryer, and more preferably a through-circulation band type hot air dryer) is essentially used, and in addition to that, if necessary, one kind or two or more kinds of a conduction heat transfer type dryer, a radiation heat transfer type dryer, a hot air heat transfer type dryer, a dielectric heating dryer and the like may be used as the drying apparatus that is used in combination. However, among these, a hot air heat transfer type dryer (hereinafter, referred to as "hot air dryer") is preferred.

According to the present invention, for the drying of a mixture of a hydrogel and water absorbent resin fine particles, it is essential to use a hot air dryer, and it is preferable to use a through-circulation type hot air dryer, and more preferable to use a through-circulation band type hot air dryer. At that time, it is preferable that the hot air be in the perpendicular direction with respect to the laminated layer of the hydrogel etc., while it does not matter whether the direction is upward (Up-Flow), downward (Down-Flow), or a combination of these.

Furthermore, known examples of the conventional methods for drying a water absorbent resin include, as which is described late, a method of using a band (belt) type dryer (Patent Literatures 60 to 64), a method of performing thin film drying with a drum dryer or the like (Patent Literatures 65 and 66), a method of performing azeotropic dehydration in an organic solvent (Patent Literature 67), a method of performing drying in a fluid-bed (Patent Literature 68), a method of performing vibration fluid drying (Patent Literature 69), a method of drying under stirring with a rotor (Patent Literatures 69 and 70) and the like. However, the problems of the present invention are not solved with these drying methods only.

(A) Drying Step of Present Invention

According to an embodiment of the present invention, the present invention is carried out such that, in order to solve the problems, water absorbent resin fine particles are added (recovered), a particular drying method (hot air drying, preferably through-circulation type hot air drying, and more preferably through-circulation band type hot air drying) is essentially used, and the hot air temperature and flow amount at that time are controlled to specific ranges.

Meanwhile, drying with a through-circulation band type hot air dryer generally requires massive drying (in view of amount and time), and therefore, as will be described in the following Examples, experiments may be carried out by using a batch type static through-circulation type dryer as a model.

An industrial-scale experiment (setting of drying conditions) using a through-circulation type continuous drying apparatus such as a through-circulation band type hot air dryer, generally requires large amounts of continuous drying (particularly 0.5 [t/hr] or more, even 1 [t/hr] or more, or 5 [t/hr] or more) and production for several hours or several days. However, since the physical properties of a water absorbent resin powder obtained when constant drying conditions are employed exhibit almost the same behavior in both continuous drying and batch type drying, batch type drying can be employed in an experiment simulating through-circulation type continuous drying. That is, as a model experiment for through-circulation type continuous drying, a drying experiment is carried out in a small scale (several kilograms (kg) to several ten kilograms (kg) per batch), and the operating conditions for a through-circulation band type hot air dryer can be determined while the correlation between continuous drying in a large scale and batch drying in a small scale. For example, the drying conditions for the through-circulation type static batch type dryer used in the Examples described below can be directly applied to the drying step in a through-circulation band type hot air dryer. As such, when the drying conditions for a through-circulation band type hot air dryer are determined based on the drying results for a through-circulation type static batch type dryer, scaling up by increasing the amount of drying per unit time to 10 times or more, 100 times or more, or 200 to 10,000 times is facilitated.

Furthermore, even if any one of a through-circulation band type hot air dryer and a through-circulation type static batch type dryer is used as the dryer, as long as the hot air temperature and air flow amount for the drying step are set to specific ranges, the effects of the present invention can be similarly achieved. That is, even if any one of a through-circulation band type hot air dryer and a through-circulation type static batch type dryer is used, a decrease in the water absorption physical properties (for example, a decrease in the water absorption rate (FSR)) or a decrease in coloration, drying efficiency or yield can be suppressed by applying the particular conditions which is described late.

(a) Drying Conditions

The drying step in the method for producing the water absorbent resin powder of the present invention is characterized in that the particulate hydrogel obtained through the polymerization step and gel-crushing step described above is hot-air dried at an average flow velocity of 1.0 to 3.0 [m/s] and a temperature of 140° C. to 235° C. (preferably, using a through-circulation band type hot air dryer). At this time, the production method is characterized in that for an increase in the water absorption rate, water absorbent resin fine particles or a hydrated-particles thereof is added to the steps prior to the drying step, and subsequently, a mixture composed of the particulate hydrogel and the water absorbent resin fine particles or a hydrated-particles thereof is dried in the drying step. Preferably, the water absorbent resin fine particles separated in the classification step, or a hydrated-particles thereof, is added to the steps prior to the drying step. Furthermore, preferably, hot air drying in the drying step is achieved in the perpendicular direction (vertical direction). In the present invention, it was found that when addition of the water absorbent resin fine particles is carried out under particular drying conditions, not only the particle size can be controlled, but also the water absorption rate (for example, FSR) is increased.

Meanwhile, in regard to the drying method, use of a hot air dryer is essential, and it is preferable to use a through-circulation type hot air dryer, while it is more preferable to use a through-circulation band type hot air dryer. At that time, it is preferable that the hot air be in the perpendicular direction with respect to the laminated layer of the hydrogel etc. that is left to stand, and it does not matter whether the direction is upward (Up-Flow), downward (Down-Flow), or a combination of these. Meanwhile, as long as the hot air dryer is used for main drying (moisture removal), the problems of the present invention can be solved even if hot air in the horizontal direction or other dryers (fluid-bed drying, stirred drying, azeotropic dehydration, drum dryer drying, and the like) are used in combination.

Hereinafter, the particular drying conditions and preferred drying conditions of the present invention will be described. When drying is carried out, after the fine powder recovery, at the average flow velocity and temperature described below by using a through-circulation type hot air dryer, the water absorption rate of the water absorbent resin powder thus obtained can be increased.

(b) Drying Temperature

In order to solve the problems of the present invention, hot air at a particular temperature is used for the drying. The hot air temperature is in the range of 140° C. to 235° C., preferably 150° C. to 235° C., more preferably 155° C. to 230° C., still more preferably 160° C. to 220° C., and particularly preferably 170° C. to 200° C. It was found that when the particulate hydrogel, or a mixture of the particulate hydrogel and water absorbent resin fine particles (hydrogel etc.) is dried at a drying temperature of 140° C. to 235° C., and preferably 150° C. to 235° C., the water absorption rate of the water absorbent resin powder thus obtained is increased. If the drying temperature is lower than 140° C., the increase of the water absorption rate is not sufficient, undried materials are generated as a result of a decrease in the drying efficiency, and clogging occurs at the subsequent pulverization step and the like. Therefore, it is not preferable. Furthermore, if the drying temperature exceeds 235° C., deterioration such as coloration or an increase in the extractables may occur after drying. Furthermore, a large amount of balloon-like dried polymer is generated and causes deterioration of the liquid permeability, and therefore, it is not preferable.

Figure 6:
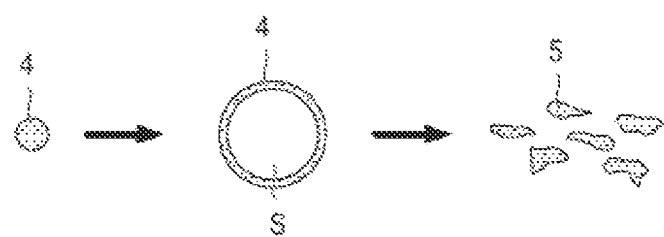
FIG. 6 is a schematic diagram illustrating a conventional drying step of a water-containing gel-like crosslinked polymer.

FIG. 6 illustrates a conventional drying step for a water-containing gel-like crosslinked polymer. When a water-containing gel-like crosslinked polymer 4 is dried, the water-containing gel-like crosslinked polymer 4 foams, and thereby, the polymer swells in a balloon-like form and contains gas bubbles S (center of FIG. 6). The water-containing gel-like crosslinked polymer 4 is dried, and thereby, a dried polymer 5 in a scale-like form (right side of FIG. 6) is obtained. FIG. 7 illustrates the drying step for a water-containing gel-like crosslinked polymer of the production method according to the present invention. As a result of the drying step of the present invention, the water-containing gel-like crosslinked polymer 4 does not foam even if dried, and the polymer is dried without any change and thus a dried polymer 5 is obtained (right side of FIG. 7).

Figure 3:
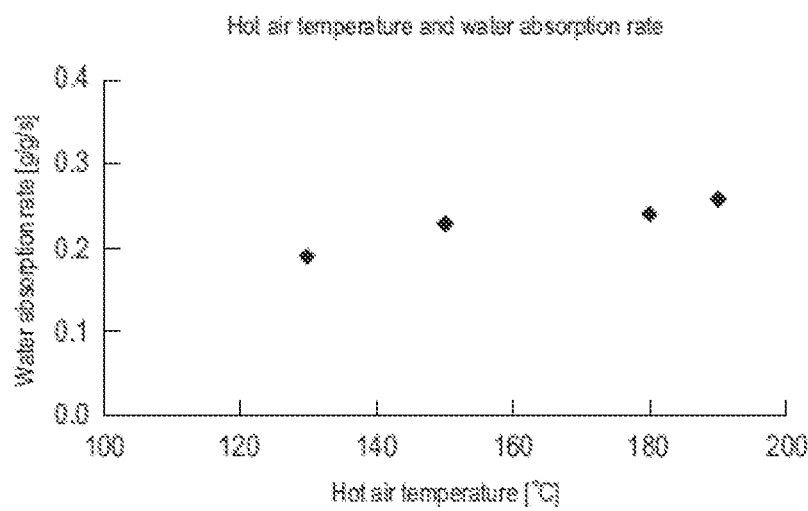
FIG. 3 is a graph plotting the correlation between the temperature of hot air in the drying step and the water absorption rate.

The inventors of the present invention conducted a thorough investigation by using a band type dryer as the dryer used, and as a result, the inventors found the relationship of FIG. 3 which is described late. Specifically, as the drying temperature increased in the range of 140° C. to 235° C., the water absorption rate of the water absorbent resin powder thus obtained tended to increase. However, in a temperature range below 140° C., there was no change in the water absorption rate, undried materials were produced, and clogging occurred at the time of pulverization in the subsequent steps.

(c) Air Flow Velocity of Dryer

In order to solve the problems of the present invention, hot air at a particular flow velocity is used for drying, and the flow velocity of the hot air dryer is controlled preferably to 3.0 [m/s] or less, more preferably 2.8 [m/s] or less, still more preferably 2.6 [m/s] or less, further still more preferably 2.4 [m/s] or less, and particularly preferably 2.2 [m/s] or less. Furthermore, the lower limit of the flow velocity of the hot air dryer is preferably 1.0 [m/s] or greater, more preferably 1.2 [m/s] or greater, still more preferably 1.5 [m/s] or greater, and particularly preferably 1.8 [m/s] or greater. Also, in the present invention, the direction of the hot air is preferably the perpendicular direction with respect to the hydrogel, that is, upward and/or downward in the perpendicular direction.

When the air flow velocity of the hot air dryer is controlled to the range described above, the powder obtained after drying is controlled to the preferred moisture content described above, and the water absorption rate is increased. However, if the flow velocity is lower than 1.0 [m/s], the increase in the water absorption rate is insufficient, and if the flow velocity is higher than 3.0 [m/s], the amount of residual monomers may increase, or the dried substance may be scattered away, so that stabilized drying becomes difficult. It was found that when a mixture of a hydrogel and fine powder is dried at higher than or equal to a particular air flow velocity, an increase in the water absorption rate is made possible. If the air flow velocity is low, the increase in the water absorption rate is not sufficient, and if the air flow velocity is excessively high, the amount of residual monomer may increase after drying, or the dried substance may be scattered away, so that stabilized drying becomes difficult. Furthermore, as illustrated in FIG. 6, a balloon-like dried polymer is generated in a large amount and causes deterioration of the liquid permeability, which is not preferable. Furthermore, at the temperature and flow velocity of the hot air according to the present invention, acetic acid or propionic acid in the acrylic acid, which may cause the acidic odor of the water absorbent resin, can be efficiently removed from the hydrogel or water absorbent resin after polymerization, and a water absorbent resin that is free of acidic odor may be obtained, which is preferable.

(d) Drying Time

The drying time in the drying step for the hydrogel etc. depends on the surface area and moisture content of the hydrogel etc., and the type of the dryer, and the drying time may be appropriately selected so as to achieve an intended moisture content, and is not particularly limited. However, from the viewpoints of the water absorption capacity (CRC) and the residual monomers, the drying time is preferably 10 minutes to 120 minutes, and more preferably 20 minutes to 60 minutes. The dried polymer obtained in the drying step is subsequently pulverized and classified. Meanwhile, Patent Literature 105 and the like which is described late have no disclosure on the drying time.

In order to solve the problems of the present invention more effectively, for example, the drying temperature, flow velocity of the hot air and the like may be controlled for a time period that is 50% or more, 70% or more, preferably 90% or more, and more preferably 95% or more, of the drying time in the drying step. Furthermore, in order to solve the problems of the present invention more effectively, it is preferable that the temperature and the flow velocity be maintained in the first half of the drying step, particularly from the beginning of the drying step. The air flow velocity of the hot air dryer as used herein represents the average flow rate of the wind (gas stream) that passes through a band dryer for example, in the direction perpendicular to the band surface that moves horizontally. The average flow rate of wind may be simply determined by dividing the amount of air flow blown to the band dryer, by the area of the band.

(e) Other Drying Conditions

Other preferred conditions will be described below.

(e-1) Dew Point of Hot Air

The gas that is brought into contact with the hydrogel etc. contains at least water vapor, and has a dew point of preferably 30° C. to 100° C., and more preferably a dew point of 30° C. to 90° C. When the dew point is controlled to this range, the amount of residual monomers can be reduced. Meanwhile, the dew point is defined as the value obtained at the time point at which at least the moisture content of the hydrogel etc. is at least 10% by weight, and preferably 20% by weight or higher.

Furthermore, when the dew point is controlled to the range described above, appropriate foaming is induced in the hydrogel etc., and therefore, the water absorption rate is increased, while a decrease in the bulk density of the dried powder can also be prevented. Preferably, it is preferable to bring the hydrogel etc. into contact with a water vapor-air gas mixture and/or water vapor-inert gas, or water vapor.

Meanwhile, the dew point of the hot air is measured before the contact with the hydrogel, for example, 1 m or more before, for example, before the blowing port for the hot air of the dryer.

The dew point of the hot air in the drying step is higher at the inlet of the dryer than at the outlet of the dryer. The gas that is brought into contact with the hydrogel at beginning of the drying contains at least water vapor, and preferably has a dew point of 50° C. to 100° C., more preferably 50° C. to 90° C., and still more preferably 50° C. to 70° C. When the dew point is controlled to this range, the amount of residual monomers can be reduced. Meanwhile, the dew point is defined as the value obtained at the time point at which at least the moisture content of the hydrogel is at least 10% by weight, and preferably 20% by weight or higher. Furthermore, in the drying step, it is preferable to bring the hydrogel into contact with a hot air whose dew point is higher at the inlet of the dryer than at the outlet of the dryer, preferably by 10° C. to 50° C., and more preferably by 15° C. to 40° C., from the viewpoints of the residual monomer, water absorption characteristics, and coloration. When the dew point is controlled to the range described above, since appropriate foaming is induced in the hydrogel etc., the water absorption rate is increased, and a decrease in the bulk density of the dried powder can also be prevented.

The atmosphere dew point at the beginning of the drying (inlet of the dryer) in the drying step is preferably 50° C. to 100° C., more preferably 50° C. to 90° C., and still more preferably 50° C. to 80° C. When the dew point at the beginning of the drying is in the range described above, it is preferable because the moisture content can be decreased, and troubles that may occur after the drying step can be prevented. Meanwhile, the atmosphere dew point means the dew point at the head space close to the hydrogel in the dryer.

Furthermore, the atmosphere dew point at the end of drying (outlet of the dryer) in the drying step is preferably higher than or equal to 30° C. and lower than 70° C., and more preferably higher than or equal to 30° C. and lower than 50° C. When the dew point at the end of drying is in the range described above, it is preferable because the moisture content can be decreased, and troubles that may occur after the drying step can be prevented.

(e-2) Through-Circulation Band Type Hot Air Dryer

When the hydrogel is dried in a through-circulation band type hot air dryer (also known as through-circulation conveyor type dryer), a hydrogel that has been gel-crushed (cracked/micronized) is continuously supplied onto the band of the band dryer so that the hydrogel forms a layer, and the hydrogel is dried by hot air. The width of the band of this dryer is 0.5 m or larger, and preferably 1 m or larger, while the upper limit is 10 m or less, and preferably 5 m or less. The length of the band is 20 m or larger, and preferably 40 m or larger, and the upper limit is 100 m or less, and preferably 50 m or less.

Furthermore, in order to solve the problems of the present invention, the thickness of the hydrogel layer on the band is in the range of 10 mm to 300 mm, preferably 50 mm to 200 mm, more preferably 80 mm to 150 mm, and particularly preferably 90 mm to 110 mm.

The transport speed of the hydrogel on the band may be appropriately adjusted based on the band width, band length, production amount and drying time, but from the viewpoints of the load of the band driving apparatus, durability and the like, the transport speed is preferably in the range of 0.3 to 5 [m/min], more preferably 0.5 to 2.5 [m/min], still more preferably 0.5 to 2 [m/min], and particularly preferably 0.7 to 1.5 [m/min].

The present invention is appropriate for continuous operation, and when the conditions are set to the value ranges described above, the present invention exhibits a significant effect on the improvement of productivity, the physical properties of the dried powder thus obtained, and the like.

The drying of the present invention is preferably carried out on a continuous through-circulation band (belt), and the through-circulation band (belt) may be, for example, a wire mesh (for example: mesh size 1,000 μm to 45 μm) or a punching metal, while a punching metal is preferably used. The shape of the holes of the punching metal is widely applicable, and examples include a circular hole, an elliptical hole, a square hole, a hexagonal hole, an oval hole, a rectangular hole, a rhombic hole, and a cross hole, or combinations of plural shapes of these may also be used. Furthermore, the arrangement of the holes may also be in a zigzag form or in a parallel form. Furthermore, the holes may also be three-dimensionally formed such as in the form of louver (bay window), but preferably, the punching metal has holes having a planar structure. Also, the pitch direction may be a longitudinal direction, a transverse direction or an oblique direction with respect to the travel direction of the band (belt), and combinations of these may also be used. Meanwhile, the size of the holes or the ratio of opening area of the punching metal will be described below.

In order to achieve the present invention, it is preferable to vary any one or more of the temperature, dew point, flow amount and flow direction of the hot air to be used, in multiple stages, and to this end, it is preferable that the dryer be a through-circulation band (belt) type dryer having plural divided drying chambers of 5 chambers or more, particularly preferably 6 chambers or more, and still more preferably 8 chambers or more. The upper limit is appropriately set up according to the scale or the like, but usually, about 20 chambers are sufficient.

The drying temperature of 140° C. to 235° C., preferably 150° C. to 235° C., more preferably 155° C. to 230° C., is controlled, and furthermore, in the temperature region described above, the air flow velocity in the hot air dryer is controlled to 1.0 to 3.0 [m/s]. Furthermore, preferably, it is preferable that the hot air on the band (belt) be blown vertically upward or vertically downward with respect to the through-circulation band (belt) surface, and it is more preferable that the hot air be blown vertically upward and vertically downward in combination. Particularly, when the air flow is upward (Up-Flow) in the anterior half of the dryer and is downward (Down-Flow) in the latter half, more uniform drying can be achieved.

The solid content (resin solid content) that can be determined from the weight loss on drying in the drying step of the present invention is preferably 80% by weight or greater, more preferably 85% to 99% by weight, still more preferably 90% to 98% by weight, and particularly preferably 92% to 97% by weight. Meanwhile, the term "weight loss on drying" means the weight loss occurring when 1 g of the hydrogel etc. is heated and dried for 3 hours at 180° C., and (100−solid content) corresponds to the moisture content.

Meanwhile, many suggestions have been made hitherto on the method for drying the hydrogel etc., but none of these disclose the method of the present invention for increasing the water absorption rate. Furthermore, as discussed above, it was found that among the many drying methods, a method of using through-circulation hot air drying, particularly a band type dryer, greatly contributes to the solution for the problems of the present invention.

(B) Conventional Drying Method

In order to solve the problems of the present invention, according to an embodiment of the present invention, a particular drying method (hot air drying, preferably through-circulation hot air dryer, and more preferably through-circulation band drying) is essentially used after a fine powder is added, and the hot air temperature and air flow amount at that time are controlled to specific ranges. Conventionally, Patent Literatures 60 to 85 and the like described below have been proposed as the method for drying a water absorbent resin, but none of these disclose the method of the present invention for increasing the water absorption rate. Furthermore, as discussed above, it was found that even among the many drying methods of Patent Literatures 60 to 73 and the like described below, a method of using hot air drying, particularly a band type hot air dryer, greatly contributes to the solution for the problems of the present invention.

That is, known examples of conventional methods for drying a water absorbent resin include a method of using through-circulation hot air drying, particularly a band type dryer (Patent Literatures 60 to 64), a method of performing thin film drying with a drum dryer or the like (Patent Literatures 65 and 66), a method of performing azeotropic dehydration in an organic solvent (Patent Literature 67), a method of performing drying in a fluid-bed (Patent Literature 68), a method of performing vibration fluid drying (Patent Literature 69), a method of drying under stirring with a rotor (Patent Literatures 69 and 70) and the like. Furthermore, as the drying conditions for the water absorbent resin, a method of controlling the dew point or temperature in order to improve the physical properties (for example, reduction of residual monomers, an increase in the water absorption capacity, and reduction of the extractables) (Patent Literatures 71 and 72), a method of performing crude pulverization during drying, and drying under stirring (Patent Literature 73) and the like have been proposed.

Furthermore, in the drying methods of Patent Literatures 60 to 73 described below (particularly, Patent Literatures 60 to 64), undried materials may occur, and because excessive load may be imposed on the pulverization step, a method for removing such undried materials (Patent Literatures 74 to 76) is also known. Furthermore, in order to prevent the generation of undried materials, a method of defining the fluidity of the polymer gel (Patent Literature 77), a method of using a gel flattening device in the dryer (Patent Literature 78), a drying method using a particular apparatus for quantitative gel supply to the dryer (Patent Literature 79), and a method of using infrared radiation or the like in combination with hot air (Patent Literature 80) are known. Furthermore, in order to improve the drying efficiency, a method of adding a surfactant or inorganic fine particles to the hydrogel (Patent Literatures 81 to 84) is also known. Also, a drying method for a low-neutralized hydrogel (Patent Literature 85) has also been proposed. Also, a drying method of measuring the moisture content (Patent Literature 62) has also been proposed. However, none of these drying methods of Patent Literatures 60 to 85 and the like suggest the present invention.

Patent Literature 60: US Patent No. 2008/214749
Patent Literature 61: WO 2008/087114
Patent Literature 62: WO 2008/037676
Patent Literature 63: JP-A-H08-073518
Patent Literature 64: JP-A-H07-270070
Patent Literature 65: JP-A-S54-053165
Patent Literature 66: U.S. Pat. No. 5,945,495
Patent Literature 67: JP-A-S64-060683
Patent Literature 68: U.S. Pat. No. 6,906,159
Patent Literature 69: JP-A-2001-018222
Patent Literature 70: U.S. Pat. No. 5,005,771
Patent Literature 71: U.S. Pat. No. 4,920,202
Patent Literature 72: U.S. Pat. No. 6,207,796
Patent Literature 73: U.S. Pat. No. 6,187,902
Patent Literature 74: U.S. Pat. No. 6,291,636
Patent Literature 75: U.S. Pat. No. 6,641,064
Patent Literature 76: WO2007/057350A
Patent Literature 77: US-A-2008-0021150
Patent Literature 78: JP-A-H10-059534
Patent Literature 79: U.S. Pat. No. 5,229,487
Patent Literature 80: JP-A-2007-224224
Patent Literature 81: JP-A-2000-143720
Patent Literature 82: JP-A-2002-226599
Patent Literature 83: US-A-2007-123624
Patent Literature 84: JP-A-2006-160774
Patent Literature 85: WO 2008/034786 A According to an embodiment of the present invention, in the drying step of the present invention, a hydrogel containing gas bubbles, which is obtained through the polymerization step and preferably the gel-crushing step, is dried to yield a dried polymer. In this regard, it was found that, when drying is carried out under particular conditions, and water absorbent resin fine particles or a hydrated-particles thereof is further added to the steps prior to the drying step, the problems of the present invention can be solved. That is, in order to solve the problems, a particular drying method (hot air drying, preferably through-circulation hot air drying, and more preferably through-circulation band drying) is essentially used after a fine powder is added, and the hot air temperature and flow velocity at that time are controlled to specific ranges.

(2-5) Pulverization Step and Classification Step

The present steps are steps in which the dried polymer (dried substance) obtained in the drying step described above is pulverized and classified, and thereby a water absorbent resin powder is obtained. That is, the production method of the present invention includes a pulverization step of pulverizing the dried polymer and obtaining a pulverized substance, and a classification step of classifying the pulverized substance.

Furthermore, according to the present invention, the dried polymer obtained in the drying step can be directly used as a water absorbent resin powder, but from the viewpoint of improving the physical properties, it is preferable to carry out pulverization and classification so as to control the particle size to a particular particle size, after the surface crosslinking step which is described late. Meanwhile, the control of the particle size is not limited to be carried out in the pulverization step and the classification step, and can be appropriately carried out in the polymerization step (particularly, reversed phase suspension polymerization), the fine powder recovery step, the gel-crushing step, and the like. Hereinafter, the particle size is defined by means of standard sieves (JIS Z8801-1 (2000)).

There are no particular limitations on the pulverizer that can be used in the present pulverization step, but preferably, a pulverizer which adopts compressive force and/or shear force under ordinary pressure or slightly reduced pressure as a main pulverization mechanism, may be used. Specifically, traditionally known pulverizers such as a roll mill, a hammer mill, a roll granulator, a jaw crusher, a gyratory crusher, a cone crusher, a roll crusher, and a cutter mill can be used. Among these, from the viewpoint of the control of the particle size, a multistage roll mill or a roll granulator is preferred.

The shape of the water absorbent resin powder obtained in the present step is preferably an irregularly shaped pulverized shape, and more preferably contains, in a proportion, particles having an agglomerated shape with a large surface area.

The pulverized substance obtained in the present pulverization step is divided into two or more particles having a desired particle size in the subsequent classification step, and the weight average particle size (D50) and the logarithmic standard deviation ($\sigma\zeta$) of the particle size distribution are adjusted to be in desired ranges. Furthermore, when the method includes a surface crosslinking step, preferably, the method may also include the same classification step after the surface crosslinking step. Meanwhile, the classification step after the drying step is referred to as a first classification step, and the classification step after the surface crosslinking step is referred to as a second classification step.

That is, in the present invention, the dried polymer (a dried substance of the hydrogel etc.) obtained in the drying step is subsequently pulverized as necessary and is further subjected to a classification step to have the particle size controlled. Thus, a water absorbent resin powder is obtained. From the viewpoint of the physical properties of the water absorbent resin powder, preferably classification is carried out before the surface crosslinking step which is described late, and more preferably, classification (second classification step) is carried out even after the surface crosslinking step.

Furthermore, in regard to the classification method in the classification step, various methods can be applied, and there are no particular limitations. However, various classifiers such as sieve classification and gas stream classification can be used. Among them, sieve classification is particularly preferred. Sieve classification is disclosed in, for example, U.S. Pat. No. 6,164,455, WO 2006/074816 A (US-A-2008-0202987), WO 2008/037672 A (US-A-2009-0261023), WO 2008/037673 A (US-A-2009-0194462), WO 2008/037675 A (US-A-2009-0266747), WO 2008/123477 A, WO 2010/032694 A, and the like. A water absorbent resin powder having a particle size in the desired range and a water absorbent resin powder having a particle size out of the range may be separated by using these classification methods. Through the classification, the upper and lower of the desired particle size are removed, and the particles are re-pulverized as necessary. Meanwhile, a water absorbent resin powder having a particle size of less than 150 μm is particularly referred to as water absorbent resin fine particles. The proportion of the water absorbent resin fine particles is usually 1% by weight or greater of the dried polymer, and is appropriately determined in the range of preferably 3% by weight or greater, more preferably 5% to 40% by weight, still more preferably 7% to 35% by weight, and particularly preferably 10% to 30% by weight.

According to the present invention, it was found that when the water absorbent resin fine particles are preferably separated in the first classification step and/or the second classification step, more preferably the first classification step, and particularly preferably the first classification step and the second classification step, and water absorbent resin fine particles having a particle size of less than 150 μm or a hydrated-particles thereof is added (recovered) to steps prior to the drying step and is subjected to drying under particular conditions, the FSR (water absorption rate) of the water absorbent resin powder thus obtained is increased. Here, the water absorbent resin fine particles according to the present invention refer to a water absorbent resin having a particle size of less than 150 μm. The separation method is not limited to sieve classification, and may be gas stream classification or pneumatic classification, but preferably, sieve classification is carried out. Meanwhile, the water absorbent fine particles that are separated in the classification step are not limited to particles having a particle size of less than 150 μm, and may be smaller particles (for example, less than 105 μm, or less than 75 μm) or may be large particles (for example, less than 200 μm). The particle size of these water absorbent resin fine particles is appropriately determined based on the desired physical properties and the like of the water absorbent resin powder, and the mesh size of the sieve used in the separation of the water absorbent resin fine particles is also appropriately determined to be 45 μm to 300 μm, and more particularly 105 μm to 220 μm.

The water absorbent resin powder obtained in the present step, more particularly the water absorbent resin as a final product, is preferably controlled to have the particle size described below. That is, the weight average particle size (D50) of the water absorbent resin powder before surface crosslinking is preferably 200 μm to 600 μm, more preferably 200 μm to 550 μm, still more preferably 250 μm to 500 μm, and particularly preferably 350 μm to 470 μm. Furthermore, the proportion of fine particles that pass through a sieve (JIS standard sieve) having a mesh size of 150 μm is preferably 0% to 5% by weight, more preferably 0% to 3% by weight, and still more preferably 0% to 1% by weight, relative to the total amount of the water absorbent resin. Furthermore, the proportion of coarse particles that do not pass through a sieve (JIS standard sieve) having a mesh size of 850 μm is preferably 0% to 5% by weight, more preferably 0% to 3% by weight, and still more preferably 0% to 1% by weight, relative to the total amount of the water absorbent resin. Furthermore, it is more preferable that the amount of coarse particles having a particle size of 850 μm or greater, and preferably 710 μm or greater, be smaller, and the amount is usually adjusted to 0% to 5% by weight, preferably 0% to 3% by weight, and more preferably 0% to 1% by weight.

Furthermore, the logarithmic standard deviation ($\sigma\zeta$) of the particle size distribution of the water absorbent resin powder is preferably 0.20 to 0.40, more preferably 0.25 to 0.37, and still more preferably 0.25 to 0.35. The particle size distribution of the water absorbent resin obtained by the present invention is such that the proportion of the particles having a particle size of 150 μm to 850 μm is 95% by weight or greater, and preferably 98% by weight or greater (the upper limit is 100% by weight).

Furthermore, the proportion of particles having a particle size of preferably greater than or equal to 45 μm and less than 850 μm, more preferably greater than or equal to 150 μm and less than 850 μm, and still more preferably greater than or equal to 150 μm and less than 710 μm, is preferably 95% by weight or greater, and more preferably 98% by weight or greater (the upper limit is 100% by weight). A water absorbent resin powder having the particle size described above is subjected to surface crosslinking which is described late. That is, it is preferable that 95% to 100% by weight of the water absorbent resin powder is a particle having a particle size in the range of greater than or equal to 150 μm and less than 850 μm.

These particles sizes are applied to the water absorbent resin powder before surface crosslinking and the water absorbent resin as a final product, and are measured by the methods disclosed in EP Patent No. 0 349 240, WO 2004/69915 A, and EDANA-ERT 420.2.-02 (Particle Size Distribution).

Meanwhile, the present invention includes an operation of adding water absorbent resin fine particles and a hydrated-particles thereof in a step prior to the drying step, but according to a preferred embodiment, water absorbent resin fine particles or a hydrated-particles thereof that has been separated in the classification step is used.

(2-6) Fine Powder Recovery Step

The method for producing a water absorbent resin powder of the present invention is a production method characterized in that, in order to increase the water absorption rate, water absorbent resin fine particles or a hydrated-particles thereof is added (recovered) to a step prior to the drying step, subsequently a mixture of a particulate water-containing gel-like crosslinked polymer and the water absorbent resin fine particles or a hydrated-particles thereof is dried by hot air drying at an average air flow velocity of 1.0 to 3.0 [m/s] and a temperature of 140° C. to 235° C. (preferably by means of air flow in the perpendicular direction) in the drying step. According to the present invention, it was found that when water absorbent resin fine particles are further added (recovered) (also referred to as: recycled) under particular drying conditions, the particle size can be controlled, and also, the water absorption rate (for example, FSR) increases.

The production method of the present invention includes an operation of adding water absorbent resin fine particles and a hydrated-particles thereof in a step prior to the drying step. The water absorbent resin fine particles may be obtained in the production step for the water absorbent resin powder of the present invention, or may be separately prepared. Preferably, from the viewpoint of cost, the water absorbent resin fine particles obtained in the production step for the water absorbent resin powder are reused. Furthermore, the preferred shape and physical properties of the water absorbent resin fine particles or a hydrated-particles thereof, and the method for addition in a step prior to the drying step will be described by taking the water absorbent resin fine particles or a hydrated-particles thereof obtained in the production step for a water absorbent resin powder and the method for addition (method for recovery) in a step prior to the drying step described below, as a representative example. Meanwhile, in the present specification, adding water absorbent resin fine particles in a step prior to the drying step may also be referred to as "recovered." Therefore, the step to be added for fine powder is also referred to as "step to be added" or "step to be recovered".

The "fine powder recovery step" according to the present invention means that the water absorbent resin fine particles (a water absorbent resin containing water absorbent resin fine particles having a particle size of less than 150 μm, and preferably less than 106 μm, in an amount of 50% by weight or more, and preferably 70% by weight or more) that are generated in the steps such as the polymerization step, the gel-crushing step, the drying step, the classification step, and the surface crosslinking step and the classification step subsequent to the surface crosslinking step which is described late, are separated, and then the fine particles are added (recovered)) to at least one step of the polymerization step, the gel-crushing step and the drying step in an unchanged state, or after being hydrated as a hydrated-particles or being agglomerated. That is, the water absorbent resin fine particles of the present invention are not particularly limited as long as the particle size is less than 150 μm, and the water absorbent resin fine particles having a particle size of less than 150 μm that are obtained in the polymerization step, the gel-crushing step, the drying step, the classification step, and the surface crosslinking step and the classification step subsequent to the surface crosslinking step which is described late, can be used. Furthermore, the method for producing the water absorbent resin fine particles to be used for fine powder recovery is not particularly limited, but for example, from the viewpoint of increasing the water absorption rate, it is preferable that the polymerization step be obtained by foaming polymerization, and it is also preferable that the water absorbent resin fine particles obtained after the drying step be dried by the particular drying step according to the present invention. Furthermore, the amount of addition (recovery) of the water absorbent resin fine particles generated in the classification step and the like described above is appropriately set in the range of preferably 1% to 40% by weight, more preferably 5% to 40% by weight, and still more preferably 5% to 30% by weight, of the water absorbent resin (dried polymer) that is supplied to the classification step.

In regard to the fine powder recovery step of the production method of the present invention, in order to solve the problem of the present invention, it is necessary that water absorbent resin fine particles having a particle size of less than 150 μm or a hydrated-particles thereof be added to a step prior to the drying step, and a mixture including a water-containing gel-like crosslinked polymer and the water absorbent resin fine particles or a hydrated-particles thereof (hydrogel etc.) be dried. Meanwhile, the water absorbent resin fine particles for fine powder recovery are preferably the fine particles obtained by separating the water absorbent resin fine particles which are a substance that has passed through a standard sieve having a mesh size of 150 μm in the classification step, or a hydrated-particles thereof.

The step to be added (recovered) of the water absorbent resin fine particles in the present invention may be in the polymerization step (including the step of preparing monomer), the gel-crushing step, the drying step or the like, and the step to be added (recovered) is preferably in at least one step of the polymerization step and the drying step. Furthermore, more preferably, the step to be added (recovered) is in a water-containing gel-like crosslinked polymer obtained during polymerization or after polymerization. Also, the step to be recovered (step to be added) may be in the same production line or may be in a different production line, but is preferably in the same production line.

According to a preferred embodiment of the present invention, water absorbent resin fine particles which are a substance that has passed through a standard sieve having a mesh size of 150 μm in the classification step are separated, and then the water absorbent resin fine particles or a hydrated-particles thereof (hereinafter, also referred to as "fine powder etc.") is added to a step prior to the drying step. Meanwhile, the mesh size for separating the water absorbent resin fine particles is appropriately determined in the range of preferably 45 μm to 300 μm, and more preferably 106 μm to 250 μm, according to the intended particle size or the intended amount of removal (removal ratio) of the water absorbent resin fine particles, without any particular limitations.

By separating these water absorbent resin fine particles, the liquid permeability (SFC) of the water absorbent resin powder thus obtained is enhanced. Furthermore, when the separated water absorbent resin fine particles or a hydrated-particles thereof is added (recovered), the water absorption rate (FSR) is increased, and the particle size of the water absorbent resin powder before surface crosslinking can be controlled. Furthermore, when the water absorbent resin fine particles are recovered directly (or together with a small amount of water), it is preferable because drying to a high solid content is easily achieved, and detachment of a dried polymer (water absorbent resin powder) from the drying band (belt) is easy, as a result of the addition of the water absorbent resin fine particles. Also, as compared with a method of discarding or not recovering water absorbent resin fine particles, or a method of using or molding only water absorbent resin fine particles, the present invention exhibit no decrease in the yield, and is also excellent in view of cost.

Furthermore, in regard to the water absorbent resin fine particles separated in the classification step, a portion of them may be discarded or may be used for other uses, without being added (recovered). Also, coarse particles (particles having a particle size of, for example, 1 mm or greater) that have been separated in the classification step may be re-pulverized.

Regarding the addition method (recovery method) for the water absorbent resin fine particles, only the water absorbent resin fine particles in a dried state may be directly added (recovered), or the water absorbent resin fine particles may be coated or mixed with (water-insoluble) inorganic fine particles such as silica or clay, a surfactant, an inorganic reducing agent such as a sulfite, an oxidizing agent, a polymerization initiator, a chelating agent such as an aminocarboxylic acid or phosphoric acid, a coloration preventing agent and the like, in an amount of preferably 0% to 20% by weight, and more preferably 0.1% to 10% by weight, and may be added (recovered).

Furthermore, the water absorbent resin fine particles to be added (recovered) are not limited to be in a dried state, and may be added (recovered) in the form of swollen gel by using water or various aqueous solutions. When the fine particles are added (recovered) in the form of swollen gel, it is preferable to granulate the water absorbent resin fine particles with water, and then add (recover) the resultant. In this case, the step to be added (step to be recovered) is preferably at least one step of the polymerization step, gel-crushing step and drying step, and is more preferably the drying step.

That is, the water absorbent resin fine particles may be added (recovered) directly, or may also be hydrated and added (recovered) as a water-swollen gel. Meanwhile, when the water absorbent resin fine particles are added (recovered) directly, it is preferable to add the fine particles to the polymerization step, and it is more preferable to add the fine particles to kneader polymerization. Furthermore, when the water absorbent resin fine particles are added (recovered) as a water-swollen gel, it is preferable to add the fine particles to the drying step or the gel-crushing step. When the water absorbent resin fine particles are directly added (recovered), it is advantageous that the load of the drying step is reduced. Furthermore, when the water absorbent resin fine particles are added (recovered) as a water-swollen gel, energy for drying the water used in hydration is required, but it is advantageous that the fine powder recovery ratio is increased. These fine powder recovery methods may be appropriately determined in accordance with the amount of the water absorbent resin fine particles or the purpose. Meanwhile, when the step to be recovered is the polymerization step, it is preferable that the step to be recovered is during polymerization of the hydrogel (that is, the fine powder etc. are added (recovered) to the hydrogel during the polymerization step). Also, when the step to be added (step to be recovered) is the gel-crushing step, it is preferable that the step to be recovered is during polymerization or subsequent to polymerization (that is, the fine powder etc. are added (recovered) to the hydrogel during polymerization or after polymerization), more preferably during polymerization. It is still more preferable that the step to be recovered is during polymerization of the hydrogel (that is, the fine powder etc. are added (recovered) to the water-containing gel during polymerization).

Among these, any one of the addition (recovery) of water absorbent resin fine particles in a dried state or a hydrated-particles thereof to the polymerization (that is, "addition (recovery) of a fine powder etc. to the polymerization step"), the addition (recovery) of water absorbent resin fine particles in a dried state or a hydrated-particles thereof to the gel-crushing step (that is, "addition (recovery) of a fine powder etc. to the gel-crushing step"), and the addition (recovery) of a hydrated-particles (particularly, a water-agglomerated product) of water absorbent resin fine particles to the drying step (that is, "addition (recovery) of a hydrated-particles (particularly, a water-agglomerated product) of a fine powder to the drying step") is preferred; the addition (recovery) of water absorbent resin fine particles in a dry state or a hydrated-particles thereof to the polymerization step is more preferred; and the addition (recovery) of water absorbent resin fine particles in a dried state to the polymerization step is still more preferred. However, the method is not limited to these.

The water absorbent resin fine particles are added to the hydrogel obtained during polymerization or after polymerization, in which the polymerization ratio of the time point of adding (recovering) the water absorbent resin fine particles (defined from the amount of residual monomers (monomer)) is preferably 5% to 99.99% by mole, more preferably 10% to 99.95% by mole, and still more preferably 30% to 99.9% by mole. If the polymerization ratio is less than 5% by mole, the increase of the water absorption rate (for example, FSR) is insufficient, and the water absorption capacity (for example, CRC) may decrease. Furthermore, if the polymerization ratio is greater than 99.99% by mole (substantially 100% by mole), water absorbent resin fine particles tend to reoccur after drying or after pulverization.

A fine powder recovery method that can be preferably used in the present invention is a method of incorporating a fine powder etc., an agglomerated product, and inorganic fine particles or the like as necessary, into the aqueous monomer solution before polymerization or to the hydrogel during polymerization. Furthermore, the aqueous monomer solution at the time of polymerization may be thickened by the fine powder that is added (recovered), and thereby foaming may be accelerated. Meanwhile, examples of the method for addition (recovery) to the aqueous monomer solution before polymerization are described in WO 92/001008 A (U.S. Pat. No. 5,455,284) and WO 92/020723 A (U.S. Pat. No. 5,455,284); examples of the method for addition (recovery) to the hydrogel during polymerization are described in WO 2007/074167 A (US-A-2008-0306209), WO 2009/109563 A, WO 2009/153196 A, and WO 2010/006937 A; and examples of the method for addition (recovery) to the drying step (dryer) are described in U.S. Pat. No. 6,228,930, etc. and these fine powder recovery methods are preferably applied.

It is preferable that the water absorbent resin fine particles originate from the hydrogel obtained by the foaming polymerization described above; however, the water absorbent resin fine particles may be the water absorbent resin fine particles separated in the classification step (a water absorbent resin containing particles having a particle size of less than 150 μm, and preferably less than 106 μm, in an amount of 50% by weight or greater, and preferably 70% by weight or greater), and may or may not be subjected to the surface crosslinking which is described late.

Hereinafter, the addition (recovery) method of the present invention will be described separately in sections (A) to (C) in accordance with the step to be added (recovered).

(A) Addition (Recovery) to Polymerization Step (a-1) Addition (Recovery) of Water Absorbent Resin Fine Particles to Aqueous Monomer Solution Before Polymerization or Hydrogel During Polymerization Examples of the method for addition (recovery) to the polymerization step include a method of incorporating the water absorbent resin fine particles into the aqueous monomer solution before polymerization, and performing polymerization; a method of incorporating the water absorbent resin fine particles into the polymer gel (hydrogel) during polymerization, and further performing polymerization; and the like. When the water absorbent resin fine particles are incorporated into the polymer gel (hydrogel) during polymerization, kneader polymerization is preferred, and gel-crushing and fine powder recovery can achieved simultaneously with polymerization. Furthermore, the solid content of the water absorbent resin fine particles at the time of addition (recovery) is preferably 80% to 100% by weight, more preferably 90% to 100% by weight, still more preferably 95% to 100% by weight, and particularly preferably 96% to 99% by weight.

Furthermore, it is preferable that the solid content of the hydrogel be increased to 45% by weight or greater, and hereinafter, preferably in the order of 50% by weight or greater, 55% by weight or greater, and 60% by weight or greater, due to evaporation of moisture or addition of water absorbent resin fine particle in the polymerization step. The increase in the solid content from the monomers (solid content of the hydrogel after polymerization–solid content of the monomers before polymerization) is preferably 1% by weight or greater, more preferably 2% to 40% by weight, and still more preferably 3% to 30% by weight. Meanwhile, it is preferable to include a step of adding (recovering) the water absorbent resin fine particles obtained after drying or a hydrated-particles thereof, to the polymerization step or the drying step.

Meanwhile, the water absorbent resin fine particles in a dried state as used herein may be directly added (recovered) or may be dispersed in the aqueous monomer solution or acrylic acid.

Furthermore, the addition (recovery) of water absorbent resin fine particles to an aqueous monomer solution in which the polymerization ratio is 0% by weight, or less than 5% by weight, and particularly 0% by weight, is disclosed in the following Patent Literatures 86 to 90, and the like, and these fine powder recovery methods can also be used in the present invention. As the polymerization step, preferably kneader polymerization, and particularly preferably continuous kneader polymerization, can be used.

Patent Literature 86: WO 92/20723 A
Patent Literature 87: US-A-2007-225422
Patent Literature 88: U.S. Pat. No. 5,264,495
Patent Literature 89: U.S. Pat. No. 5,455,284
Patent Literature 90: JP-A-2001-226416

Furthermore, the method for recovering a fine powder into a gel during polymerization in the polymerization step is described in the following Patent Literatures 91 to 97 and the like, and these fine powder recovery methods can be used in the present invention. Preferably, kneader polymerization, and particularly preferably continuous kneader polymerization, can be used as the polymerization step, and preferably, a dried fine powder is recycled to kneader polymerization. A preferred polymerization ratio is in the range described above.

Patent Literature 91: U.S. Pat. No. 5,478,879
Patent Literature 92: U.S. Pat. No. 6,987,151
Patent Literature 93: US-A-2008-0080300
Patent Literature 94: US-A-2008-0306209
Patent Literature 95: WO 2009/153196 A
Patent Literature 96: WO 2010/006937 A
Patent Literature 97: Swiss Patent No. 691572

(a-2) Addition (Recovery) of Hydrated-Particles of Water Absorbent Resin Fine Particles to Hydrogel During Polymerization or after Polymerization To the polymer gel obtained during the polymerization step or after the polymerization step (hydrogel obtained during polymerization or after polymerization), water absorbent resin fine particles may be caused to swell in water and then be added (recovered) by incorporating the fine particles into the polymer gel (hydrogel). Such a fine powder recovery method is described in the following Patent Literatures 98 to 101 and the like, and these fine powder recovery methods can be used in the present invention. Preferably, kneader polymerization, and particularly preferably continuous kneader polymerization, can be used as the polymerization step. Furthermore, a method of agglomerating water absorbent resin fine particles and adding (recovering) the agglomerated product is also preferable. A preferred polymerization ratio is in the range described above, and among other, the water absorbent resin fine particles are added (recovered) to a polymer gel having a polymerization ratio of 30% to 99.9% by mole, 50% to 99.9% by mole, and particularly 90% to 99.9% by mole. Furthermore, the moisture content of the hydrated-particles of the water absorbent resin fine particles at the time of addition (recovery) is preferably 10% to 90% by weight, more preferably 20% to 80% by weight, still more preferably 30% to 70% by weight, and particularly preferably 40% to 60% by weight.

Patent Literature 98: U.S. Pat. No. 5,350,799
Patent Literature 99: EP Patent No. 0 785 224
Patent Literature 100: U.S. Pat. No. 4,950,692
Patent Literature 101: U.S. Pat. No. 5,064,582

(B) Addition (Recovery) to Gel-Crushing Step

Regarding the method for addition (recovery) to the gel-crushing step, in addition to kneader polymerization in the polymerization step as described above, a method of mixing the hydrogel obtained after polymerization with water absorbent resin fine particles, and performing gel-crushing with a meat chopper or the like may be used. Such a technique is described in the following Patent Literature 102 and the like, and these fine powder recovery methods can be used in the present invention. As the gel-crushing apparatus, preferably kneader polymerization or a meat chopper, still more preferably continuous kneader polymerization or a meat chopper, and particularly preferably a meat chopper can be used.

Patent Literature 102: JP Patent No. 4132592

(C) Addition (Recovery) to Drying Step

Regarding the fine powder recovery method to the drying step, a method of incorporating water absorbent resin fine particles into a hydrogel before drying (for example, a hydrogel temporarily stored after polymerization) or a hydrogel at the beginning of drying (for example, right next to the inlet of the dryer in a continuous dryer), may be used. In the case of adding (recovering) the water absorbent resin fine particles to the drying step, in order to increase the addition (recovery) ratio (reduction of re-occurrence of fine powder), it is preferable to add (recover) the water absorbent fine particles as a water-swollen gel, rather than to add (recover) water absorbent fine particles in a dried state. When the water absorbent resin fine particles are added (recovered) as a swollen gel, in order to increase the addition (recovery) ratio (to prevent re-occurrence of fine powder), it is preferable to granulate the water absorbent resin fine particles as will be described below. Such a technique is described in Patent Literatures 103 and 104 and the like, and these fine powder recovery methods can be used in the present invention. A preferred polymerization ratio is in the range described above, and among them, water absorbent fine particles are added (recovered) to a polymer gel having a polymerization ratio of 30% to 99.9% by mole and more particularly 90% to 99.9% by mole.

In regard to the drying of the particulate hydrogel of the present invention, it is preferable to incorporate the water absorbent resin fine particles in a dried state into the particulate hydrogel. For example, when the polymerization step to obtain a hydrogel is a polymerization step on a band (belt) conveyor (static polymerization), the water absorbent resin fine particles can be incorporated into the particulate hydrogel in the polymerization step, gel-crushing step, and the like.

Patent Literature 103: US-A-2006-183828
Patent Literature 104: WO 2009/031701 A (D) Addition (Recovery) of Water-Containing Gel Crosslinked Polymer Obtained after Polymerization at Time of Neutralization Patent Literature 105 discloses, in claims 1, 7 and 8 and in Example 4 and the like, a technology of adding (recovering) water absorbent resin fine particles according to necessity to a hydrogel having a neutralization rate of 0% to 40% by mole at the time of post-neutralization of further adjusting the neutralization rate to 60% to 85% by mole, and further performing hot air drying. However, the Patent Literature has no disclosure on the dew point or drying time in the drying step, and foaming polymerization, which are preferably applied to solve the problems of the present invention.

As discussed above, neutralization in a water-containing gel-like crosslinked polymer after polymerization requires high shear force, when neutralization is carried out after polymerization in the foaming polymerization which is described late, the gas bubbles that are present in the water-containing gel-like crosslinked polymer may be squashed or become microscopically non-uniform, causing a decrease in the reactivity of the surface crosslinking agent (particularly the dehydration reactive surface crosslinking agent which is described late). Thus, from the viewpoints of the water absorption rate or other physical properties, the technique may not be suitable for the present invention.

Therefore, in order to solve the problems of the present invention, the addition (recovery) of the water absorbent resin fine particles is achieved by another technique except for (D), and preferably, the water absorbent resin fine particles are added to at least one of the (A) polymerization step, (B) gel-crushing step and (C) drying step, and particularly, to the (A) polymerization step (at a neutralization rate of 50% to 100% by mole) or the (C) drying step.

Patent Literature 105: WO 2000/22017 A (1) Addition (Recovery) after Agglomeration of Water Absorbent Resin Fine Particles In the methods for addition (recovery) to each of the steps of (A) to (C), from the viewpoints of the miscibility of the water absorbent resin fine particles and the polymer gel (hydrogel), or an increase in the addition (recovery) ratio, it is also preferable to use agglomerated particles (for example, a hydrated-particles) instead of the water absorbent resin fine particles in a dried state.

That is, as in the case of the Examples which is described late in relation to the fine powder recovery step, it is preferable to agglomerate the water absorbent resin fine particles and add (recover). Specifically, according to an embodiment, a fine powder having a particle size of less than 150 μm may be incorporated into the particulate hydrogel. In the method for producing a water absorbent resin powder of the present invention, it is particularly preferable to return the agglomerated hydrogel to the polymerization step, the gel-crushing step or the drying step. When the fine powder is recycled (recovered) at the aforementioned timing, the recycling rate (addition (recovery) ratio) can be increased (prevention of re-occurrence of a fine powder), and the water absorption rate is also increased.

The agglomeration step for fine powder is not particularly limited, and the agglomeration method is described in, for example, Patent Literatures 106 to 108 and the like. Thus, these agglomeration methods can be used in the present invention. Preferably, the fine powder is agglomerated by using warm water particularly warm water at 50° C. to the boiling point, more particularly 70° C. to 100° C., as described in Patent Literature 106 and the like, and then the agglomerated product is recycled to the steps of (A) to (C), and is particularly recycled (added (recovered)) to the drying step.

Patent Literature 106: U.S. Pat. No. 6,228,930
Patent Literature 107: U.S. Pat. No. 6,071,976
Patent Literature 108: US-A-2009-0041470

According to the present invention, regarding the agglomeration, a method of spraying or mixing by dropping water or an aqueous solution onto the water absorbent resin fine particles is preferred. The water for this purpose is preferably water vapor or warm water, and particularly, warm water is preferred. The moisture content of the gel agglomerated from a fine powder is preferably 3% by weight or greater, more preferably 40% to 80% by weight, still more preferably 50% to 70% by weight, and particularly preferably 50% to 65% by weight.

The agglomerating apparatus used when agglomeration is carried out, is preferably an apparatus equipped with high mixing power. Suitable examples of the agglomerating apparatus include a cylindrical mixer, a double-walled cone mixer, a high speed stirring type mixer, a V-shaped mixer, a ribbon type mixer, a screw type mixer, a double bladed kneader, a pulverization type kneader, a rotary mixer, a gas stream type mixer, a turbulizer, a batch type Lodige mixer, a continuous type Lodige mixer and the like.

(2) Conventional Fine Powder Recovery Method

In order to solve the problems in the present invention, in the case of a production method which includes a drying step involving particular conditions and a fine powder recovery step, the method is characterized in that water absorbent resin fine particles are added (recovered), and a drying method involving particular conditions (hot air drying, preferably through-circulation hot air drying, and more preferably through-circulation band type hot air drying) is essentially used, in which drying method the hot air temperature and air flow velocity are controlled to specific ranges. At this time, the fine powder recovery methods disclosed in Patent Literatures 86 to 107 and the like do not disclose the present invention.

(2-7) Surface Crosslinking Step

In the present invention, when the water absorbent resin powder thus obtained is further subjected to a surface crosslinking step, a water absorbent resin which is excellent in the absorption against pressure, liquid permeability, absorption rate and the like can be obtained. For the surface crosslinking treatment, known surface crosslinking agents and known surface crosslinking methods that are used in the surface crosslinking treatment of water absorbent resins can be used.

That is, the present step is a step of subjecting the surface or the vicinity of the surface of a water absorbent resin powder to a crosslinking treatment, in order to enhance the water absorption rate or liquid permeability of the water absorbent resin powder obtained by the classification step described above, more particularly the water absorbent resin powder including the fine powder recovery step.

Surface crosslinking is carried out by addition of a surface crosslinking agent as will be described below, or polymerization of a monomer at the surface of a water absorbent resin powder, or by addition of a radical polymerization initiator such as a persulfate followed by heating, ultraviolet irradiation or the like. However, in the present invention, the use of a surface crosslinking agent is preferred, and the use of a covalent surface crosslinking agent is more preferred.

(a) Crosslinking Agent (Covalent Surface Crosslinking Agent)

Examples of the covalent surface crosslinking agent that can be used in the present invention include various organic and inorganic surface crosslinking agents, but organic surface crosslinking agents are preferably used. From the viewpoint of the physical properties of the water absorbent resin powder thus obtained, examples include polyhydric alcohol compounds, epoxy compounds, polyvalent amine compounds or condensates thereof with halo-epoxy compounds, oxazoline compounds, (mono-, di-, or poly-)oxazolidinone compounds, alkylene carbonate compounds and the like. Particularly, preferred examples include dehydration reactive crosslinking agents including polyhydric alcohol compounds, alkylene carbonate compounds, oxazolidinone compounds and the like, which require high temperature reaction. Meanwhile, when a dehydration reactive crosslinking agent is not used, the compounds listed in U.S. Pat. No. 6,228,930, U.S. Pat. No. 6,071,976, U.S. Pat. No. 6,254,990 and the like may be used. Examples thereof include polyhydric alcohols such as (mono-, di-, tri-, tetra- or poly-)propylene glycol, 1,3-propanediol, glycerin, 1,4-butanediol, 1,3-butanediol, 1,5-pentanediol, 1,6-hexanediol, and sorbitol; epoxy compounds such as ethylene glycol diglycidyl ether and glycidol; alkylene carbonate compounds such as ethylene carbonate; oxetane compounds; and cyclic urea compounds such as 2-imidazolidinone; and the like.

A dehydration reactive crosslinking agent is suitable for enhancing the water absorption capacity under load or liquid permeability; however, since the moisture content in the water absorbent resin is reduced (particularly, reduced to 1% by weight or less) in the surface crosslinking reaction, the water absorption rate tends to decrease as a result of a decrease in surface hydrophilicity. However, in the method of the present invention, such problems can also be solved, and a balance between water absorption rate and liquid permeability (or water absorption capacity under load) can be achieved. Therefore, in the present invention, in order to solve the problems more effectively, a covalent surface crosslinking agent, and particularly, a dehydration reactive crosslinking agent such as a polyhydric alcohol compound, an alkylene carbonate compound, an oxazolidinone compound is used.

Meanwhile, in the case of using a dehydration reactive crosslinking agent, uniformity of neutralization of the water absorbent resin is more important. For example, in the post-neutralization of gel after polymerization (for example, Patent Literature 105), due to the micro-level non-uniformity of the neutralization rate, the physical properties may be poor even if a covalent surface crosslinking agent is used. Therefore, rather than neutralization after polymerization, it is preferable that the water absorbent resin be neutralized in the form of monomer, preferably to 50% to 100% by mole, and more preferably to the range described above.

(b) Solvent and the Like

The amount of use of the surface crosslinking agent may be appropriately set depending on the physical properties of the water absorbent resin powder thus obtained, the type of the surface crosslinking agent used or the like, and there are no particular limitations. However, the amount of use of the surface crosslinking agent is preferably 0.001 parts to 10 parts by weight, and more preferably 0.01 parts to 5 parts by weight, relative to 100 parts by weight of the water absorbent resin powder. Meanwhile, even in the case of using an organic surface crosslinking agent and an inorganic surface crosslinking agent in combination, the crosslinking agents are used in combination, respectively in an amount of preferably 0.001 parts to 10 parts by weight, and more preferably 0.01 parts to 5 parts by weight, relative to 100 parts by weight of the water absorbent resin powder.

Furthermore, water is preferably used in accordance with the surface crosslinking agent. The amount of use of water at this time is preferably 0.5 parts to 20 parts by weight, and more preferably 0.5 parts to 10 parts by weight, relative to 100 parts by weight of the water absorbent resin powder. Furthermore, a hydrophilic organic solvent may also be used, and the amount of use is preferably 0 parts to 10 parts by weight, and more preferably 0 parts to 5 parts by weight, relative to 100 parts by weight of the water absorbent resin powder. Furthermore, upon incorporation of a surface crosslinking agent solution into the water absorbent resin powder, water-insoluble fine particles or a surfactant can be incorporated together to the extent that the effects of the present invention are not impaired, for example, in an amount of 0 parts to 10 parts by weight, preferably 0 parts to 5 parts by weight, and more preferably 0 parts to 1 part by weight. At this time, the surfactant and the like that may be used are disclosed in U.S. Pat. No. 7,473,739 and the like.

(c) Mixing

As an apparatus for adding and mixing the surface crosslinking agent solution into the water absorbent resin powder in the present invention, any known apparatus can be used, but preferably, a high speed stirring mixer is used.

(d) Heating Step

When the surface crosslinking agent solution is added and mixed into the water absorbent resin powder of the present invention, the water absorbent resin powder swells due to the water in the surface crosslinking agent solution, or the like. Thus, the swollen water absorbent resin powder is dried by heating. The heating temperature (drying temperature) at this time is preferably 70° C. to 300° C., and more preferably 80° C. to 220° C. Furthermore, the heating time (drying time) is preferably 1 minute to 120 minutes, and more preferably 10 minutes to 120 minutes. Meanwhile, in the present invention, a high speed-rotating stirring type mixer is preferably used for the mixing of the surface crosslinking agent solution. The speed of rotation is preferably 100 rpm to 10,000 rpm, and more preferably 300 rpm to 2,000 rpm. Furthermore, the retention time in the mixer is preferably 180 seconds or less, more preferably 0.1 seconds to 60 seconds, and still more preferably 1 second to 30 seconds.

Meanwhile, in the production method which includes at least two steps of a fine powder recovery step and a drying step involving particular conditions, the heating temperature (drying temperature) is preferably 80° C. to 220° C. Furthermore, the heating time (drying time) is preferably 10 minutes to 120 minutes.

It is desirable to increase the absorbency against pressure (AAP) of the water absorbent resin powder thus obtained, through the surface crosslinking as described above, to the range which is described late, preferably up to 20 [g/g] or greater, and more preferably 23 to 30 [g/g].

(e) Additives and Other Crosslinking Agents (Other Surface Crosslinking Methods)

As the surface crosslinking method used in the present invention, a surface crosslinking method of using a radical polymerization initiator (for example, U.S. Pat. No. 4,783,510, WO 2006/062258 A and the like), or a surface crosslinking method of polymerizing a monomer at the surface of the water absorbent resin (US-A-2005-048221, US-A-2009-0239966, WO 2009/048160 A, and the like) may also be applied, instead of surface crosslinking carried out by using the surface crosslinking agents described above.

That is, a persulfate is preferably used as the radical polymerization initiator, and the monomer that is polymerized at the surface of the water absorbent resin is preferably acrylic acid (salt), and also the crosslinking agents described above may be used. Furthermore, a preferably used solvent is water. After these substances are added to the water absorbent resin powder, a crosslinking reaction is carried out with a crosslinking polymerization or radical polymerization initiator at the surface of the water absorbent resin powder by means of active energy radiation (particularly, ultraviolet radiation) or heating, and thereby, a surface crosslinked water absorbent resin is obtained.

Furthermore, liquid permeability and the like may also be enhanced by using a cationic polymer, particularly a cationic polymer having a weight average molecular weight of about 5,000 to 1,000,000 simultaneously or separately, in addition to the organic surface crosslinking agent described above. The cationic polymer thus used is preferably, for example, a vinylamine polymer or the like, and examples thereof are listed in U.S. Pat. No. 7,098,284, WO 2006/082188 A, WO 2006/082189 A, WO 2006/082197 A, WO 2006/111402 A (US-A-2009-0202805), WO 2006/111403 A (US-A-2008-0280128), WO 2006/111404 A (US-A-2008-0221277) and the like.

Furthermore, inorganic fine particles may be similarly used. For example, silicon dioxide and the like are preferred, and examples are listed in U.S. Pat. No. 7,638,570 and the like. In regard to the production method of the present invention, a method for producing a water absorbent resin, which includes a step of adding any one or more of the polyvalent metals, cationic polymers and inorganic fine particles, is preferred.

(Method of Enhancing Liquid Permeability)

That is, in order to control liquid permeability (SFC), the particle size is controlled after the drying step, and surface crosslinking is achieved. Preferably, the surface crosslinking step is carried out by using a covalent surface crosslinking agent and an ionic bonding surface crosslinking agent in combination, and/or the surface crosslinking is achieved by a heating treatment at 150° C. to 250° C. If the water absorption capacity (CRC) after the surface crosslinking is too high, the SFC tends to decrease, and therefore, the CRC is decreased down to preferably 50 [g/g] or less, and more preferably 45 [g/g] or less, still more preferably 40 [g/g] or less by surface crosslinking. At this time, the CRC may be decreased by surface crosslinking such that the reduction ratio of the CRC before and after the surface crosslinking would be preferably 0.1 to 0.9 times, more preferably 0.5 to 0.85 times, and particularly preferably 0.6 to 0.8 times.

(2-8) Surface Coating Step

The present step is a step for coating the surface of the water absorbent resin powder with a surfactant in order to obtain a water absorbent resin powder having a high water absorption rate and high liquid permeability. The surface coating step can be carried out simultaneously with or separately from the (2-7) surface crosslinking step described above. That is, the method for producing a water absorbent resin powder of the present invention preferably includes a step of surface crosslinking the water absorbent resin powder after the drying step, and a step of coating the surface with a surfactant, simultaneously with or separately from the surface crosslinking step.

Since the water absorbent resin powder of the present invention is preferably a foam, the powder exhibits a tendency of weak impact resistance, and particularly, the physical properties may deteriorate as a result of destruction during surface crosslinking and after surface crosslinking. Such a tendency is more conspicuous as the production scale (production amount per unit hour) is larger, and for example, as the production amount per line is 0.5 [t/hour] or greater, or in the following order of 1 [t/hour] or greater, 5 [t/hour] or greater, or 10 [t/hour] or greater, the tendency becomes more conspicuous.

That is, in order to solve the problems described above and to obtain a water absorbent resin powder having a high water absorption rate and high liquid permeability, particularly at the time of continuous production in a large scale as described above, it is preferable to include a step of surface crosslinking the water absorbent resin powder obtained after the drying step, and a step of coating the surface with a surfactant simultaneously with or separately from the surface crosslinking step.

The type and amount of use of the surfactant are appropriately set, but the amount of use is preferably 2% by weight or less, and preferably in the following order of 300 ppm or less, 150 ppm or less, 100 ppm or less, or 80 ppm or less. The lower limit is preferably 0.1 ppm or greater, and more preferably 1 ppm or greater. Furthermore, the type and amount of use of the surfactant are determined so that the surface tension is preferably 60 [mN/m] or greater, and is more preferably maintained in the range described below.

Furthermore, from the viewpoints of the water absorption rate and impact resistance, it is preferable that water is used or incorporated simultaneously with a surfactant, and water is used or incorporated in an amount of preferably 0.1% to 10% by weight, more preferably 1% to 8% by weight, and still more preferably 2% to 7% by weight, relative to the water absorbent resin powder.

(2-9) Other Steps

In the production method of the present invention, a second classification step (classification after surface crosslinking), a step of adding (recovering) (recycling) an evaporated monomer (monomer), a agglomeration step, a fine powder removal step and the like may be provided as necessary, in addition to the steps described above. Furthermore, for the purpose of the effect of the color hue stability over time, prevention of gel deterioration or the like, additives may be added to the monomer or a polymer thereof in any one or all of the steps.

Furthermore, if necessary, a deodorizer, an antibacterial agent, a fragrance, a foaming agent, a pigment, a dye, a plasticizer, an adhesive, a surfactant, a fertilizer, an oxidizing agent, a reducing agent, an oxidation inhibitor, water, a polyvalent metal compound, a salt, a chelating agent, a disinfectant, a hydrophilic polymer such as polyethylene glycol, a water-insoluble inorganic or organic powder such as silica or a metal soap, a pulp or a thermoplastic fiber, paraffin, a hydrophobic polymer, a thermoplastic resin such as polyethylene or polypropylene, a thermosetting resin such as a polyester resin or a urea resin, and the like may be incorporated as additives to the extent that the water absorption characteristics of the water absorbent are not impaired, for example, in an amount of about 0% to 10% by weight, more preferably 0% to 3% by weight, and still more preferably 0% to 1% by weight, relative to the water absorbent resin.

(3) Physical Properties of Polyacrylic Acid (Salt)-Type Water Absorbent Resin Powder (Water Absorbent Resin)

The method for producing a water absorbent resin powder described above preferably includes a step of further coating the surface of the water absorbent resin powder with a surfactant, and a water absorbent resin powder obtained by such a production method is a polyacrylic acid-type water absorbent resin powder which substantially uniformly contains a surfactant and/or a dispersant in the interior. Thus, a water absorbent resin powder having a surface tension of 60 [mN/m] or greater and having the water absorbent resin surface further coated with a surfactant can be preferably obtained. Meanwhile, the surfactant that is present at the surface and in the interior of the water absorbent resin powder can be discriminated by, for example, polishing the surface of a particle or solvent extracting only the surface, and thereby quantitatively determining the density difference of the surfactant in the thickness direction of the particle.

When the surfaces of the water absorbent resin powder are further coated with a surfactant, the resistance to damage is enhanced, and there is no decrease in the physical properties during production or after production. Such a water absorbent resin can achieve a balance between liquid permeability and the water absorption rate, and the water absorbent resin is preferably a water absorbent resin powder having a saline flow conductivity (SFC) of 20 $[\times 10^{-7} \, cm^3 \cdot s \cdot g^{-1}]$ or higher and a water absorption rate (FSR) of 0.25 [g/g/second] or greater.

The polyacrylic acid (salt)-type water absorbent resin powder (water absorbent resin) of the present invention is such that in the case where it is intended to use the water absorbent resin in hygiene products, particularly in disposable diapers, the water absorbent resin powder may be obtained according to a production method which includes a fine powder recovery step and a drying step involving particular conditions, as described above. Furthermore, the water absorbent resin powder (water absorbent resin) thus obtained has preferably at least one or more physical properties controlled, among the various physical properties discussed in the following sections (3-1) to (3-7), and preferably has two or more physical properties including the AAP (absorbency against pressure), or particularly three or more physical properties, under control. If the water absorbent resin does not satisfy the various physical properties described below, there is a risk that the water absorbent resin may not exhibit sufficient performance in high concentration diapers which require a large amount of use of the water absorbent resin powder (water absorbent resin) (for example, the concentration of the water absorbent resin powder (water absorbent resin) is 40% by weight or greater.).

The water absorbent resin powder (water absorbent resin) of the present invention also has its particle size well controlled, so that the water absorption rate (for example, FSR) can be enhanced while the liquid permeability (for example, SFC) or the water absorption capacity under load (for example, AAP) is maintained.

The production method of the present invention can be applied as a method for producing a water absorbent resin powder (water absorbent resin) such as described below; however, preferably, the production method can be applied to the control and enhancement of liquid permeability (SFC) or water absorption rate (FSR). Meanwhile, the physical properties described below and in the Examples are defined by the EDANA methods, unless particularly stated otherwise.

The water absorbent resin powder (water absorbent resin) of the present invention preferably has a foamed structure (also known as: porous structure), and the porous structure can be discriminated by checking the particle surfaces with electron microscopic photographs. The average pore size of the particle surface is 100 µm or less, more preferably 0.1 µm to 90 µm, and particularly preferably 1 µm to 50 µm. The main component of the individual powder particles is porous particles.

In the production method of the present invention, a polyacrylic acid (salt)-type water absorbent resin powder (water absorbent resin) having a water absorption rate index as defined by the following formula of 90 or greater and a bulk density of 0.6 to 0.8 [$g/cm^3$], can be obtained. Meanwhile, in this case, it is preferable that the water absorbent resin be surface crosslinked.

(Water absorption rate index)=(FSR [g/g/s])×(bulk density [$g/cm^3$])×(weight average particle size [µm])

provided that the FSR used in the calculation of the water absorption resin index represents the water absorption rate under swelling to 20 times amount of physiological saline.

The water absorption rate index is preferably, in sequence, 90 or higher, 95 or higher, 100 or higher, 105 or higher, 110 or higher, 115 or higher, or 120 or higher, and the upper limit is preferably 150 or less, and more preferably 140 or less. Such a water absorbent resin powder (water absorbent resin) has excellent liquid permeability or impact resistance, and can be preferably used in hygiene products such as disposable diapers. If the water absorption rate index is too low or too high, the water absorbent resin tends to be unsuitable for practical use.

(3-1) AAP (Water Absorption Capacity Under Load)

The AAP (water absorption capacity under load) of the water absorbent resin powder obtained by the present invention is such that in order to prevent leakage from disposable diapers, when the above-described production method that includes a fine powder recovery step and a drying step involving particular conditions is used as a means for achieving the prevention, the AAP under a pressure of 4.83 kPa (0.7 psi) is preferably 20 [g/g] or greater, more preferably 22 [g/g] or greater, and still more preferably 24 [g/g] or greater. The upper limit of the AAP is not particularly limited, but in view of the balance with other physical properties, the upper limit is preferably 40 [g/g] or less, and more preferably 30 [g/g] or less.

When the AAP is less than 20 [g/g], if such a water absorbent resin is used as an absorbent core, it may be impossible to obtain hygiene products in which return of the liquid once absorbed (in general, it is also referred to as "re-wet") by applying a pressure to the absorbent core is small, and therefore, it is not preferable. Meanwhile, the AAP can be appropriately controlled by means of the surface crosslinking agent, particle size and the like described above.

(3-2) CRC (Water Absorption Capacity without Load (Centrifuge Retention Capacity))

The CRC (water absorption capacity without load) (or may also be referred to as "centrifuge retention capacity") of the water absorbent resin powder (water absorbent resin) obtained by the present invention is preferably 10 [g/g] or greater, more preferably 20 [g/g] or greater, still more preferably 25 [g/g] or greater, and particularly preferably 30 [g/g] or greater. The upper limit of the CRC is not particularly limited, but the upper limit is preferably 50 [g/g] or less, more preferably 45 [g/g] or less, and still more preferably 40 [g/g] or less.

If the CRC is less than 10 [g/g], the absorption amount of the water absorbent resin is low, and therefore it may not be appropriate to use it as an absorbent core in hygiene products such as disposable diapers. On the other hand, when the CRC is greater than 50 [g/g], if such a water absorbent resin is used in a water absorbent core, there is a risk that a hygiene product having an excellent liquid uptake rate may not be obtained, which is not preferable. Meanwhile, the CRC can be appropriately controlled by means of the internal crosslinking agent, surface crosslinking agent and the like described above.

(3-3) SFC (Saline Flow Conductivity)

In order to prevent leakage from disposable diapers, when the above-described production method that includes a fine powder recovery step and a drying step involving particular conditions is used as a means for achieving the prevention, the SFC (saline flow conductivity) which represents liquid permeability under pressure is controlled to 1 [$\times 10^{-7}$ $cm^3 \cdot s \cdot g^{-1}$] or greater, preferably 10 [$\times 10^{-7}$ $cm^3 \cdot s \cdot g^{-1}$] or greater, more preferably 20 [$\times 10^{-7}$ $cm^3 \cdot s \cdot g^{-1}$] or greater, still more preferably 50 [$\times 10^{-7}$ $cm^3 \cdot s \cdot g^{-1}$] or greater, particularly preferably 70 [$\times 10^{-7}$ $cm^3 \cdot s \cdot g^{-1}$] or greater, and most preferably 100 [$\times 10^{-7}$ $cm^3 \cdot s \cdot g^{-1}$] or greater. The upper limit of the SFC is not particularly limited, but in view of the balance with other physical properties, the upper limit is preferably 3,000 [$\times 10^{-7}$ $cm^3 \cdot s \cdot g^{-1}$] or less, and more preferably 2,000 [$\times 10^{-7}$ $cm^3 \cdot s \cdot g^{-1}$] or less. The SFC is measured by a well known measurement method, and can be defined according to, for example, U.S. Pat. No. 5,562,646. The SFC can be adjusted by surface crosslinking or particle size control of the AAP or CRC in the ranges described above.

When the SFC exceeds 3,000 [$\times 10^{-7}$ $cm^3 \cdot s \cdot g^{-1}$], if such a water absorbent resin powder (water absorbent resin) is used as an absorbent core, there is a risk that liquid leakage from the absorbent core may occur, and therefore, it is not preferable. Meanwhile, the SFC can be appropriately controlled by the drying method and the like described above.

In the present invention, by increasing the liquid permeability, among others, by increasing the SFC, and more particularly, by increasing the SFC to the range described above, particularly to 20 $[\times 10^{-7}\ cm^3 \cdot s \cdot g^{-1}]$ or greater, the present invention can remarkably exhibit the effects, and thereby, the present invention can be preferably applied as the production method for a water absorbent resin powder (water absorbent resin) having such high liquid permeability.

Furthermore, although the water absorbent resin powder (water absorbent resin) of the present invention is a water absorbent resin powder having high liquid permeability with an SFC of 50 $[\times 10^{-7}\ cm^3 \cdot s \cdot g^{-1}]$ or greater, or further 100 $[\times 10^{-7}\ cm^3 \cdot s \cdot g^{-1}]$ or greater, the water absorbent resin has a decrement of SFC of 15 $[\times 10^{-7}\ cm^3 \cdot s \cdot g^{-1}]$ or less, further 10 $[\times 10^{-7}\ cm^3 \cdot s \cdot g^{-1}]$ or less, or particularly 5 $[\times 10^{-7}\ cm^3 \cdot s \cdot g^{-1}]$ or less, and has excellent resistance to damage.

(3-4) Ext (Water Extractables)

The Ext (water extractables) of the water absorbent resin powder (water absorbent resin) obtained by the present invention is preferably 35% by weight or less, more preferably 25% by weight or less, still more preferably 15% by weight or less, and particularly preferably 10% by weight or less.

The weather resistance (increment of the extractables) which is described late is preferably 20% by weight or less, more preferably 15% by weight or less, and still more preferably 10% by weight or less.

If the Ext is greater than 35% by weight, there is a risk that the gel strength of the water absorbent resin thus obtained may be weak, and liquid permeability may deteriorate. Furthermore, when such a water absorbent resin is used as a water absorbent core, there is a risk that a water absorbent resin which exhibits less return after liquid (re-wet) when pressure is applied to the water absorbent core, may not be obtained, and this is not preferable. Meanwhile, the Ext can be appropriately controlled by means of the internal crosslinking agent and the like described above.

(3-5) FSR (Water Absorption Rate)

The FSR (water absorption rate) of 1 g of a water absorbent resin against 20 g of physiological saline is usually 0.05 [g/g/s] or greater, preferably 0.1 [g/g/s] or greater, more preferably 0.15 [g/g/s] or greater, still more preferably 0.20 [g/g/s] or greater, and particularly preferably 0.25 [g/g/s] or greater. Furthermore, the upper limit of the FSR (water absorption rate) is 0.50 [g/g/s]. Meanwhile, the FSR (water absorption rate) can be defined by the method disclosed in WO 2009/016055 A.

(3-6) Bulk Density

The bulk density of the water absorbent resin powder is usually 0.6 to 0.8 [g/cm$^3$], preferably 0.63 to 0.77 [g/cm$^3$], and still more preferably 0.66 to 0.74 [g/cm$^3$]. In the present invention, the water absorbent resin preferably has a foamed structure (also known as a porous structure), accordingly, since the water absorbent resin powder has high bulk density, the water absorbent resin powder is suitable even from the viewpoints of transport, storage, and particle strength.

(3-7) Surface Tension

The surface tension (defined by the measurement method described in the Examples) of the water absorbent resin powder obtained by the production method of the present invention is preferably 60 [mN/m] or greater, more preferably 65 [mN/m] or greater, still more preferably 67 [mN/m] or greater, particularly preferably 70 [mN/m] or greater, and most preferably 72 [mN/m] or greater, and there is no substantial decrease in the surface tension. Meanwhile, the upper limit is usually sufficient at 75 [mN/m].

[4] Use of Polyacrylic Acid (Salt)-Type Water Absorbent Resin Powder (Water Absorbent Resin)

The use of the water absorbent resin powder (water absorbent resin) obtained by the production method of the present invention is not particularly limited, but preferably, the water absorbent resin powder is used in hygiene products such as disposable diapers, sanitary napkins, and incontinence pads. The water absorbent resin powder (water absorbent resin) of the present invention is excellent in the water absorption characteristics such as CRC (centrifuge retention capacity) and FSR (water absorption rate), and in the stability of the product quality. Therefore, a sanitary material which has satisfactory performance in disposable diapers for children, sanitary napkins, so-called incontinence pads and the like, as an absorbent solidifying agent (absorbent gellant) for aqueous liquids such as urine and blood, can be stably obtained.

For the use in sanitary materials, a water absorbent agent containing the water absorbent resin powder (water absorbent resin) according to the present invention is usually used in a particulate form and combined with a hydrophilic fiber, and the mixture is molded and used as a absorbent core. Meanwhile, the fiber base material used may be a hydrophilic fiber, and examples thereof include pulverized wood pulp, as well as cotton linter, crosslinked cellulose fibers, rayon, cotton, wool, acetate, Vinylon and the like. The fiber base materials used herein are preferably products obtained by aerating the fiber base materials described above.

In those hygiene products, the content (core concentration) of the water absorbent resin powder (water absorbent resin) in a water absorbent core containing arbitrarily any other water absorbent materials (for example, pulp fibers or the like) is usually 30% to 100% by weight, preferably 40% to 100% by weight, more preferably 50% to 100% by weight, still more preferably 60% to 100% by weight, particularly preferably 70% to 100% by weight, and most preferably 75% to 95% by weight. When the content is in this range, the effects of the present invention are exhibited.

Meanwhile, the present patent application is based on JP Patent application No. 2010-102741 A filed Apr. 27, 2010; JP Patent application No. 2011-15186 A filed Jan. 27, 2011; and JP Patent application No. 2011-15187 A filed Jan. 27, 2011, the entire disclosures of which are incorporated herein by reference.

EXAMPLES

Hereinafter, the present invention will be described by way of Examples, but the present invention should not be construed to be limited to by the Examples. Furthermore, the various physical properties described in the claims or Examples of the present invention were determined according to the measurement methods defined below. Meanwhile, unless specifically described otherwise, each step in the respective Examples is carried out under substantially ordinary pressure (atmospheric pressure±5%, or even 1% or less), and identical steps are carried out without applying any pressure change caused by intentional pressurization or pressure reduction. Furthermore, unless specifically described otherwise, the measurements or evaluations described below were carried out under the conditions of a temperature of 20° C. to 25° C. and a humidity of 50 RH %.

[CRC (Water Absorption Capacity without Load (Centrifuge Retention Capacity))]

The water absorption capacity (CRC) was determined according to ERT441.2-0.2, for 30 minutes against a 0.90 wt % aqueous solution of sodium chloride without load.

That is, 0.200 g of a water absorbent resin was placed in a bag made of a non-woven fabric, and the bag was immersed for 30 minutes in physiological saline (0.9 wt % aqueous solution of sodium chloride) at 23° C. Subsequently, dehydration was carried out by centrifugation (250 G, 3 minutes), and thus the water absorption rate (CRC) was determined. Meanwhile, this CRC is a value obtained before a correction for the total moisture content.

[Solid Content (Resin Solid Content)]

The solid content (resin solid content) represents the proportion occupied by components that do not volatilize in 3 hours at 180° C., in a water absorbent resin. The solid content has the following relationship with the moisture content.

Solid content(resin solid content) [wt %]=100−moisture content [wt %]

Meanwhile, the solid content (resin solid content) was measured by the following operation.

In an aluminum cup having a diameter of the bottom of 4 cm (about 5 cm) and a height of 2 cm, 1.00 g of a water absorbent resin was uniformly spread on the bottom of the aluminum cup, and the total weight of the aluminum cup [W1 (g)] was measured. This was left to stand for 3 hours in a hot air dryer with the temperature adjusted to 180° C., and the total weight of the aluminum cup [W2 (g)] was measured immediately after (within at least one minute) the cup was taken out from the hot air dryer. The total moisture content (wt %) was calculated from these W1 and W2 according to the following formula.

Solid content [wt %]=$(W2-W1)$/(weight of the water absorbent resin powder or surface treated water absorbent resin)×100   [Formula 1]

[CRC after Correction for Total Moisture Content]

When the CRC before a correction for the total moisture content is defined as W3, and the solid content (resin solid content) as W4, the CRC after correction for the total moisture content can be determined according to the following formula.

CRC after correction for total moisture content [g/g]= $(W3-1)/(W4/100)+1$   [Formula 2]

[SFC (Saline Flow Conductivity)]

1.5 g of a water absorbent resin was allowed to swell under a load, and then the liquid permeability of the swollen resin under pressure between the gel layers was determined, according to the measurement method disclosed in U.S. Pat. No. 5,562,646.

[FSR (Water Absorption Rate)]

The FSR (water absorption rate) [g/g/s] of 1.00 g of a water absorbent resin against 20 g of physiological saline was determined according to the measurement method disclosed in WO 2009/016055 A.

That is, in a glass beaker (diameter: 32 to 34 mm, height: 50 mm) having a capacity of 25 ml, 1.00 g of a water absorbent resin was introduced such that the surface was horizontal (if necessary, works such as striking of the bottom of the beaker are taken). Subsequently, in a glass beaker having a capacity of 50 ml, 20 g of a 0.90 wt % aqueous solution of sodium chloride that had been temperature-regulated to 23±0.2° C. was added, and the total weight (weight W5' [g]) of the beaker and the aqueous solution of sodium chloride was measured.

Subsequently, the entire amount of the aqueous solution of sodium chloride was rapidly and carefully poured into the beaker containing the water absorbent resin, and simultaneously, time measurement was initiated. Through the operation described above, the water absorbent resin absorbs the aqueous solution of sodium chloride, but the top surface which was the surface of the aqueous solution of sodium chloride in the beginning, is gradually substituted by the water absorbent resin. This top surface was observed by visual inspection from an angle of about 20° C., and at the time point when the top surface was completely substituted by the water absorbent resin, the time measurement was completed (time: is [seconds]). Subsequently, the weight of the beaker in which the aqueous solution of sodium chloride was poured (weight: W5 [g]) was measured, and then the weight of the aqueous solution of sodium chloride thus poured (W6 [g]) was determined according to formula (3). Thus, the FSR (water absorption rate) was determined according to formula (4).

$W6$ [g]=$W5'-W5$   [Formula 3]

FSR [g/g/second]=$W6/(ts×$weight of water absorbent resin powder [g])   [Formula 4]

[Weight Average Particle Size (D50) and Logarithmic Standard Deviation ($\sigma\zeta$) of Particle Size Distribution]

Classification was carried out with standard sieves according to US-A-2006-204755, and thus the weight average particle size (D50) and the logarithmic standard deviation ($\sigma\zeta$) of particle size distribution were determined.

[Bulk Density]

The bulk density was measured by using a bulk density analyzer (manufactured by Kuramochi Kagaku Kikai Seisakusho K.K.) according to JIS K 3362. 100.0 g of a water absorbent resin that was sufficiently mixed to eliminate any deviation due to particle size was introduced into a funnel closed with a dumper. After the introduction, the dumper was rapidly opened, and the water absorbent resin was dropped into a receptacle (weight: W7 [g]) having a capacity of 100 ml. The water absorbent resin overflew from receptacle was dropped from the receptacle by rubbing with a glass rod, and then the weight of the receptacle (W8 [g]) containing the water absorbent resin was measured accurately up to 0.1 g. The bulk density was determined according to the formula (5).

Bulk density [g/ml]=$(W8-W7)/100$   [Formula 5]

Meanwhile, the measurement environment according to the present invention included an air temperature of 24.2° C. and a relative humidity of 43% RH.

[Surface Tension]

In a glass beaker having a capacity of 100 ml, 50 ml of a 0.9 wt % aqueous solution of sodium chloride that was temperature-regulated to 20° C. was introduced, and the surface tension of the aqueous solution of sodium chloride was measured by using a surface tension meter (manufactured by KRUSS; K11 Automatic Surface Tension Meter). Meanwhile, for the measurement, it is necessary to wash the beaker sufficiently to obtain a surface tension of 71 to 75 [mN/m].

Subsequently, a rotor having a length of 25 mm and made of a fluororesin and 0.5 g of a water absorbent resin were introduced into the aforementioned beaker, and the content was stirred for 4 minutes at 500 rpm. Meanwhile, it is also necessary to wash the rotor sufficiently. After a lapse of 4 minutes, stirring was stopped, and the water absorbent resin containing water was sedimented. Subsequently, the supernatant was subjected to the same operation as described above, and the surface tension was measured. Meanwhile, according to the present invention, a plate method of using a platinum plate was employed. The platinum plate was sufficiently washed with deionized water and was heat cleaned with a gas burner before each measurement and then was used.

[Degree of Whiteness]

The degree of whiteness is an index representing the "whiteness of a powder," and is calculated from the X, Y and Z values (XYZ color system) or the L, a and b values (Lab color system).

Among them, the WB (white balance) value which is useful for comparing the degree of whiteness of a water absorbent resin, was measured by using a spectrocolorimeter. Spectrophotometer SE6000 manufactured by Nippon Denshoku Industries Co., Ltd. was used as the spectrocolorimeter, and a powder feed cell having a diameter of φ35 mm and a height of 15 mm was used.

[Damage Resistance Test]

A water absorbent resin was subjected to damage according to the "Mechanical Damage Test" described in Patent Literature 47 (U.S. Pat. No. 6,562,879), by altering the vibration time to 10 minutes.

[Weather Resistance]

3.0 g of a water absorbent resin and 57.0 g of deionized water were introduced into a quartz separable flask having a capacity of 500 ml, and then the gel particles (60.0 g) that had swollen to 20 times, the original size were stirred with a stirring blade having four flat blades each having a length of 3 cm and a width of 1 cm. At the time of stirring, the gel particles were irradiated with ultraviolet radiation at room temperature for one minute at an irradiation intensity of 60 [mW/cm$^2$], by using an ultraviolet irradiator (Ushio Inc.; UV-152/1MNSC3-AA06) equipped with a metal halide lamp (manufactured by Ushio Inc.; UVL-1500M2-N1). Through the operation described above, 20 times-swollen gel particles that had been subjected to a weather resistance acceleration test were obtained.

Subsequently, for the 20 times-swollen gel particles that had been subjected to a weather resistance acceleration test, the water extractables was measured according to ERT470.2-02. That is, in a plastic container with a lid having a capacity of 250 ml, 184.3 g of a 0.9 wt % aqueous solution of sodium chloride and 2.00 g of the swollen gel particles were introduced, and the content was stirred for 16 hours with a magnetic stirrer having a length of 4 cm. The amount of polymer dissolved at this time was determined by pH titration, as the water extractables.

Preparation Example 1-1

Preparation of Particulate Water-Containing Gel-Like Crosslinked Polymer (1-1)

In a reactor of double-blade type kneader made of stainless steel, formed by attaching a lid, which is equipped with two sigma-shaped blades and jacket and had an internal capacity of 10 L, 5438 parts by weight of an aqueous solution of sodium acrylate (monomer concentration: 39 wt %) having a neutralization rate of 73 mol %, and 11.3 parts by weight (0.09 mol % relative to the monomer) of polyethylene glycol diacrylate (molecular weight 523) were introduced, and the mixture was dissolved and used as a reaction liquid. Meanwhile, the acetic acid content in the acrylic acid used was 200 ppm, the propionic acid content was 100 ppm, and the p-methoxyphenol content was 70 ppm. Next, this reaction liquid was degassed for 30 minutes under a nitrogen gas atmosphere. Subsequently, 29.34 parts by weight of a 10 wt % aqueous solution of sodium persulfate and 24.45 parts by weight of a 0.1 wt % aqueous solution of L-ascorbic acid were separately added to the reaction liquid at 20° C. while the reaction liquid was stirred. After approximately one minute, polymerization was initiated. Polymerization was carried out at 20° C. to 95° C. while the water-containing gel-like crosslinked polymer thus produced was gel-crushed, and after 30 minutes from the initiation of polymerization, a particulate water-containing gel-like crosslinked polymer (1-1) was taken out (polymerization ratio: 99 mol %). The weight average particle size (D50) of the particulate water-containing gel-like crosslinked polymer (1-1) thus obtained was about 1500 μm, and the solid content was 41 wt % to 42 wt %. Meanwhile, almost 100% of the acetic acid and propionic acid in the acrylic acid used was remaining in the water-containing gel-like crosslinked polymer (1-1).

A predetermined amount of the particulate water-containing gel-like crosslinked polymer (1-1) which was the same as the polymer obtained in Preparation Example 1-1, was obtained by repeating the polymerization step according to the polymerization of Example 1-1 as necessary, and with appropriately increasing the polymerization scale as necessary.

Example 1-1

Production of Water-Containing Agglomerated Particles

The particulate water-containing gel-like crosslinked polymer (1-1) obtained in Preparation Example 1-1 was dried by using a through-circulation band type hot air dryer having a punching plate (material: SUS304, shape of holes: oval holes arranged in zigzags, size of holes: width 1.2 mm and length 15 mm, ratio of opening area: 27%), under the conditions of a drying time of 35 minutes, a hot air temperature of 150° C., and an average flow velocity of hot air of 1.0 [m/s], and thus a dried substance (1-1) was obtained. Meanwhile, the hot air used for the drying was a gas mixture of water vapor and air, and the dew point temperature was fixed at 60° C. Furthermore, hot air was caused to flow upward in a direction perpendicular to the punching plate surface. The flow rate was measured by using a constant temperature thermal type anemonometer, ANEMOMASTER (registered trademark) 6162 (manufactured by Kanomax Japan, Inc.).

Subsequently, the dried substance (1-1) thus obtained was pulverized and classified by using in sequence, a JIS standard sieve having a mesh size of 850 μm and a JIS standard sieve having a 150 μm. In the classification operation, particles having a particle size of less than 150 μm that passed through the JIS standard sieve having a mesh size of 150 μm, were obtained as water absorbent resin fine particles (1-1) (solid content: 96 wt %, amount of addition (recovery): 20 wt %). The water absorbent resin fine particles (1-1) thus obtained were subjected to agglomeration according to the agglomeration method disclosed in Granulation Example 1 of U.S. Pat. No. 6,228,930, and thus water-containing agglomerated particles (1-1) (moisture content: 55 wt %) were obtained.

Preparation of Water Absorbent Resin Powder

Next, separately, 1740 parts by weight of the particulate water-containing gel-like crosslinked polymer (1-1) (solid content: 41 wt % to 42 wt %) obtained in Preparation Example 1-1, and 260 parts by weight of the water-containing agglomerated particles (1-1) (solid content: 45 wt %) obtained as described above were mixed (hereinafter, referred to as "water-containing gel mixture"), and the mixture was introduced into a through-circulation band type hot air dryer having the same specifications as that used in the drying step in the production of the water-containing agglomerated particles. In the through-circulation band type hot air dryer, drying was carried out under the same conditions as those used in the drying step in the production of the water-containing agglomerated particles (hot air temperature: 150° C., average flow velocity of hot air: 1.0 [m/s], dew point: 70° C. at the beginning of drying, 40° C. at the end of drying), and thus a dried mixture (1-1) was obtained. Meanwhile, the temperature of the water-containing gel mixture (1-1) before being introduced into the dryer was 90° C., the polymerization ratio was about 99 mol %, and the solid content was 42 wt %.

In the through-circulation band type hot air dryer, drying of the water-containing gel mixture (1-1) was carried out under the same temperature and air flow velocity conditions as those used in the drying step in the production of the water-containing agglomerated particles (hot air temperature: 150° C., average flow velocity of hot air: 1.0 [m/s], dew point: 70° C. at the beginning of drying, 40° C. at the end of drying), and thus a dried substance (1-1) was obtained.

Subsequently, the dried substance (1-1) thus obtained was pulverized by using a roll mill pulverizer (manufactured by Inokuchi Giken Co., Ltd., trade name: Model WML), and then classification was carried out by using a JIS standard sieve having a mesh size of 425 μm and a JIS standard sieve having a mesh size of 300 μm in this order. Thus, a water absorbent resin powder (1-1) having a particle size of greater than or equal to 300 μm and less than 425 μm was obtained. The CRC before a correction for the moisture content, the water absorption rate (FSR), and the solid content of the water absorbent resin powder (1-1) thus obtained are presented in Table 1-1.

Examples 1-2 to 1-9

The hot air temperature and air flow velocity at the time of drying in the Example 1-1 were changed. That is, the operation was carried out in the same manner as in Example 1-1, except that instead of the drying step (150° C., 1.0 [m/s]) employed in the production of the water-containing agglomerated particles and the production of the water absorbent resin powder, the temperature of the hot air was set to 150° C. (Example 1-4 and Example 1-7), 180° C. (Example 1-2, Example 1-5, and Example 1-8), or 190° C. (Example 1-3, Example 1-6, and Example 1-9), and the average flow velocity of the hot air was set to 1.0 [m/s] (Example 1-2 and Example 1-3), 2.0 [m/s] (Example 1-4, Example 1-5, and Example 1-6), or 3.0 [m/s] (Example 1-7, Example 1-8, Example 1-9). Thus, water absorbent resin powders (1-2) to (1-9) were obtained. Meanwhile, the dew point temperature at the beginning of drying in the drying step of Examples 1-2 to 1-9 was 70° C., and the dew point temperature at the end of drying was 40° C. The CRC's before a correction for the moisture content, the water absorption rates (FSR), and the solid contents of the water absorbent resin powders (1-2) to (1-9) thus obtained are presented in Table 1-1.

Comparative Examples 1-1 and 1-2

The hot air temperature and air flow velocity at the time of drying in the Example 1-1 were changed. That is, the operation was carried out in the same manner as in Example 1-1, except that instead of the drying step (150° C., 1.0 [m/s]) employed in the production of the water-containing agglomerated particles and the production of the water absorbent resin powder, the temperature of the hot air was set to 190° C. (Comparative Example 1-1) and 130° C. (Comparative Example 1-2), and the average flow velocity of the hot air was set to 0.5 [m/s] (Comparative Example 1-1) and 1.0 [m/s] (Comparative Example 1-2). Thus, comparative water absorbent resin powders (1-1) and (1-2) were obtained. Meanwhile, the dew point temperature at the beginning of drying in the drying step of Comparative Examples 1-1 and 1-2 was 70° C., and the dew point temperature at the end of drying was 40° C. The CRC's before a correction for the moisture content, the water absorption rates (FSR), and the solid contents of the comparative water absorbent resin powders (1-1) and (1-2) thus obtained are presented in Table 1-1.

Comparative Examples 1-3 to 1-5

The air flow velocity at the time of drying in the Example 1-1 was changed. That is, the operation was carried out in the same manner as in Example 1-1, except that instead of the drying step (150° C., 1.0 [m/s]) employed in the production of the water-containing agglomerated particles and the production of the water absorbent resin powder, the temperature of the hot air was set to 150° C. (Comparative Example 1-3), 180° C. (Comparative Example 1-4), or 190° C. (Comparative Example 1-5), and the average flow velocity of the hot air was set to 4 [m/s] (Comparative Examples 1-3 to 1-5). However, in the drying step employed in the production of the water-containing agglomerated particles and the production of the water absorbent resin powder, the powders of the water absorbent resins flew away, and stabilized drying could not be carried out. Meanwhile, the dew point temperature at the beginning of drying in the drying step of Comparative Examples 1-3 to 1-5 was 70° C., and the dew point temperature at the end of drying was 40° C.

Comparative Example 1-6

The same operation was carried out in the same manner as in Example 1-5, except that the dew point of hot air used in the drying step employed in the production of the water-containing agglomerated particles and the production of the water absorbent resin powder was adjusted to 20° C. Meanwhile, the air temperature of the external air at this time was 25° C., and the dew point was 20° C. The CRC before a correction for the moisture content, the water absorption rate (FSR), and the solid content of the comparative water absorbent resin powder (1-6) thus obtained are presented in Table 1-1.

Comparative Example 1-7

The same operation was carried out in the same manner as in Example 1-1, except that only the particulate water-containing gel-like crosslinked polymer (1-1) obtained in Preparation Example 1-1 was directly introduced into the drying step, and the temperature of the hot air was set to 190° C. Thus, a comparative water absorbent resin powder (1-7) was obtained. Meanwhile, the dew point temperature at the beginning of drying in the drying step of Comparative Example 1-7 was 70° C., and the dew point temperature at the end of drying was 40° C. The CRC before a correction for the moisture content, the water absorption rate (FSR), and the solid content of the comparative water absorbent resin powder (1-7) thus obtained are presented in Table 1-1.

Preparation Example 1-2

Preparation of Particulate Water-Containing Gel-Like Crosslinked Polymer (1-2)

A particulate water-containing gel-like crosslinked polymer was obtained by adding water absorbent resin fine particles (dried fine powder) to the polymerization step. That is, polymerization was initiated in the same manner as in Preparation Example 1-1. After 5 minutes from the initiation of polymerization, 320 parts by weight of the water absorbent resin fine particles (1-1) (solid content: 96 wt %, amount of addition (recovery): 20 wt %) obtained by the same operation as that used in Example 1-1 was introduced into a reactor. In the reactor, kneader polymerization was carried out at 20° C. to 95° C., while the water-containing gel-like crosslinked polymer thus produced and the water absorbent resin fine particle (1-1) introduced were kneaded and pulverized. Thus, after 30 minutes from the beginning of polymerization, a particulate water-containing gel-like crosslinked polymer (1-2) was taken out. The weight average particle size (D50) of the particulate water-containing gel-like crosslinked polymer (1-2) thus obtained was about 1300 μm, and the solid content was 44 wt % to 45 wt %. A predetermined amount of the particulate water-containing gel-like crosslinked polymer (1-2) which was the same as the polymer obtained in Preparation Example 1-1, was obtained by repeating such polymerization step as necessary, and with appropriately increasing the polymerization scale as necessary.

Example 1-10

The same drying, pulverization and classification operations as those carried out in the preparation of the water absorbent resin powder of Example 1-1 were carried out, except that the hot air temperature used in the drying step for the particulate water-containing gel-like crosslinked polymer (1-2) obtained by adding water absorbent resin fine particles (dried fine powder) in polymerization step in Preparation Example 1-2, was set to 190° C. Thus, a water absorbent resin powder (1-10) was obtained. The CRC before a correction for the moisture content, the water absorption rate (FSR), and the solid content of the water absorbent resin powder (1-10) thus obtained are presented in Table 1-1.

TABLE 1-1

| | Water absorbent resin fine particles | | Drying conditions | | Water absorbent resin powder | | |
|---|---|---|---|---|---|---|---|
| | Amount of recovery [wt %] | Step to be recovered | Drying temperature [° C.] | Average flow velocity [m/s] | CRC [1] [g/g] | FSR [g/g/s] | Solid content [wt %] |
| Example 1-1 | 20 | Drying step | 150 | 1.0 | 28.2 | 0.23 | 95.1 |
| Example 1-2 | 20 | Drying step | 180 | 1.0 | 31.2 | 0.24 | 96.2 |
| Example 1-3 | 20 | Drying step | 190 | 1.0 | 32.7 | 0.26 | 96.7 |
| Example 1-4 | 20 | Drying step | 150 | 2.0 | 28.4 | 0.24 | 95.6 |
| Example 1-5 | 20 | Drying step | 180 | 2.0 | 31.3 | 0.25 | 96.7 |
| Example 1-6 | 20 | Drying step | 190 | 2.0 | 32.8 | 0.27 | 97.2 |
| Example 1-7 | 20 | Drying step | 150 | 3.0 | 28.3 | 0.26 | 96.2 |
| Example 1-8 | 20 | Drying step | 180 | 3.0 | 31.2 | 0.27 | 97.2 |
| Example 1-9 | 20 | Drying step | 190 | 3.0 | 32.8 | 0.29 | 97.8 |
| Comparative Example 1-1 | 20 | Drying step | 190 | 0.5 | 32.3 | 0.19 | 94.3 |
| Comparative Example 1-2 | 20 | Drying step | 130 | 1.0 | 23.9 | 0.19 | 93.5 |
| Comparative Example 1-3 | 20 | Drying step | 150 | 4.0 | — | — | — |
| Comparative Example 1-4 | 20 | Drying step | 180 | 4.0 | — | — | — |
| Comparative Example 1-5 | 20 | Drying step | 190 | 4.0 | — | — | — |
| Comparative Example 1-6 | 20 | Drying step | 180 | 2.0 | 31.1 | 0.22 | 97.2 |
| Comparative Example 1-7 | 0 | None | 190 | 1.0 | 32.7 | 0.21 | 96.5 |
| Example 1-10 | 20 | Polymerization step | 190 | 1.0 | 32.5 | 0.25 | 96.3 |

[1] CRC: CRC before correction for moisture content

Conclusion

Figure 1:
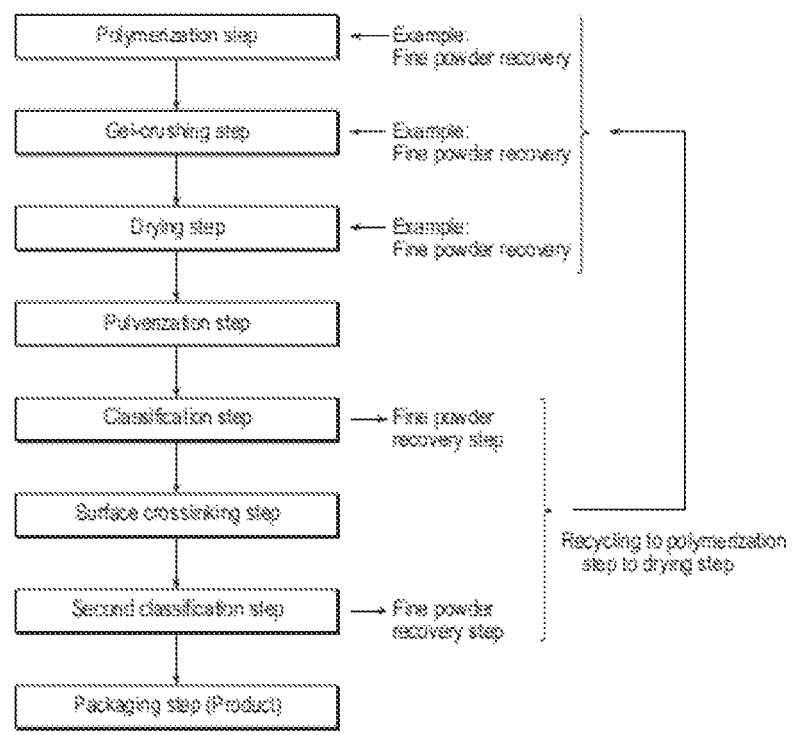
FIG. 1 is a schematic flow diagram illustrating the production step for a water absorbent resin powder according to the embodiment of the present invention.
Figure 2:
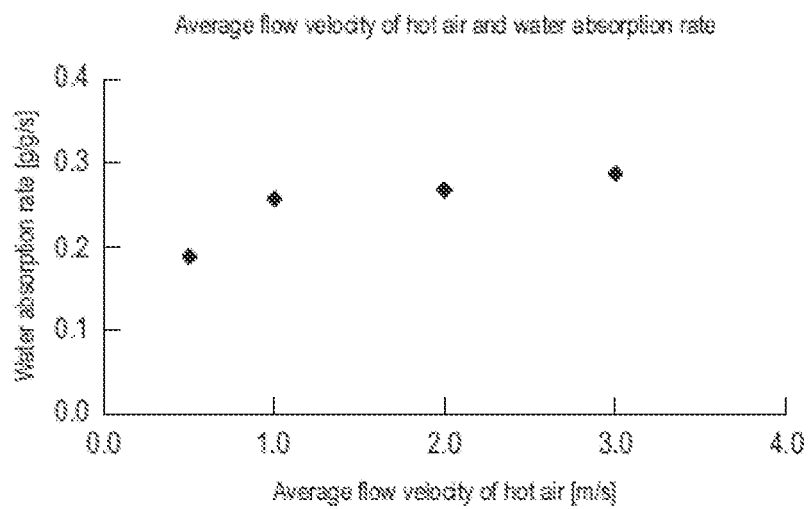
FIG. 2 is a graph plotting the correlation between the average flow velocity of hot air in the drying step and the water absorption rate.

As indicated in Table 1-1, FIG. 1 and FIG. 2, when the temperature of the hot air used in the through-circulation band type hot air dryer is set to 140° C. or higher and the average flow velocity of the hot air is set to 1.0 [m/s] or higher, an increase in the water absorption rate (FSR) of the water absorbent resin is recognized. Furthermore, when Example 1-3 is compared with Comparative Example 1-6, the water absorption rate (FSR) has increased by 0.05 [g/g/s]. Therefore, it can be considered that the addition (recovery) of the water absorbent resin fine particles brings about an effect of increasing the water absorption rate (FSR) of the water absorbent resin powder. Meanwhile, although not indicated in the table, approximately 40% of the acetic acid or propionic acid content in the water-containing gel was removed as a result of the drying, and thus an acidic odor was not perceived from the water absorbent resin thus obtained.

Example 1-11

The dried mixture (1-3) obtained by adding water absorbent resin fine particles in the drying step in Example 1-3 was pulverized by using a roll mill crusher (manufactured by Inokuchi Giken Co., Ltd., trade name: WML type), and subsequently, the pulverized substance was classified by using a JIS standard sieve having a mesh size of 710 μm and a JIS standard sieve having a mesh size of 150 μm in this order. Thus, a water absorbent resin powder (1-11) having a particle size of greater than or equal to 150 μm and less than 710 μm was obtained.

100 parts by weight of the water absorbent resin powder (1-11) thus obtained was mixed with a surface treating agent containing 0.5 parts by weight of 1,4-butanediol, 1.0 parts by weight of propylene glycol and 3.0 parts by weight of pure water, and then this mixture was heating treated for 30 minutes at 210° C. Subsequently, the mixture was pulverized and classified until the mixture passed through a JIS standard sieve having a mesh size of 850 μm Subsequently, the classified substance was cooled, and then as an ionic bonding surface crosslinking agent, a liquid mixture containing 1.17 parts by weight of a 27.5 wt % aqueous solution of aluminum sulfate (8 wt % in terms of aluminum oxide), 0.3 parts by weight of a 60 wt % aqueous solution of sodium lactate and 0.029 parts by weight of propylene glycol was added to the classified substance. The mixture was mixed and made uniform. Thereafter, the particles thus obtained were pulverized and classified until the particles passed through a JIS standard sieve having a mesh size of 710 μm. Thus, a surface treated water absorbent resin (1-11) was obtained. The CRC before a correction for the moisture content, the water absorption rate (FSR), and the SFC of the water absorbent resin (1-11) thus obtained are presented in Table 1-2.

Comparative Example 1-8

A comparative dried substance (1-7) obtained in Comparative Example 1-7 (no addition of water absorbent resin fine particles in the drying step) was subjected to the same operation as that carried out in Example 1-11, and thus a comparative water absorbent resin powder (1-8) was obtained. Furthermore, the same operations of surface treatment and the like as those carried out in Example 1-11 were carried out, and thus a surface treated comparative water absorbent resin (1-8) was obtained. The CRC before a correction for the moisture content, the water absorption rate (FSR), and the SFC of the comparative water absorbent resin (1-8) thus obtained are presented in Table 1-2.

TABLE 1-2

| | Surface treated water absorbent resin | | |
|---|---|---|---|
| | CRC before correction for moisture content [g/g] | FSR [g/g/s] | SFC [$\times 10^{-7}$ cm$^3 \cdot$ s $\cdot$ g$^{-1}$] |
| Example 1-11 | 27.2 | 0.24 | 100 |
| Comparative Example 1-8 | 27.2 | 0.19 | 95 |

Conclusion

As indicated in Table 1-2, when the same surface treatment was carried out, a water absorbent resin having a high water absorption rate (FSR) can be obtained, while high SFC is retained, by adding (recovering) the water absorbent resin fine particles and drying.

Comparative Example 2-1

A comparative aqueous monomer solution (2-1) which did not contain gas bubbles was obtained and polymerized according to Comparative Example 2 of JP Patent Application No. 2010-179515.

That is, in a container made of polypropylene having a capacity of 3 L, 351.6 g of acrylic acid (containing 70 ppm of p-methoxyphenol), 2.17 g of polyethylene glycol diacrylate (molecular weight: 523) as an internal crosslinking agent, 94.6 g of a 0.1 wt % aqueous solution of trisodium diethylene triamine pentaacetate, 144.9 g of a 48.5 wt % aqueous solution of sodium hydroxide, and 242.45 g of deionized water (ion-exchanged water) were introduced, and the mixture was dissolved (mixed). Thus, a comparative aqueous monomer solution (2-1') was prepared. The temperature of the aqueous solution (2-1') increased up to 65° C. by the neutralization heat of the first stage immediately after preparation.

Next, the comparative aqueous monomer solution (2-1') was cooled with stirring, and at the time point at which the liquid temperature reached 53° C., 148.9 g of a 48.5 wt % aqueous solution of sodium hydroxide that had been temperature-regulated to 30° C. was added thereto and mixed. Thus, a comparative aqueous monomer solution (2-1) was prepared. At this time, the temperature of the comparative aqueous monomer solution (2-1) increased up to 83.5° C. by the neutralization heat of the second stage immediately after preparation. Meanwhile, since the aqueous solution (2-1) did not contain any surfactant, the gas bubbles thus generated were not stable, and introduction of fine gas bubbles (clouding) was not observed. The comparative aqueous monomer solution (2-1) after the temperature increase was almost colorless and transparent.

Next, at the time point at which the temperature of the comparative aqueous monomer solution (2-1) described above had decreased to 83° C., 15.3 g of a 3.8 wt % aqueous solution of sodium persulfate was added as a polymerization initiator while the aqueous solution was stirred. Subsequently, the mixture was immediately poured into a tray type container made of stainless steel (bottom: 340×340 mm, height: 25 mm, inner surface: attached with Teflon (registered trademark)) in an open atmospheric system. Meanwhile, the tray type container was heated until the surface temperature reached 40° C., by using a hot plate (manufactured by Iuchi Seieido Co., Ltd.; NEO HOTPLATE HI-1000).

The comparative aqueous monomer solution (2-1) was poured into the tray type container, and after 15 seconds, the polymerization reaction was initiated. The polymerization reaction proceeded, while water vapor was generated and the reaction system expanded and was foamed from side to side and up and down. Thereafter, the polymerization product shrank to a size slightly larger than the tray type container. This expansion and shrinkage was completed in about one minute. After a lapse of 3 minutes from the initiation of the polymerization reaction, a water-containing gel-like crosslinked polymer (hydrogel) was taken out. Meanwhile, this series of operations were carried out in an open atmosphere system, and the peak temperature at the time of polymerization was 108° C.

The hydrogel (70° C. to 85° C.) obtained by the polymerization reaction described above was gel-crushed by using a meat chopper (manufactured by Iizuka Kogyo Co., Ltd., Meat chopper type: 12VR-400KSOX, die orifice size: 6.4 mm, number of holes: 38, die thickness: 8 mm), and thus a micronized hydrogel was obtained. At this time, the feed amount of the hydrogel was 350 [g/min], and in parallel to the feeding of the hydrogel, gel-crushing was carried out while deionized water that was temperature-regulated to 90° C. was added at a rate of 80 [g/min] (solid content of the hydrogel: 48.5 wt %, weight average particle size (D50): 1.1 mm).

The micronized hydrogel obtained by the gel-crushing operation described above was spread on a wire mesh made of stainless steel having a mesh size of 850 μm, and was dried with hot air for 30 minutes while hot air at a temperature of 180° C. was blown vertically upward with respect to the hydrogel at a flow velocity of 1 [m/sec] (dew point at the beginning of drying: 70° C., dew point at the end of drying: 40° C.). Meanwhile, the temperature of the hydrogel before introduction to the dryer was 56° C., the polymerization ratio was about 99 mol %, and the solid content was 48.5 wt %. Subsequently, a dried substance obtained by the drying operation was pulverized by using a roll mill (manufactured by Inokuchi Giken Co., Ltd., WML type roll pulverizer), and then the pulverized substance was classified by using a JIS standard sieve having a mesh size of 850 µm and a JIS standard sieve having a mesh size of 45 µm. Meanwhile, the content of acetic acid in the acrylic acid used was 200 ppm, and the content of propionic acid was 100 ppm. However, since approximately 40% of acetic acid or propionic acid in the hydrogel was removed by drying, and therefore, no acidic odor was perceived in the water absorbent resin thus obtained.

Through the above-described series of operations, an irregularly shaped pulverized comparative water absorbent resin powder (2-1) having a particle size of greater than or equal to 45 µm and less than 850 µm was obtained. Various physical properties of the comparative water absorbent resin powder (2-1) thus obtained are presented in Table 2-1.

Comparative Example 2-2

A comparative aqueous monomer solution (2-2) containing gas bubbles was obtained and polymerized according to Example 4 of JP Patent Application No. 2010-179515.

That is, 595.4 [g/min] of a 37 wt % aqueous solution of sodium acrylate, 198.6 [g/min] of a 48 wt % aqueous solution of sodium hydroxide, 300.1 [g/min] of acrylic acid (containing 70 ppm of p-methoxyphenol), 2.71 [g/min] of polyethylene glycol diacrylate (molecular weight 523) as an internal crosslinking agent, 204.7 [g/min] of deionized water (ion-exchanged water), 0.42 [g/min] of a 31 wt % aqueous solution of trisodium diethylenetriamine pentaacetate, and 0.29 [g/min] of a 10 wt % aqueous solution of polyoxyethylene (20) sorbitan monostearate (manufactured by Kao Corp.) as a surfactant were mixed by line mixing, and thus a comparative aqueous monomer solution (2-2) was prepared. Continuously, the comparative aqueous monomer solution (2-2) was passed through a coil type heat exchanger made of stainless steel (independent coil type heat exchanger, product No.: JC-S1; As One Corp., Comprehensive Research Instrument Catalogue) (see FIG. 4), which was immersed in an oil bath at 95° C. At that time, the temperature of the comparative aqueous monomer solution (2-2) increased up to about 92° C., and for that reason, the solubility of the dissolved gas decreased. Thus, the comparative aqueous monomer solution expanded about 1.03 times (the expansion factor was compared with the aqueous monomer solution at the same temperature).

To the comparative aqueous monomer solution (2-2) that had passed through the heat exchanger, a 3 wt % aqueous solution of sodium persulfate as a polymerization initiator was incorporated by line mixing at a rate of 26.0 [g/min], and the mixture was continuously supplied to a continuous kneader (manufactured by Dalton Co., Ltd., CKDJS-40) of a polymerization apparatus having a biaxial stirring blade. The temperature of the comparative aqueous monomer solution (2-2) supplied to the polymerization apparatus was 92° C. Meanwhile, due to a decrease in the solubility of the gas, the aqueous monomer solution (2-2) containing a surfactant had very fine gas bubbles introduced therein, and the solution was clouding (expansion factor: 1.03). Furthermore, the jacket temperature of the polymerization apparatus was set to 95° C., and nitrogen gas was blown into the polymerization apparatus at a rate of 20 [L/min]. Meanwhile, this series of operations were carried out in an open atmosphere system (see FIG. 5, and FIG. 6 of JP Patent Application No. 2010-179515).

The comparative aqueous monomer solution (2-2) was supplied to the polymerization apparatus, and then immediately a polymerization reaction was initiated. The polymerization reaction and shearing of the water-containing gel-like crosslinked polymer were simultaneously carried out, and a crushed hydrogel was continuously discharged from the polymerization apparatus. Thereafter, similarly to Comparative Example 2-1, the hydrogel thus obtained was gel-crushed with a meat chopper, and was subjected to the respective operations of drying, pulverization and classification. Meanwhile, the temperature of the hydrogel before introduction to the dryer was 60° C., the polymerization ratio was about 99 mol %, and the solid content was 48.8 wt %.

Through the operations described above, an irregularly shaped pulverized comparative water absorbent resin powder (2-2) having a particle size of greater than or equal to 45 µm and less than 850 µm was obtained. Various physical properties of the comparative water absorbent resin powder (2-2) thus obtained are presented in Table 2-1.

Reference Example 2-1

The comparative water absorbent resin powder (2-1) obtained in Comparative Example 2-1 was further classified by using a JIS standard sieve having a mesh size of 150 µm and a JIS standard sieve having a mesh size of 45 µm. The comparative water absorbent resin powder (2-1) that had passed through the JIS standard sieve having a mesh size of 150 µm was obtained as reference water absorbent resin fine particles (2-1). The reference water absorbent resin fine particles (2-1) thus obtained included 92 wt % of particles that passed through the sieve of 150 µm but did not pass through the sieve of 45 µm, and 8 wt % of particles that passed through the sieve of 45 µm.

Example 2-1

The same operation as that carried out in Comparative Example 2-2 was carried out, except that in relation to Comparative Example 2-2, the reference water absorbent resin fine particles (2-1) were continuously supplied (fine powder recovery) at a rate of 57 [g/min], when the comparative aqueous monomer solution (2-2) was supplied to the polymerization apparatus and polymerization was immediately initiated. Thus, an irregularly shaped pulverized water absorbent resin powder (2-1) having a particle size of greater than or equal to 45 µm and less than 850 µm was obtained. Various physical properties of the water absorbent resin powder (2-1) thus obtained are presented in Table 2-1.

Comparative Example 2-3

The same operation as that carried out in Comparative Example 2-2 was carried out, except that in relation to the classification step of Comparative Example 2-2, a JIS standard sieve having a mesh size of 150 µm was used instead of a JIS standard sieve having a mesh size of 45 µm. Thus, an irregularly shaped pulverized comparative water absorbent resin powder (2-3) having a particle size of greater than or equal to 150 µm and less than 850 µm (150-on product), and a comparative water absorbent resin fine particles (2-3) having a particle size of less than 150 µm (150-pass product) were obtained. Various physical properties of the comparative water absorbent resin powder (2-3) thus obtained are presented in Table 2-1. Meanwhile, the weight ratio of the 150-on product and the 150-pass product was 88:12 (wt %).

Example 2-2

The same operation as that carried out in Comparative Example 2-2 was carried out, except that in relation to Comparative Example 2-2, the 150-pass product obtained in Comparative Example 2-3 (comparative water absorbent resin fine particles (2-3)) was continuously supplied (fine powder recovery) at a rate of 57 [g/min], when the comparative aqueous monomer solution (2-2) was supplied to the polymerization apparatus and polymerization was immediately initiated. Thus, an irregularly shaped pulverized water absorbent resin powder (2-2) having a particle size of greater than or equal to 45 μm and less than 850 μm was obtained. Various physical properties of the water absorbent resin powder (2-2) thus obtained are presented in Table 2-1.

Comparative Example 2-4

Foaming polymerization was carried out by using a carbonate, according to Patent Literatures 24 to 32 mentioned above and Comparative Example 6 of JP Patent Application No. 2010-179515.

That is, in a container made of polypropylene having a capacity of 3 L, 421.7 g of acrylic acid, 2.754 g of polyethylene glycol diacrylate (molecular weight 523) as an internal crosslinking agent, 113.43 g of a 0.1 wt % aqueous solution of trisodium diethylenetriamine pentaacetate, 140.4 g of a 48.5 wt % aqueous solution of sodium hydroxide, and 292.3 g of deionized water (ion-exchanged water) were introduced, and the mixture was dissolved (mixed). Thus, a comparative aqueous monomer solution (2-4') was prepared.

Next, a comparative aqueous monomer solution (2-4) was prepared by rapidly adding and mixing 211.9 g of a 48.5 wt % aqueous solution of sodium hydroxide that was temperature-regulated at 40° C., into the comparative aqueous monomer solution (2-4'). At this time, the temperature of the comparative aqueous monomer solution (2-4) was 85° C.

Subsequently, at the time point at which the temperature of the comparative aqueous monomer solution (2-4) described above had decreased to 82° C., 5.2 g of sodium hydrogen carbonate (manufactured by Wako Pure Chemical Industries, Ltd.) was added thereto, and then 17.55 g of a 4 wt % aqueous solution of sodium persulfate was added while the aqueous solution was stirred. Subsequently, the mixture was immediately poured into a tray type container made of stainless steel (bottom: 340×340 mm, height: 25 mm, inner surface: attached with Teflon (registered trademark)) in an open atmosphere system. Meanwhile, at the time point at which sodium hydrogen carbonate was added, the generation of gas bubbles that were believed to be carbon dioxide was observed; however, the gas bubble diameters were very large, and when the solution was poured into the tray type container, foaming was also reduced, so that the reaction mixture became an almost colorless transparent solution. Furthermore, the tray type container was heated until the surface temperature reached 80° C., by using a hot plate (manufactured by Iuchi Seieido Co., Ltd.; NEO HOTPLATE HI-1000).

Not long after the comparative aqueous monomer solution (2-4) was poured into the tray type container, the polymerization reaction was initiated. The polymerization reaction proceeded, while water vapor was generated and the reaction system expanded and was foamed from side to side and up and down. Thereafter, the polymerization product shrank to a size slightly larger than the tray type container. This expansion and shrinkage was completed in about one minute. After a lapse of 3 minutes from the initiation of the polymerization reaction, a water-containing gel-like crosslinked polymer (hydrogel) was taken out. Meanwhile, this series of operations were carried out in an open atmosphere system. Meanwhile, the peak temperature at the time of polymerization was 110° C.

The hydrogel (polymerization ratio: 99 mol %) at 73° C. obtained by the polymerization reaction described above was gel-crushed by using a meat chopper (manufactured by Iizuka Kogyo Co., Ltd., Meat chopper type: 12VR-400KSOX, die orifice size: 6.4 mm, number of holes: 38, die thickness: 8 mm), and thus a micronized hydrogel was obtained. At this time, the feed amount of the hydrogel was 350 [g/min], and in parallel to the feeding of the hydrogel, gel-crushing was carried out while deionized water that was temperature-regulated to 90° C. was added at a rate of 80 [g/min]. Meanwhile, the weight average particle size (D50) of the hydrogel thus obtained was 1.1 mm.

The micronized hydrogel obtained by the gel-crushing operation described above (temperature of the hydrogel before supply to the dryer: 61° C., solid content: 48.9 wt %) was spread on a wire mesh made of stainless steel having a mesh size of 850 μm, and was dried with hot air for 30 minutes while hot air at a temperature of 180° C. was blown vertically upward with respect to the hydrogel at a flow velocity of 1 [m/sec] (dew point at the beginning of drying: 70° C., dew point at the end of drying: 40° C.). Subsequently, a dried substance obtained by the drying operation was pulverized by using a roll mill (manufactured by Inokuchi Giken Co., Ltd., WML type roll pulverizer), and then the pulverized substance was classified by using a JIS standard sieve having a mesh size of 850 μm and a JIS standard sieve having a mesh size of 45 μm.

Through the above-described series of operations, an irregularly shaped pulverized comparative water absorbent resin powder (2-4) was obtained. Various physical properties of the comparative water absorbent resin powder (2-4) thus obtained are presented in Table 2-1.

Example 2-3

Polymerization was carried out in the presence of a water absorbent resin powder, according to Patent Literature 41 and Comparative Example 7 of JP Patent Application No. 2010-179515.

That is, the same operation as that carried out in Comparative Example 2-4 was carried out, except that in relation to Comparative Example 2-4, 5.2 g of sodium hydrogen carbonate (manufactured by Wako Pure Chemical Industries, Ltd.) was not added, and 25.8 g of the reference water absorbent resin fine particles (2-1) obtained in Reference Example 2-1 were added immediately after 17.55 g of a 4 wt % aqueous solution of sodium persulfate was added. Thus, an irregularly shaped pulverized water absorbent resin powder (2-3) was obtained. Various physical properties of the water absorbent resin powder (2-3) thus obtained are presented in Table 2-1.

Comparative Example 2-5

Foaming polymerization based on gas bubble dispersion was carried out according to Patent Literature 37 and Comparative Example 8 of JP Patent Application No. 2010-179515.

That is, in relation to Comparative Example 2-4, the hydrogel obtained by foaming polymerization with gas bubbles dispersed therein, instead of using carbonate, was gel-crushed by using a meat chopper (manufactured by Iizuka Kogyo Co., Ltd., Meat chopper type: 12VR-400KSOX, die orifice size: 6.4 mm, number of holes: 38, die thickness: 8 mm), and the gel-crushed substance was subjected to drying, pulverization and classification. Thus, an irregularly shaped pulverized comparative water absorbent resin powder (2-5) was obtained. Various physical properties of the comparative water absorbent resin powder (2-5) thus obtained are presented in Table 2-1. Meanwhile, although gas bubbles were dispersed in the aqueous monomer solution, the gas bubble diameters were very large.

Comparative Example 2-6

The same operation as that carried out in Comparative Example 2-4 was carried out, except that in relation to the classification step of Comparative Example 2-4, a JIS standard sieve having a mesh size of 150 μm was used instead of a JIS standard sieve having a mesh size of 45 μm. Thus, an irregularly shaped pulverized comparative water absorbent resin powder (2-6) having a particle size of greater than or equal to 150 μm and less than 850 μm (150-on product), and a comparative water absorbent resin fine particles (2-6) having a particle size of less than 150 μm (150-pass product) were obtained. Various physical properties of the comparative water absorbent resin powder (2-6) thus obtained are presented in Table 2-1. Meanwhile, the weight ratio of the 150-on product and the 150-pass product was 88:12 (wt %).

Comparative Example 2-7

The same operation as that carried out in Comparative Example 2-5 was carried out, except that in relation to the classification step of Comparative Example 2-5, a JIS standard sieve having a mesh size of 150 μm was used instead of a JIS standard sieve having a mesh size of 45 μm. Thus, an irregularly shaped pulverized comparative water absorbent resin powder (2-7) having a particle size of greater than or equal to 150 μm and less than 850 μm (150-on product), and a comparative water absorbent resin fine particles (2-7) having a particle size of less than 150 μm (150-pass product) were obtained. Various physical properties of the comparative water absorbent resin powder (2-7) thus obtained are presented in Table 2-1. Meanwhile, the weight ratio of the 150-on product and the 150-pass product was 85:15 (wt %).

Example 2-4

The same operation as that carried out in Comparative Example 2-4 was carried out, except that in relation to Comparative Example 2-4, the hydrogel obtained by the polymerization reaction was supplied to the meat chopper, and at the same time, the 150-pass product obtained in Comparative Example 2-6 (comparative water absorbent resin fine particles (2-6)) was continuously supplied (fine powder recovery) at a proportion of 10 wt % (relative to the solid content). Thus, an irregularly shaped pulverized water absorbent resin powder (2-4) having a particle size of greater than or equal to 45 μm and less than 850 μm was obtained. Various physical properties of the water absorbent resin powder (2-4) thus obtained are presented in Table 2-1.

Example 2-5

The same operation as that carried out in Comparative Example 2-5 was carried out, except that in relation to Comparative Example 2-5, the hydrogel obtained by the polymerization reaction was supplied to the meat chopper, and at the same time, the 150-pass product obtained in Comparative Example 2-7 (comparative water absorbent resin fine particles (2-7)) was continuously supplied (fine powder recovery) at a proportion of 10 wt % (relative to the solid content). Thus, an irregularly shaped pulverized water absorbent resin powder (2-5) having a particle size of greater than or equal to 45 μm and less than 850 μm was obtained. Various physical properties of the water absorbent resin powder (2-5) thus obtained are presented in Table 2-1.

Comparative Example 2-8

The comparative water absorbent resin powder (2-1) obtained in Comparative Example 2-1 was further classified by using a JIS standard sieve having a mesh size of 600 μm, and thus an irregularly shaped pulverized comparative water absorbent resin powder (2-8) having a particle size of greater than or equal to 45 μm and less than 600 μm was obtained. Various physical properties of the comparative water absorbent resin powder (2-8) thus obtained are presented in Table 2-1.

TABLE 2-1

Effect of fine powder recycling

| | | CRC [g/g] | FSR [g/g/sec] | Bulk density [g/cm³] | D50 [μm] | Solid content [wt %] | Surface tension [mN/m] | Degree of whiteness [WB] |
|---|---|---|---|---|---|---|---|---|
| Comparative Example 2-1 | Comparative water absorbent resin powder (2-1) | 34.0 | 0.27 | 0.66 | 455 | 96 | 71.9 | 66.99 |
| Comparative Example 2-2 | Comparative water absorbent resin powder (2-2) | 35.3 | 0.36 | 0.65 | 448 | 97 | 72.5 | 69.32 |
| Example 2-1 | Water absorbent resin powder (2-1) | 33.1 | 0.40 | 0.61 | 437 | 96 | — | 70.53 |
| Comparative Example 2-3 | Comparative water absorbent resin powder (2-3) | 35.2 | 0.34 | 0.65 | 460 | 97 | 72.5 | 68.11 |
| Example 2-2 | Water absorbent resin powder (2-2) | 35.1 | 0.36 | 0.65 | 460 | 97 | 72.5 | 70.90 |

TABLE 2-1-continued

Effect of fine powder recycling

| | | CRC [g/g] | FSR [g/g/sec] | Bulk density [g/cm³] | D50 [μm] | Solid content [wt %] | Surface tension [mN/m] | Degree of whiteness [WB] |
|---|---|---|---|---|---|---|---|---|
| Comparative Example 2-4 | Comparative water absorbent resin powder (2-4) | 36.0 | 0.28 | 0.67 | 436 | 96 | — | — |
| Example 2-3 | Water absorbent resin powder (2-3) | 33.6 | 0.29 | 0.65 | 446 | 97 | — | — |
| Comparative Example 2-5 | Comparative water absorbent resin powder (2-5) | 37.8 | 0.48 | 0.53 | 450 | 95 | — | — |
| Comparative Example 2-6 | Comparative water absorbent resin powder (2-6) | 36.0 | 0.26 | 0.66 | 451 | 96 | — | — |
| Comparative Example 2-7 | Comparative water absorbent resin powder (2-7) | 37.8 | 0.45 | 0.51 | 470 | 95 | — | — |
| Example 2-4 | Water absorbent resin powder (2-4) | 36.0 | 0.29 | — | 451 | 96 | — | — |
| Example 2-5 | Water absorbent resin powder (2-5) | 37.8 | 0.49 | — | 470 | 95 | — | — |
| Comparative Example 2-8 | Comparative water absorbent resin powder (2-8) | 34.4 | 0.33 | 0.69 | 336 | 97 | — | — |

Conclusion

As indicated in Table 2-1, from a comparison of Example 2-1 (FSR: 0.40) and Comparative Example 2-2 (FSR: 0.36), a comparison of Example 2-2 (FSR: 0.36) and Comparative Example 2-3 (FSR: 0.34), a comparison of Example 2-4 (FSR: 0.29) and Comparative Example 2-6 (FSR: 0.26), and a comparison of Example 2-5 (FSR: 0.49) and Comparative Example 2-7 (FSR: 0.45), it was found that when water absorbent resin fine particles are added (recovered) to the foaming polymerization, the water absorption rate increases. Furthermore, from a comparison of Example 2-1 (degree of whiteness: 70.53) and Comparative Example 2-2 (degree of whiteness: 69.32), and a comparison of Example 2-2 (degree of whiteness: 70.90) and Comparative Example 2-3 (degree of whiteness: 68.11), it was found that when water absorbent resin fine particles are added (recovered) to the foaming polymerization, the degree of whiteness increases.

From a comparison of Comparative Example 2-1 (FSR at 850 to 45 μm=0.27) and Comparative Example 2-8 (FSR at 600 to 45 μm=0.33), it was found that the increase in the water absorption rate (FSR) is insufficient only by making the particle size fine to a size of less than 600 μm while sacrificing the yield, liquid permeability or the like, as compared with the techniques of Examples such as Example 2-1 (FSR at 850 to 45 μm=0.40), which uses the fine powder of Comparative Example 2-1.

It was found that as compared with the method for increasing the water absorption rate of the present invention, such as in Example 2-1 (FSR at a bulk density of 0.61=0.40), from Comparative Example 2-7 (bulk density: 0.51) or Comparative Example 2-5 (bulk density: 0.53), an increase in the water absorption rate (FSR) (for example, increase to 0.4 or greater) achieved only by foaming is accompanied by a large decrease in the bulk density. An increase in the volume caused by a decrease in the bulk density (an increase in the volume of powder per unit weight, for example, the powder of Comparative Example 2-7 is about 1.2 times the volume of that of Example 2-1) brings about an increase in the transport or storage cost, or bulkiness of the product use form of the water absorbent resin powder (for example, disposable diapers), which is not preferable.

Comparative Example 2-9

The same operation as that carried out in Example 2-1 was carried out, except that in relation to Example 2-1, when the water-containing gel-like crosslinked polymer containing water absorbent resin fine particles (with fine powder recovered) was dried with hot air, the hot air temperature was changed to 190° C., and the air flow velocity was changed to 0.5 [m/sec]. Thus, an irregularly shaped pulverized comparative water absorbent resin powder (2-9) was obtained. The FSR of the comparative water absorbent resin powder (2-9) thus obtained is presented in Table 2-2.

Examples 2-6 to 2-8

The same operation as that carried out in Example 2-1 was carried out, except that in relation to Example 2-1, when the water-containing gel-like crosslinked polymer containing water absorbent resin fine particles (with fine powder recovered) was dried with hot air, the hot air temperature was changed to 190° C., and the air flow velocity was changed to 1.0 [m/sec] (Example 2-6), 2.0 [m/sec] (Example 2-7), and 3.0 [m/sec] (Example 2-8). Thus, irregularly shaped pulverized water absorbent resin powders (2-6) to (2-8) were respectively obtained. The FSR values of the water absorbent resin powders (2-6) to (2-8) thus obtained are presented in Table 2-2.

Comparative Example 2-10

The same operation as that carried out in Example 2-1 was carried out, except that in relation to Example 2-1, when the water-containing gel-like crosslinked polymer containing water absorbent resin fine particles (with fine powder recovered) was dried with hot air, the hot air temperature was changed to 190° C., and the air flow velocity was changed to 5.0 [m/sec]. Thus, an irregularly shaped pulverized comparative water absorbent resin powder (2-10) was obtained. The FSR of the comparative water absorbent resin powder (2-10) thus obtained is presented in Table 2-2.

TABLE 2-2

Effect of flow velocity of hot air (hot air temperature: 190° C.)

|  |  | Flow velocity [m/sec] | FSR [g/g/sec] |  |
|---|---|---|---|---|
| Comparative Example 2-9 | Comparative water absorbent resin powder (2-9) | 0.5 | 0.38 |  |
| Example 2-6 | Water absorbent resin powder (2-6) | 1.0 | 0.40 |  |
| Example 2-7 | Water absorbent resin powder (2-7) | 2.0 | 0.41 |  |
| Example 2-8 | Water absorbent resin powder (2-8) | 3.0 | 0.43 |  |
| Comparative Example 2-10 | Comparative water absorbent resin powder (2-10) | 5.0 | 0.47 | particle scattering observed |

Conclusion

As indicated in Table 2-2, it was confirmed that when the flow velocity of the hot air is changed to 0.5 m→1.0 m→2.0 m→3.0 m→5.0 m per second, in the drying step at the same dew point and at a temperature of 190° C., the FSR (water absorption rate) tends to increase (Examples 2-6 to 2-8). However, when the flow velocity is increased to 5.0 [m/sec] as in Comparative Example 2-10, scattering of the dried substance (particles) or an increase in the amount of residual monomers (increase by about 100 ppm) is observed, and therefore, it is not preferable. It was found that for the flow velocity at the time of drying, 1.0 to 3.0 [m/sec] is suitable. Furthermore, it was found that in a comparison with Table 1-1, the water absorption rate (FSR) further increases when gas bubbles are incorporated at the time of polymerization, as discussed above.

Examples 2-9 to 2-11

The same operation as that carried out in Example 2-1 was carried out, except that in relation to Example 2-1, when the water-containing gel-like crosslinked polymer containing water absorbent resin fine particles (with fine powder recovered) was dried with hot air, the hot air temperature was changed to 150° C. (Example 2-9), 170° C. (Example 2-10) or 190° C. (Example 2-11). Thus, irregularly shaped pulverized water absorbent resin powders (2-9) to (2-11) were respectively obtained. The FSR values of the water absorbent resin powders (2-9) to (2-11) and (2-1) thus obtained are presented in Table 2-3.

Comparative Example 2-11

The same operation as that carried out in Example 2-1 was carried out, except that in relation to Example 2-1, when the water-containing gel-like crosslinked polymer containing water absorbent resin fine particles (with fine powder recovered) was dried with hot air, the hot air temperature was changed to 240° C. Thus, an irregularly shaped pulverized comparative water absorbent resin powder (2-11) was obtained. The FSR of the comparative water absorbent resin powder (2-11) thus obtained is presented in Table 2-3.

TABLE 2-3

Effect of hot air temperature (flow velocity: 1.0 [m/sec])

|  |  | Hot air temperature [° C.] | FSR [g/g/sec] |  |
|---|---|---|---|---|
| Comparative Example 2-11 | Comparative water absorbent resin powder (2-11) | 240 | — | Coloration |
| Example 2-11 | Water absorbent resin powder (2-11) | 190 | 0.41 |  |
| Example 2-1 | Water absorbent resin powder (2-1) | 180 | 0.40 |  |
| Example 2-10 | Water absorbent resin powder (2-10) | 170 | 0.38 |  |
| Example 2-9 | Water absorbent resin powder (2-9) | 150 | 0.36 |  |

Conclusion

As indicated in Table 2-3, it was confirmed that when the temperature of the hot air is changed to 150° C. 170° C. 180° C. 190° C. in the drying step at the same dew point and at an air flow velocity of 1.0 m/sec, the FSR (water absorption rate) tends to increase (Examples 2-1 and Examples 2-9 to 2-11). However, when the temperature is increased to 240° C. as in Comparative Example 2-12, deterioration of the dried substance (particles) or coloration (yellowing) is observed, and therefore, it is not preferable. It was found that the temperature at the time of drying is essentially 140° C. or higher, and more suitably 150° C. to 235° C., but the temperature is preferably 155° C. to 230° C., more preferably 160° C. to 220° C., and still more preferably 170° C. to 200° C. Furthermore, it was found that in a comparison with Table 1-1, the water absorption rate (FSR) further increases when gas bubbles are incorporated at the time of polymerization, as discussed above.

Example 2-12

The same operation as that carried out in Comparative Example 2-1 was carried out, except that the acrylic acid used in the polymerization in Comparative Example 2-1, was changed to an acrylic acid having a content of p-methoxyphenol of 1 ppm, and thus a water absorbent resin powder (2-12') was obtained.

Subsequently, the water absorbent resin powder (2-12') thus obtained was subjected to the same operations as in Reference Example 2-1. Thus, water absorbent resin fine particles (2-12) were obtained.

Furthermore, the same operation as that carried out in Example 2-1 was carried out, except that the acrylic acid used in the polymerization in Example 2-1 was changed to an acrylic acid having a content of p-methoxyphenol of 1 ppm. Thus, an irregularly shaped pulverized water absorbent resin powder (2-12) was obtained. The weather resistance of the water absorbent resin powder (2-12) thus obtained was decreased by about 10% in the absolute value as compared with the water absorbent resin powder (2-1). It was found that a small amount of p-methoxyphenol enhances weather resistance.

Example 2-13

The same operation as that carried out in Comparative Example 2-1 was carried out, except that the acrylic acid used in the polymerization in Comparative Example 2-1 was changed to an acrylic acid having a content of p-methoxyphenol of 200 ppm. Thus, a water absorbent resin powder (2-13') was obtained.

Subsequently, the water absorbent resin powder (2-13') thus obtained was subjected to the same operations as in Reference Example 2-1, and thus water absorbent resin fine particles (2-13) were obtained.

Furthermore, the same operation as that carried out in Example 2-1 was carried out, except that the acrylic acid used in the polymerization in Example 2-1 was changed to an acrylic acid having a content of p-methoxyphenol of 200 ppm. Thus, an irregularly shaped pulverized water absorbent resin powder (2-13) was obtained. The color hue of the water absorbent resin powder (2-13) thus obtained slightly yellowed as compared with the water absorbent resin powder (2-1). It was found that 200 ppm or more of p-methoxyphenol contributes to coloration.

Example 2-14

To 100 parts by weight of the water absorbent resin powder (2-1) obtained in Example 2-1, a surface crosslinking agent solution containing 0.48 parts by weight of 1,4-butanediol, 0.75 parts by weight of propylene glycol, and 4.0 parts by weight of deionized water was uniformly sprayed and mixed. Subsequently, a surface crosslinking treatment was carried out for 45 minutes with a heat treating machine (temperature: 180° C.), and then the water absorbent resin powder was pulverized until the particles passed through a JIS standard sieve having a mesh size of 850 μm. Thus, surface-crosslinked water absorbent resin particles (2-14) were obtained.

To 100 parts by weight of the water absorbent resin particles (2-14) obtained by the operation described above, a liquid mixture containing 0.80 parts by weight of a 27 wt % aqueous solution of aluminum sulfate (8 wt % in terms of aluminum oxide), 0.134 parts by weight of a 60 wt % aqueous solution of sodium lactate, and 0.016 parts by weight of propylene glycol was added. After the addition, the particles were dried for one hour at 60° C. under the conditions without any air flow, and then the particles were passed through a JIS standard sieve having a mesh size of 850 μm. Thus, a water absorbent resin powder (2-14) was obtained as a product. Various physical properties of the water absorbent resin powder (2-14) thus obtained are presented in Table 2-4.

Example 2-15

The same operation as that carried out in Example 2-14 was carried out, except that 0.001 parts by weight of polyoxyethylene(20) sorbitan monostearate (manufactured by Kao Corp.) was added to the surface crosslinking agent solution used in Example 2-14, and thus a water absorbent resin powder (2-15) was obtained. Various physical properties of the water absorbent resin powder (2-15) thus obtained are presented in Table 2-4. Meanwhile, the water absorbent resin powder (2-15) was a product obtained by further coating the surface of the water absorbent resin powder (2-1) in which a surfactant was substantially uniformly present in the interior, with a surfactant. The surface tension of the water absorbent resin powder (2-15) was 67.4 [mN/m].

Comparative Example 2-12

The comparative water absorbent resin powder (2-1) obtained in Comparative Example 2-1 was subjected to the same surface crosslinking operation as that carried out in Example 2-14, and thus a comparative water absorbent resin powder (2-12) was obtained. Various physical properties of the comparative water absorbent resin powder (2-12) thus obtained are presented in Table 2-4.

Comparative Example 2-13

The comparative water absorbent resin powder (2-7) obtained in Comparative Example 2-7 was subjected to the same surface crosslinking operation as that carried out in Example 2-14, and thus a comparative water absorbent resin powder (2-13) was obtained. Various physical properties of the comparative water absorbent resin powder (2-13) thus obtained are presented in Table 2-4.

Comparative Example 2-14

The comparative water absorbent resin powder (2-8) obtained in Comparative Example 2-8 was subjected to the same surface crosslinking operation as that carried out in Example 2-14, and thus a comparative water absorbent resin powder (2-14) was obtained. Various physical properties of the comparative water absorbent resin powder (2-14) thus obtained are presented in Table 2-4.

TABLE 2-4

Effect of surface crosslinking

| | | CRC [g/g] | AAP [g/g] | FSR [g/g/sec] | SFC [(*)] | Bulk density [g/cm$^3$] |
|---|---|---|---|---|---|---|
| Example 2-14 | Water absorbent resin powder (2-14) | 26.8 | 24.1 | 0.41 | 130 | — |
| Example 2-15 | Water absorbent resin powder (2-15) | 26.9 | 24.2 | 0.41 | 135 | — |
| Comparative Example 2-12 | Comparative water absorbent resin powder (2-12) | 26.6 | 24.6 | 0.26 | 150 | 0.66 |
| Comparative Example 2-13 | Comparative water absorbent resin powder (2-13) | 26.1 | 22.0 | 0.33 | 92 | 0.69 |
| Comparative Example 2-14 | Comparative water absorbent resin powder (2-14) | 27.7 | 20.1 | 0.50 | 48 | 0.55 |

(*) Unit of SFC; [×10$^{-7}$ cm$^3$ · s · g$^{-1}$]

Conclusion

As indicated in Table 2-4, the water absorption rate (FSR) and the liquid permeability (SFC) are dependent on the surface area and have conflicting physical properties each other. However, as indicated in Table 2-4, the method for producing a water absorbent resin powder of the present invention can achieve a good balance between the water absorption rate (FSR) and the liquid permeability (SFC) at high values (for example, while having a high water absorption rate of FSR=0.41, also having high liquid permeability of SFC=100 or greater).

The invention claimed is:

1. A method for producing a water absorbent resin powder, comprising in sequence:
    a polymerization step of an aqueous solution of a monomer, the solution including acrylic acid and/or a salt thereof as a main component;
    a gel-crushing step of a water-containing gel-like crosslinked polymer during or after polymerization;
    a drying step of the water-containing gel-like crosslinked polymer; and
    a pulverization and classification step of the dried polymer, wherein,
water absorbent resin fine particles having a particle size of less than 150 μm or hydrated-particles thereof are added to a step prior to the drying step, and
hot air drying is carried out in the drying step with hot air having an average flow velocity of 1.0 to 3.0 [m/s], a dew point of 30 to 100° C., and a temperature of 140 to 235° C.

2. The method for producing according to claim 1, wherein in the drying step, the hot air drying is carried out for 10 to 120 minutes, and at a temperature of 160° C. to 220° C.

3. The method for producing according to claim 1, wherein the neutralization rate of the acrylic acid and/or the salt thereof is 50 to 100% by mole.

4. The method for producing according to claim 1, wherein the water absorbent resin fine particles are separated by the classification step.

5. The method for producing according to claim 1, wherein 1 to 40% by weight of the dried polymer is separated as water absorbent resin fine particles in the classification step, and then is added to a step prior to the drying step.

6. The method for producing according to claim 1, wherein the water absorbent resin fine particles or hydrated-particles thereof are added to at least one step of the polymerization step, the gel-crushing step and the drying step.

7. The method for producing according to claim 1, wherein the water absorbent resin fine particles or hydrated-particles thereof are added to the water-containing gel-like crosslinked polymer during or after polymerization.

8. The method for producing according to claim 1, wherein the water absorbent resin fine particles or hydrated-particles thereof are added to the water-containing gel-like crosslinked polymer during kneader polymerization.

9. The method for producing according to claim 1, wherein the polymerization step is carried out by continuous kneader polymerization or continuous belt polymerization, and the water-containing gel-like crosslinked polymer is gel-crushed at the time of polymerization and/or after polymerization.

10. The method for producing according to claim 1, wherein in the polymerization step of the aqueous solution, or in the drying step of the water-containing gel-like crosslinked polymer, a water-containing gel-like crosslinked polymer containing gas bubbles is obtained.

11. The method for producing according to claim 1, wherein the polymerization carried out in the polymerization step is foaming polymerization or boiling polymerization.

12. The method for producing according to claim 1, wherein the aqueous solution contains gas bubbles.

13. The method for producing according to claim 1, wherein the aqueous solution contains a methoxyphenol compound in an amount of 5 to 160 ppm relative to acrylic acid.

14. The method for producing according to claim 1, wherein a resin solid content of the water-containing gel-like crosslinked polymer is 40% by weight or greater.

15. The method for producing according to claim 1, wherein a weight average particle size (D50) of the water-containing gel-like crosslinked polymer is 0.5 to 4 mm.

16. The method for producing according to claim 1, wherein a dryer used in the drying step is a through-circulation band type hot air dryer, and a flow direction of the hot air is upward and/or downward in a direction perpendicular to the ventilated band surface.

17. The method for producing according to claim 1, wherein in the drying step, an atmosphere dew point at the beginning of drying is 50 to 90° C., and an atmosphere dew point at the end of drying is higher than or equal to 30° C. and lower than 50° C.

18. The method for producing according to claim 1, wherein in the drying step, a temperature of the mixture of the water-containing gel-like crosslinked polymer and the water absorbent resin fine particles or hydrated-particles thereof is 40° C. to 100° C. when the mixture is fed into the dryer.

19. The method for producing according to claim 1, further comprising:
    a surface crosslinking step after the classification step.

20. The method for producing according to claim 19, wherein a dehydration reactive surface crosslinking agent is used in the surface crosslinking step.

* * * * *